US007475257B2

(12) United States Patent
Aguilar, Jr. et al.

(10) Patent No.: US 7,475,257 B2
(45) Date of Patent: *Jan. 6, 2009

(54) SYSTEM AND METHOD FOR SELECTING AND USING A SIGNAL PROCESSOR IN A MULTIPROCESSOR SYSTEM TO OPERATE AS A SECURITY FOR ENCRYPTION/DECRYPTION OF DATA

(75) Inventors: Maximino Aguilar, Jr., Austin, TX (US); David Craft, Austin, TX (US); Michael Norman Day, Round Rock, TX (US); Akiyuki Hatakeyama, Tokyo (JP); Harm Peter Hofstee, Austin, TX (US); Masakazu Suzuoki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 829 days.

This patent is subject to a terminal disclaimer.

(21) Appl. No.: 10/670,825

(22) Filed: Sep. 25, 2003

(65) Prior Publication Data
US 2005/0071651 A1 Mar. 31, 2005

(51) Int. Cl.
H04L 9/32 (2006.01)
(52) U.S. Cl. .......................... 713/189; 726/27
(58) Field of Classification Search .................. None
See application file for complete search history.

(56) References Cited
U.S. PATENT DOCUMENTS

| 4,394,727 A | 7/1983 | Hoffman et al. |
| 4,787,057 A | 11/1988 | Hammond |
| 4,862,354 A | 8/1989 | Fiacconi et al. |
| 4,945,479 A | 7/1990 | Rusterholz et al. |
| 5,179,702 A | 1/1993 | Spix et al. |

(Continued)

FOREIGN PATENT DOCUMENTS

JP 05-242057 9/1993

(Continued)

OTHER PUBLICATIONS

Richard M. Stallman, "Using and Porting the GNU Compiler Collection for GCC 3.1", Published by the Free Software Foundation, Jun. 22, 2001, pp. 1-18, 75, and 269-275.

(Continued)

*Primary Examiner*—Pramila Parthasarathy
(74) *Attorney, Agent, or Firm*—Stephen J. Walder, Jr.; Matthew Talpis

(57) ABSTRACT

A system and method are provided to dedicate one or more processors in a multiprocessing system to performing encryption functions. When the system initializes, one of the synergistic processing unit (SPU) processors is configured to run in a secure mode wherein the local memory included with the dedicated SPU is not shared with the other processors. One or more encryption keys are stored in the local memory during initialization. During initialization, the SPUs receive nonvolatile data, such as the encryption keys, from nonvolatile register space. This information is made available to the SPU during initialization before the SPUs local storage might be mapped to a common memory map. In one embodiment, the mapping is performed by another processing unit (PU) that maps the shared SPUs' local storage to a common memory map.

36 Claims, 60 Drawing Sheets

U.S. PATENT DOCUMENTS

| | | | |
|---|---|---|---|
| 5,185,861 A | 2/1993 | Valencia | |
| 5,307,495 A | 4/1994 | Seino et al. | |
| 5,359,721 A | 10/1994 | Kempf et al. | |
| 5,490,278 A | 2/1996 | Mochizuki | |
| 5,548,798 A | 8/1996 | King | |
| 5,560,030 A | 9/1996 | Guttag et al. | |
| 5,630,128 A | 5/1997 | Farrell et al. | |
| 5,649,184 A | 7/1997 | Hayashi et al. | |
| 5,689,722 A | 11/1997 | Swarztrauber | |
| 5,692,193 A | 11/1997 | Jagannathan et al. | |
| 5,754,817 A | 5/1998 | Wells et al. | |
| 5,812,843 A | 9/1998 | Yamazaki et al. | |
| 5,835,775 A | 11/1998 | Washington et al. | |
| 5,887,186 A | 3/1999 | Nakanishi | |
| 5,978,831 A | 11/1999 | Ahamed et al. | |
| 6,049,668 A | 4/2000 | Smith et al. | |
| 6,128,724 A | 10/2000 | Lee et al. | 712/32 |
| 6,195,676 B1 | 2/2001 | Spix et al. | |
| 6,199,179 B1 | 3/2001 | Kauffman et al. | |
| 6,292,822 B1 | 9/2001 | Hardwick | |
| 6,292,935 B1 | 9/2001 | Lueh et al. | |
| 6,381,659 B2 | 4/2002 | Proch et al. | 710/57 |
| 6,381,693 B2 | 4/2002 | Fish et al. | |
| 6,446,218 B1 | 9/2002 | D'Souza | |
| 6,463,521 B1 | 10/2002 | Long | |
| 6,473,897 B1 | 10/2002 | Ansari et al. | |
| 6,480,818 B1 | 11/2002 | Alverson et al. | |
| 6,513,057 B1 | 1/2003 | McCrory | |
| 6,526,491 B2 | 2/2003 | Suzuoki et al. | 711/164 |
| 6,542,926 B2 | 4/2003 | Zalewski et al. | |
| 6,559,854 B2 | 5/2003 | Oka et al. | 345/619 |
| 6,578,068 B1 | 6/2003 | Bowman-Amuah | |
| 6,684,390 B1 | 1/2004 | Goff | |
| 6,704,926 B1 | 3/2004 | Blandy et al. | |
| 6,728,961 B1 | 4/2004 | Velasco | |
| 6,950,848 B1 | 9/2005 | Yousefi'zadeh | |
| 6,966,015 B2 | 11/2005 | Steinberg et al. | |
| 6,966,057 B2 | 11/2005 | Lueh | |
| 6,981,072 B2 | 12/2005 | Day et al. | |
| 6,981,074 B2 | 12/2005 | Oner et al. | |
| 7,043,579 B2 | 5/2006 | Dhong et al. | |
| 7,062,768 B2 | 6/2006 | Kubo et al. | |
| 7,080,242 B2 | 7/2006 | Morris | |
| 7,093,258 B1 | 8/2006 | Miller et al. | |
| 7,103,664 B1 | 9/2006 | Novaes et al. | |
| 7,124,170 B1 * | 10/2006 | Sibert | 709/216 |
| 7,127,709 B2 | 10/2006 | Demsey et al. | |
| 7,134,007 B2 | 11/2006 | Zimmer et al. | |
| 7,137,115 B2 | 11/2006 | Sakamoto et al. | |
| 7,143,419 B2 | 11/2006 | Fischer et al. | |
| 7,165,108 B2 | 1/2007 | Matena et al. | |
| 7,167,916 B2 | 1/2007 | Willen et al. | |
| 7,174,544 B2 | 2/2007 | Zee | |
| 7,210,148 B2 | 4/2007 | Arnold et al. | |
| 2001/0002130 A1 | 5/2001 | Suzuoki | 345/420 |
| 2002/0046229 A1 | 4/2002 | Yutaka et al. | 709/102 |
| 2002/0060690 A1 | 5/2002 | Tanaka et al. | 345/619 |
| 2002/0095523 A1 | 7/2002 | Shimakawa et al. | 709/316 |
| 2002/0120886 A1 | 8/2002 | Nguyen et al. | |
| 2002/0135582 A1 | 9/2002 | Suzuoki et al. | 345/502 |
| 2002/0138637 A1 | 9/2002 | Suzuoki et al. | 709/230 |
| 2002/0138701 A1 | 9/2002 | Suzuoki et al. | 711/154 |
| 2002/0138707 A1 | 9/2002 | Suzuoki et al. | 711/163 |
| 2002/0156993 A1 | 10/2002 | Suzuoki et al. | 712/30 |
| 2003/0009651 A1 | 1/2003 | Najam et al. | |
| 2003/0045612 A1 | 3/2003 | Misura et al. | |
| 2003/0055984 A1 | 3/2003 | Shimakawa et al. | 709/316 |
| 2003/0071840 A1 | 4/2003 | Huang et al. | |
| 2003/0074650 A1 | 4/2003 | Akgul et al. | |
| 2003/0188045 A1 | 10/2003 | Jacobson | |
| 2004/0123188 A1 | 6/2004 | Srinivasan et al. | |
| 2004/0181785 A1 | 9/2004 | Zwirner et al. | |
| 2004/0260685 A1 | 12/2004 | Pfleiger et al. | |
| 2005/0021944 A1 | 1/2005 | Craft et al. | 713/161 |
| 2005/0028148 A1 | 2/2005 | Civlin | |
| 2005/0071404 A1 | 3/2005 | Nutter et al. | |
| 2005/0071513 A1 | 3/2005 | Aguilar, Jr. et al. | |
| 2005/0071526 A1 | 3/2005 | Brokenshire et al. | |
| 2005/0071578 A1 | 3/2005 | Day et al. | |
| 2005/0071814 A1 | 3/2005 | Aguilar, Jr. et al. | |
| 2005/0071828 A1 | 3/2005 | Brokenshire et al. | |
| 2005/0081112 A1 | 4/2005 | Aguilar, Jr. et al. | |
| 2005/0081181 A1 | 4/2005 | Brokenshire et al. | |
| 2005/0081182 A1 | 4/2005 | Minor et al. | |
| 2005/0081187 A1 | 4/2005 | Odinak et al. | |
| 2005/0081201 A1 | 4/2005 | Aguilar, Jr. et al. | |
| 2005/0081202 A1 | 4/2005 | Brokenshire et al. | |
| 2005/0081203 A1 | 4/2005 | Aguilar, Jr. et al. | |
| 2005/0086655 A1 | 4/2005 | Aguilar, Jr. et al. | |
| 2005/0091473 A1 | 4/2005 | Aguilar, Jr. et al. | |

FOREIGN PATENT DOCUMENTS

| | | |
|---|---|---|
| JP | 06-044110 | 2/1994 |
| JP | 08-095757 | 4/1996 |
| JP | 08-147171 | 6/1996 |
| JP | 10-269165 | 10/1998 |
| JP | 2002-342165 | 11/2002 |
| JP | 2002-366534 | 12/2002 |
| JP | 2003-140912 | 5/2003 |

OTHER PUBLICATIONS

"Microsoft Computer Dictionary Fifth Edition", Microsoft, 2002, p. 49, 196, and 197.

Oram et al., "Managing Projects with make", Published by O'Reilly & Associates, Inc., ISBN 0-937175-90-0, Oct. 1995, pp. 78-80.

McDaniel, George, "IBM Dictionary of Computing", 1994, p. 692.

"Error Correction Coding" "Backup", Microsoft Computer Dictionary, Fifth Edition, Microsoft Press, 2002, 5 pages.

* cited by examiner

Key Control Table

| ID | SPU Key | Key Mask |
|---|---|---|
| 0 | SPU Key | Key Mask |
| 1 | SPU Key | Key Mask |
| 2 | SPU Key | Key Mask |
| ⋮ | | |
| 7 | SPU Key | Key Mask |

*Figure 33*

Memory Access Control Table

| ID | Base | Size | Access Key | Access Key Mask |
|---|---|---|---|---|
| 0 | Base | Size | Access Key | Access Key Mask |
| 1 | Base | Size | Access Key | Access Key Mask |
| 2 | Base | Size | Access Key | Access Key Mask |
| ⋮ | | | | |
| 63 | Base | Size | Access Key | Access Key Mask |

3504 — ID
3506 — Base
3508 — Size
3510 — Access Key
3512 — Access Key Mask
3502

Figure 35

SYSTEM AND METHOD FOR SELECTING AND USING A SIGNAL PROCESSOR IN A MULTIPROCESSOR SYSTEM TO OPERATE AS A SECURITY FOR ENCRYPTION/DECRYPTION OF DATA

BACKGROUND OF THE INVENTION

1. Technical Field

The present invention relates in general to a system and method for using a plurality of processors as virtual devices. More particularly, the present invention relates to a system and method for using heterogeneous processors as an encryption processor to encrypt and decrypt data on behalf of other processes.

2. Description of the Related Art

In our modern society, software is increasingly becoming one of the most valuable technologies. Software controls devices, such as appliances, automobiles, telephones, and especially computer systems. Computer systems exist in a variety of forms. These forms include traditional desktop and notebook computers, as well as pervasive computing devices such as mobile telephones, and personal digital assistants (PDAs). In addition, software is used for entertainment purposes, such as games designed for personal computers as well as games designed for specialized gaming devices.

Large amounts of time, money, and resources are dedicated towards creating software. Many companies derive all or most of their income from creating software. Software programs sold by these companies include customized software that is written for a particular environment or client, as well as off-the-shelf software that is designed and written for a larger group of users.

Because software is so valuable, and because computers make it easy to create an exact copy of a program, software piracy is widespread. Software pirates range from individual computer users to professionals who deal wholesale with stolen software. Software piracy exists in homes, schools, businesses, and governments.

Anti-piracy measures that have previously been employed include encrypting the software program. In this manner, the user is provided with a "key" for opening the software along with the encrypted software program. Only a user with the right key can decrypt the software. A challenge of this method, however, is that experienced hackers can analyze the memory containing the executable form of the decrypted code and create a non-encrypted version. The non-encrypted version can then be distributed to others who no longer need to use the "key" to open the software.

Another anti-piracy measure is to use a device, often called a "dongle," that must be used in order for the software to operate. The device includes a key that is checked by the software before the software will operate. One challenge of this method is that users are often forced to have several devices that they must attach to computers prior to loading the software program. Another challenge is that experienced hackers can read the key being provided by the attached device and create a copy of the device or provide the key value using another software program.

Encryption technologies are also used to provide "digital signatures" where a message is encrypted using the user's private key to which only the user has access. When another user decrypts the message using the user's public key (in a public key-private key arrangement), the other user is assured that the message is from the first user and not an imposter.

A challenge of encryption technologies is that if the encryption keys are compromised, a malevolent user can decrypt software or create digital signatures that belong to another user. Because encryption keys are used to safeguard confidential information, their discovery by malevolent users can be disastrous.

What is needed, therefore, is a system and method that performs encryption functions, such as digital signatures, encrypting files, and decrypting files and software, in a way that does not compromise the user's encryption keys. What is further needed is a secondary processor that can securely perform the encryption functions on behalf of another processor, thus freeing the other processor to perform more non-encryption tasks.

SUMMARY

A system and method are provided to dedicate one or more processors in a multiprocessing system to performing encryption functions. When the system initializes, one of the synergistic processing unit (SPU) processors is configured to run in a secure mode wherein the local memory included with the dedicated SPU is not shared with the other processors. One or more encryption keys are stored in the local memory during initialization. During initialization, the SPUs receive nonvolatile data, such as the encryption keys, from nonvolatile register space. This information is made available to the SPU during initialization before the SPUs local storage might be mapped to a common memory map. In one embodiment, the mapping is performed by another processing unit (PU) that maps the shared SPUs' local storage to a common memory map.

If the SPU runs in "shared" mode (mapping the local memory to the common memory map), the nonvolatile register space, including any encryption keys, are inaccessible to that processor so that an application running on the PU cannot read the encryption keys. It is possible to swap out an SPU when it is in secure mode. If the PU forces the SPU out of secure mode (i.e., in order to perform a switch) then the hardware initialization process cleans the SPU before its local storage is made accessible. The dedicated SPU performing the encryption/decryption receives encrypted data from an application running on the PU, decrypts it using the encryption keys stored in its local storage, and returns the results. In one embodiment, part of the dedicated SPUs memory is shared and part is not shared. The non-shared portion is used to store the keys and the encryption algorithm while the shared portion is used to transfer encrypted/decrypted data to and from the other processors. In another embodiment, the SPU's local memory is private and the SPU reads data to be acted upon from the shared memory using DMA commands and stores the data in the SPU's local memory. When the encryption processing is complete, the SPU uses a DMA command to write the results back to the shared memory. In this manner, processes running on other processors do not have access to encryption keys and algorithms stored in the local memory. In addition, in one embodiment, encryption keys are stored in nonvolatile special registers that are made available to the SPU when the SPU's initialization has been authenticated by an authentication process stored in read-only memory (ROM).

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 33 illustrates the structure of a key control table for a hardware sandbox in accordance with the present invention;

FIG. 35 illustrates the structure of a memory access control table for a hardware sandbox in accordance with the present invention;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
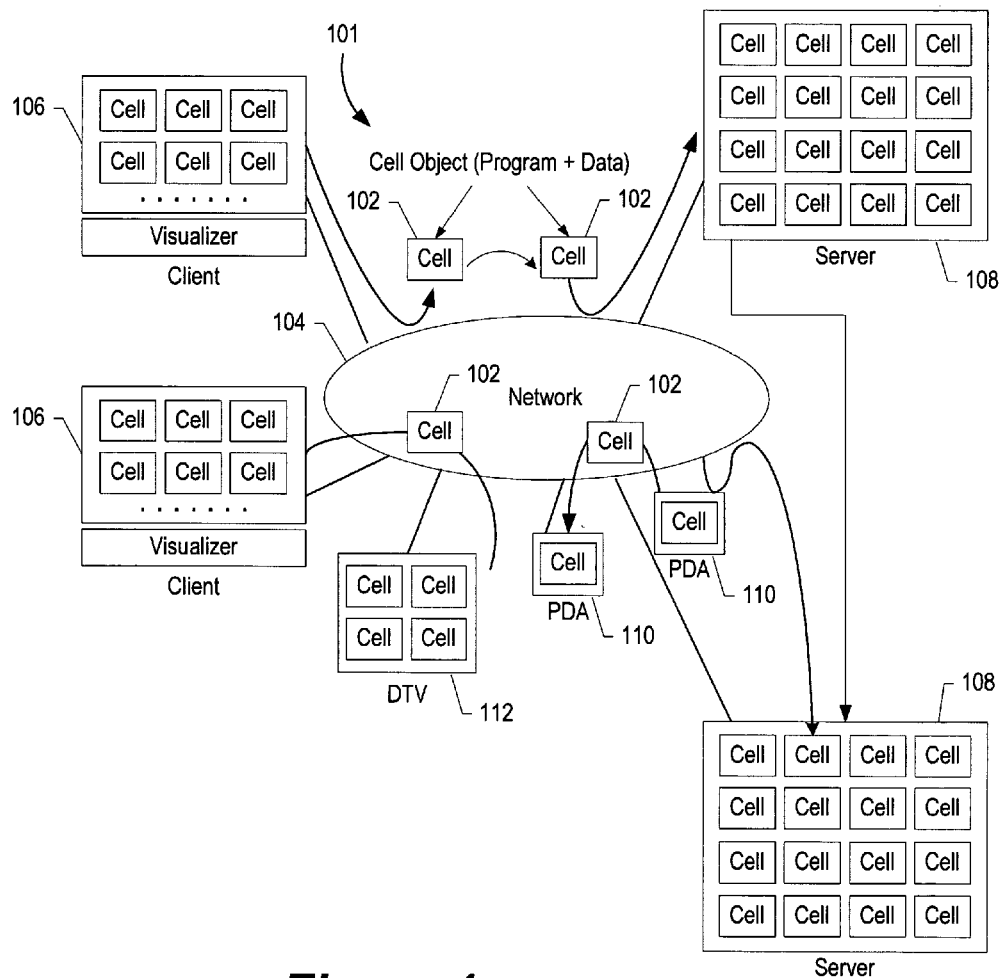
FIG. 1 illustrates -the overall architecture of a computer network in accordance with the present invention.

The overall architecture for a computer system 101 in accordance with the present invention is shown in FIG. 1.

As illustrated in this figure, system 101 includes network 104 to which is connected a plurality of computers and computing devices. Network 104 can be a LAN, a global network, such as the Internet, or any other computer network.

The computers and computing devices connected to network 104 (the network's "members") include, e.g., client computers 106, server computers 108, personal digital assistants (PDAs) 110, digital television (DTV) 112 and other wired or wireless computers and computing devices. The processors employed by the members of network 104 are constructed from the same common computing module. These processors also preferably all have the same ISA and perform processing in accordance with the same instruction set. The number of modules included within any particular processor depends upon the processing power required by that processor.

For example, since servers 108 of system 101 perform more processing of data and applications than clients 106, servers 108 contain more computing modules than clients 106. PDAs 110, on the other hand, perform the least amount of processing. PDAs 110, therefore, contain the smallest number of computing modules. DTV 112 performs a level of processing between that of clients 106 and servers 108. DTV 112, therefore, contains a number of computing modules between that of clients 106 and servers 108. As discussed below, each computing module contains a processing controller and a plurality of identical processing units for performing parallel processing of the data and applications transmitted over network 104.

This homogeneous configuration for system 101 facilitates adaptability, processing speed and processing efficiency. Because each member of system 101 performs processing using one or more (or some fraction) of the same computing module, the particular computer or computing device performing the actual processing of data and applications is unimportant. The processing of a particular application and data, moreover, can be shared among the network's members. By uniquely identifying the cells comprising the data and applications processed by system 101 throughout the system, the processing results can be transmitted to the computer or computing device requesting the processing regardless of where this processing occurred. Because the modules performing this processing have a common structure and employ a common ISA, the computational burdens of an added layer of software to achieve compatibility among the processors is avoided. This architecture and programming model facilitates the processing speed necessary to execute, e.g., real-time, multimedia applications.

To take further advantage of the processing speeds and efficiencies facilitated by system 101, the data and applications processed by this system are packaged into uniquely identified, uniformly formatted software cells 102. Each software cell 102 contains, or can contain, both applications and data. Each software cell also contains an ID to globally identify the cell throughout network 104 and system 101. This uniformity of structure for the software cells, and the software cells' unique identification throughout the network, facilitates the processing of applications and data on any computer or computing device of the network. For example, a client 106 may formulate a software cell 102 but, because of the limited processing capabilities of client 106, transmit this software cell to a server 108 for processing. Software cells can migrate, therefore, throughout network 104 for processing on the basis of the availability of processing resources on the network.

The homogeneous structure of processors and software cells of system 101 also avoids many of the problems of today's heterogeneous networks. For example, inefficient programming models which seek to permit processing of applications on any ISA using any instruction set, e.g., virtual machines such as the Java virtual machine, are avoided. System 101, therefore, can implement broadband processing far more effectively and efficiently than today's networks.

Figure 2:
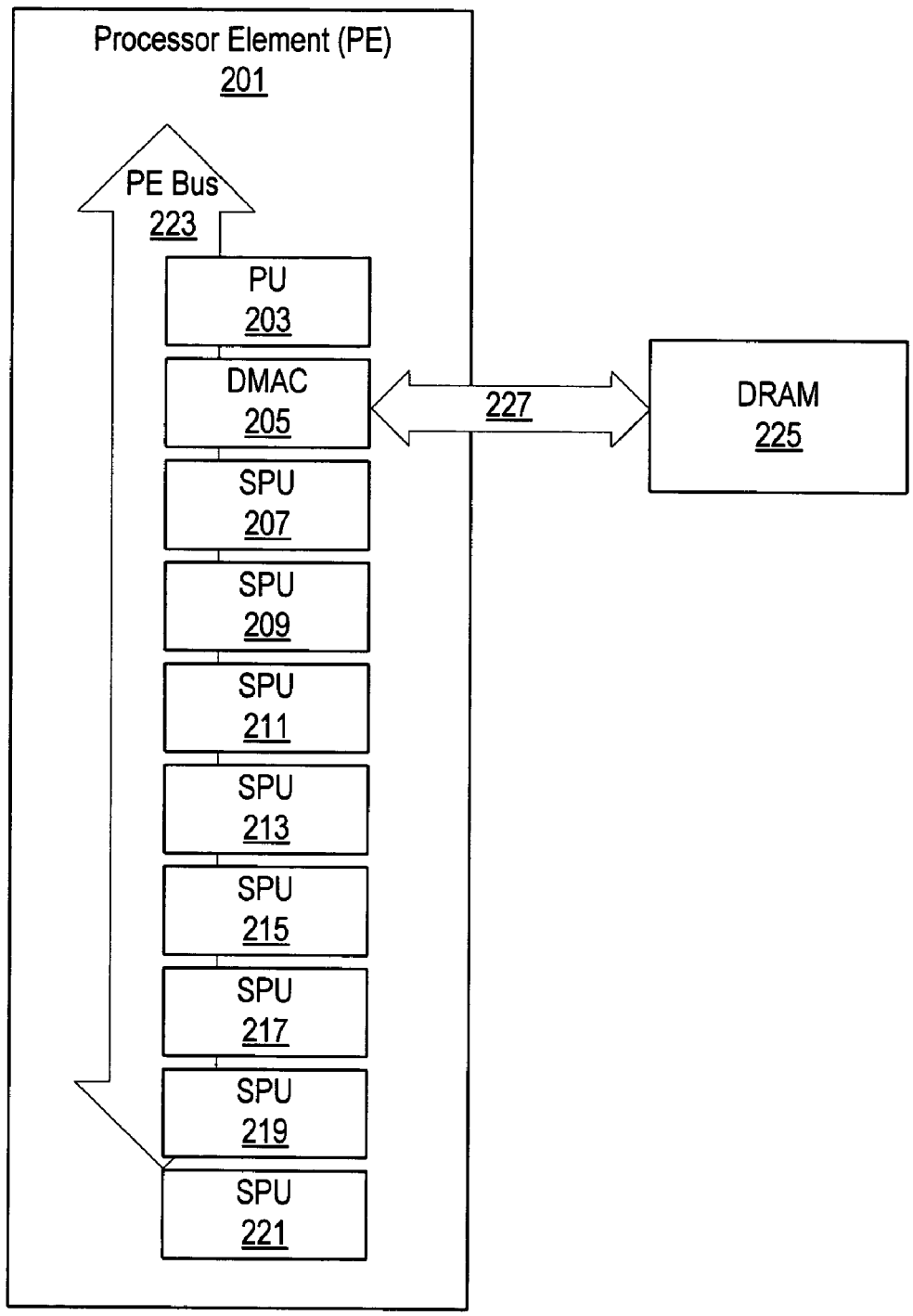
FIG. 2 is a diagram illustrating the structure of a processing unit (PU) in accordance with the present invention.

The basic processing module for all members of network 104 is the processing unit (PU). FIG. 2 illustrates the structure of a PU. As shown in this figure, PE 201 comprises a processing unit (PU) 203, a direct memory access controller (DMAC) 205 and a plurality of synergistic processing units (SPUs), namely, SPU 207, SPU 209, SPU 211, SPU 213, SPU 215, SPU 217, SPU 219 and SPU 221. A local PE bus 223 transmits data and applications among the SPUs, DMAC 205 and PU 203. Local PE bus 223 can have, e.g., a conventional architecture or be implemented as a packet switch network. Implementation as a packet switch network, while requiring more hardware, increases available bandwidth.

PE 201 can be constructed using various methods for implementing digital logic. PE 201 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. PE 201 also could be implemented using superconducting material, e.g., rapid single-flux-quantum (RSFQ) logic.

PE 201 is closely associated with a dynamic random access memory (DRAM) 225 through a high bandwidth memory connection 227. DRAM 225 functions as the main memory for PE 201. Although a DRAM 225 preferably is a dynamic random access memory, DRAM 225 could be implemented using other means, e.g., as a static random access memory (SRAM), a magnetic random access memory (MRAM), an optical memory or a holographic memory. DMAC 205 facilitates the transfer of data between DRAM 225 and the SPUs and PU of PE 201. As further discussed below, DMAC 205 designates for each SPU an exclusive area in DRAM 225 into which only the SPU can write data and from which only the SPU can read data. This exclusive area is designated a "sandbox."

PU 203 can be, e.g., a standard processor capable of stand-alone processing of data and applications. In operation, PU 203 schedules and orchestrates the processing of data and applications by the SPUs. The SPUs preferably are single instruction, multiple data (SIMD) processors. Under the control of PU 203, the SPUs perform the processing of these data and applications in a parallel and independent manner. DMAC 205 controls accesses by PU 203 and the SPUs to the data and applications stored in the shared DRAM 225. Although PE 201 preferably includes eight SPUs, a greater or lesser number of SPUs can be employed in a PU depending upon the processing power required. Also, a number of PUs, such as PE 201, may be joined or packaged together to provide enhanced processing power.

Figure 3:
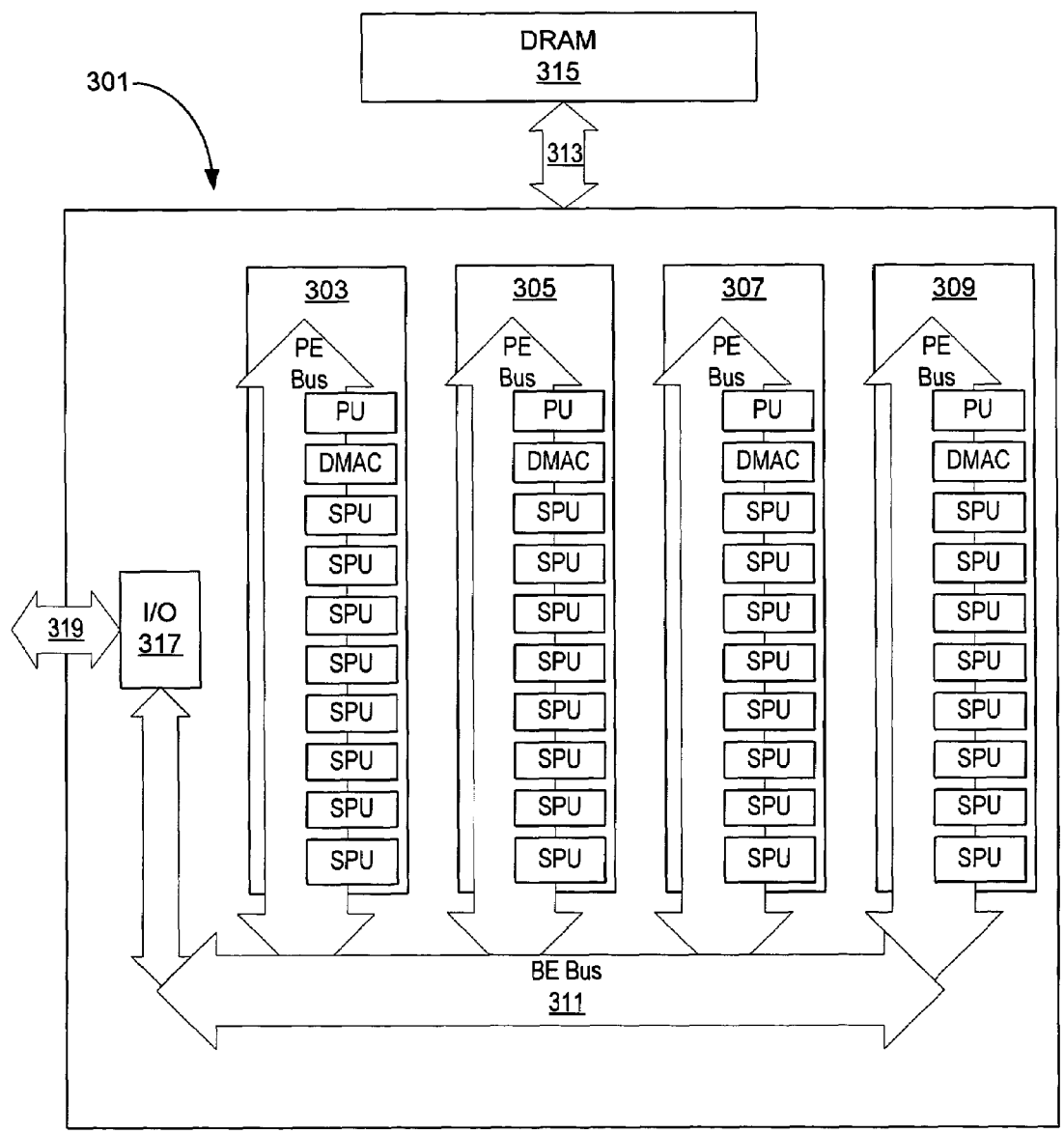
FIG. 3 is a diagram illustrating the structure of a broadband engine (BE) in accordance with the present invention.

For example, as shown in FIG. 3, four PUs may be packaged or joined together, e.g., within one or more chip packages, to form a single processor for a member of network 104. This configuration is designated a broadband engine (BE). As shown in FIG. 3, BE 301 contains four PUs, namely, PE 303, PE 305, PE 307 and PE 309. Communications among these PUs are over BE bus 311. Broad bandwidth memory connection 313 provides communication between shared DRAM 315 and these PUs. In lieu of BE bus 311, communications among the PUs of BE 301 can occur through DRAM 315 and this memory connection.

Input/output (I/O) interface 317 and external bus 319 provide communications between broadband engine 301 and the other members of network 104. Each PU of BE 301 performs processing of data and applications in a parallel and independent manner analogous to the parallel and independent processing of applications and data performed by the SPUs of a PU.

Figure 4:
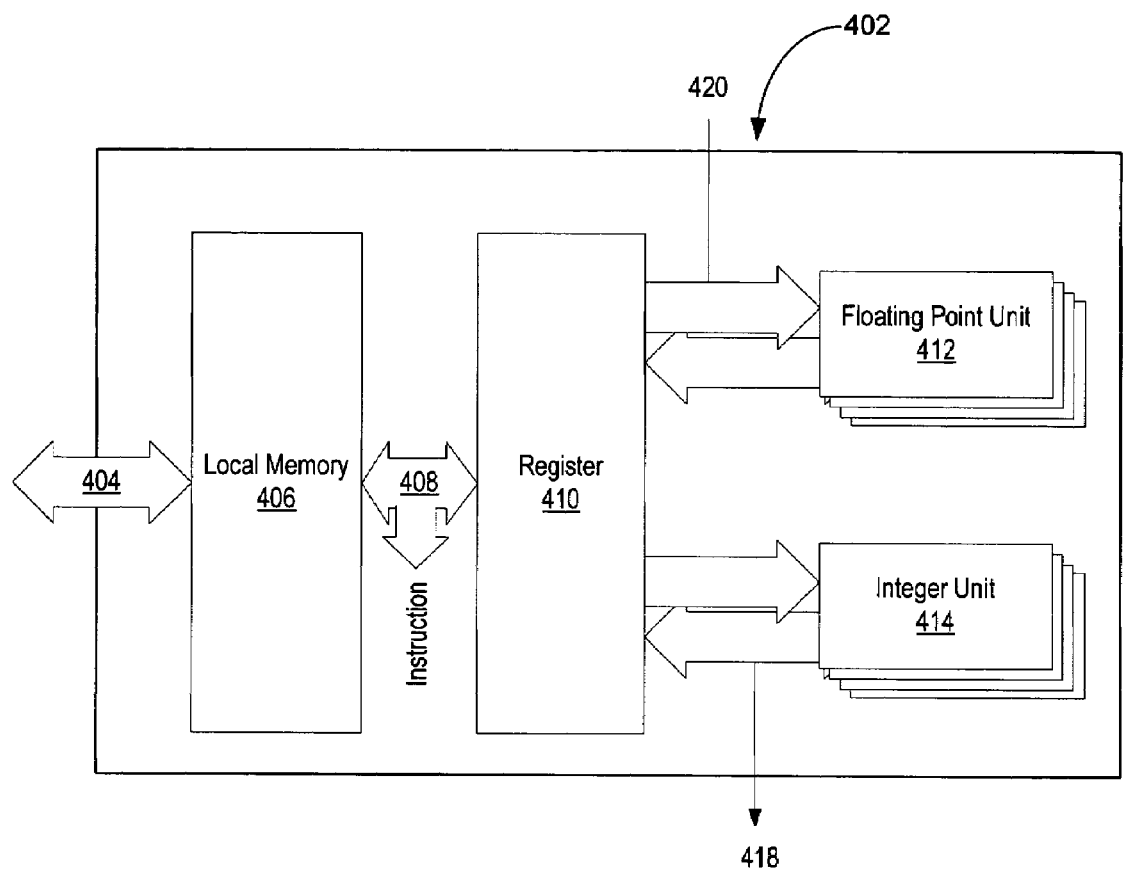
FIG. 4 is a diagram illustrating the structure of an synergistic processing unit (SPU) in accordance with the present invention.

FIG. 4 illustrates the structure of an SPU. SPU 402 includes local memory 406, registers 410, four floating point units 412 and four integer units 414. Again, however, depending upon the processing power required, a greater or lesser number of floating points units 412 and integer units 414 can be employed. In a preferred embodiment, local memory 406 contains 128 kilobytes of storage, and the capacity of registers 410 is 128.times.128 bits. Floating point units 412 preferably operate at a speed of 32 billion floating point operations per second (32 GFLOPS), and integer units 414 preferably operate at a speed of 32 billion operations per second (32 GOPS).

Local memory 406 is not a cache memory. Local memory 406 is preferably constructed as an SRAM. Cache coherency support for an SPU is unnecessary. A PU may require cache coherency support for direct memory accesses initiated by the PU. Cache coherency support is not required, however, for direct memory accesses initiated by an SPU or for accesses from and to external devices.

SPU 402 further includes bus 404 for transmitting applications and data to and from the SPU. In a preferred embodiment, this bus is 1,024 bits wide. SPU 402 further includes internal busses 408, 420 and 418. In a preferred embodiment, bus 408 has a width of 256 bits and provides communications between local memory 406 and registers 410. Busses 420 and 418 provide communications between, respectively, registers 410 and floating point units 412, and registers 410 and integer units 414. In a preferred embodiment, the width of busses 418 and 420 from registers 410 to the floating point or integer units is 384 bits, and the width of busses 418 and 420 from the floating point or integer units to registers 410 is 128 bits. The larger width of these busses from registers 410 to the floating point or integer units than from these units to registers 410 accommodates the larger data flow from registers 410 during processing. A maximum of three words are needed for each calculation. The result of each calculation, however, normally is only one word.

Figure 5:
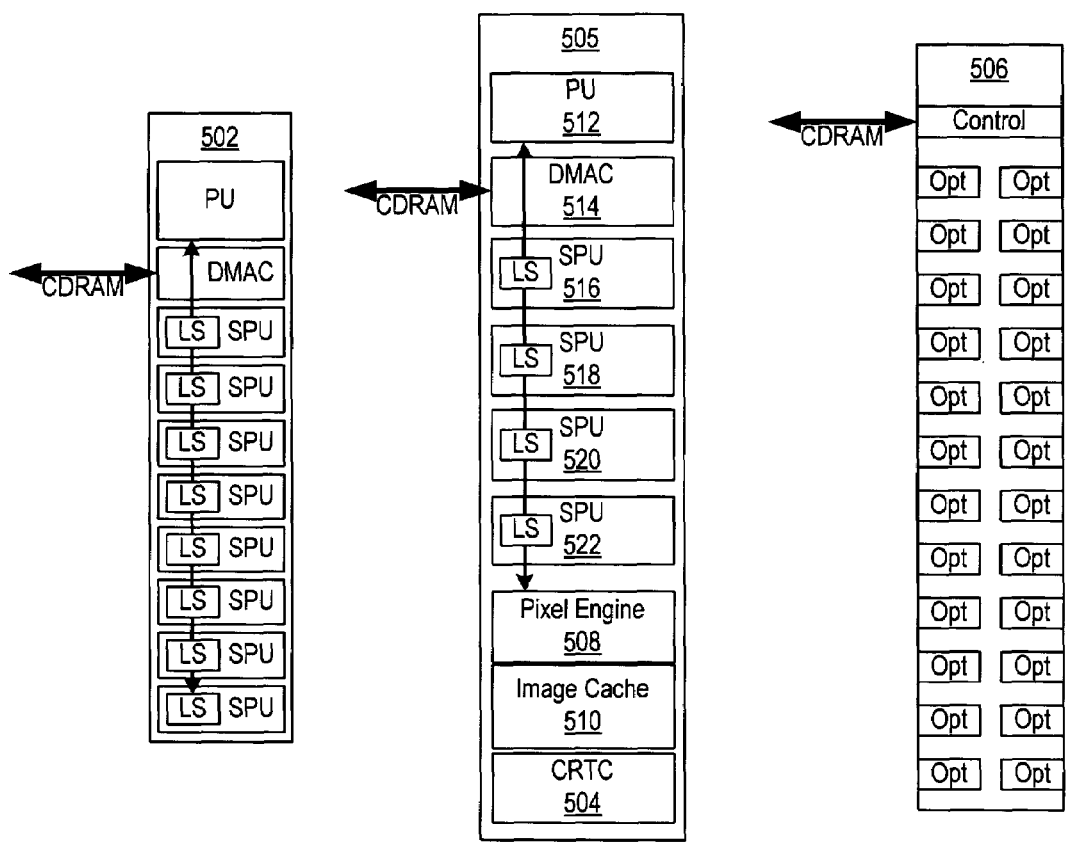
FIG. 5 is a diagram illustrating the structure of a processing unit, visualizer (VS) and an optical interface in accordance with the present invention.
Figure 6:
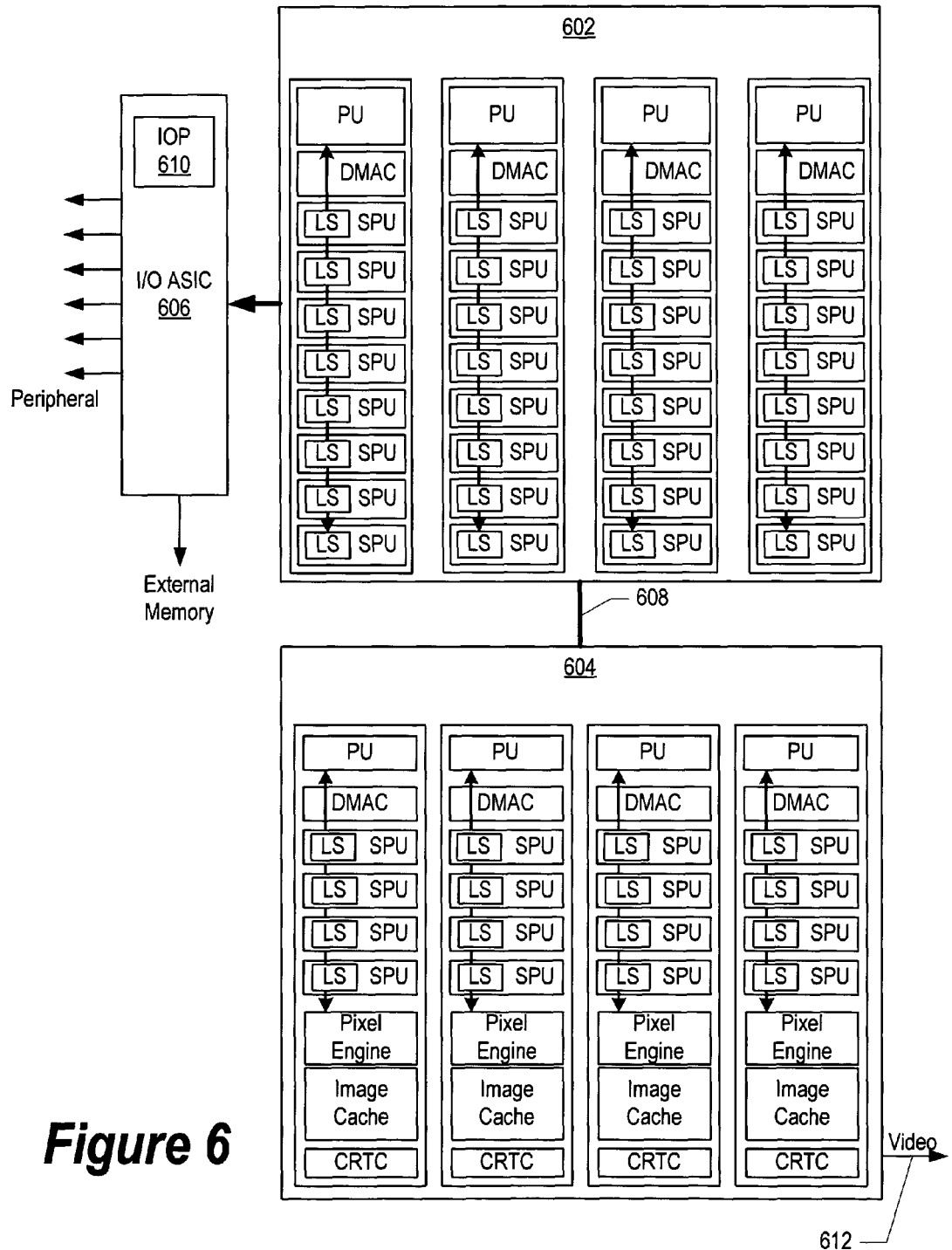
FIG. 6 is a diagram illustrating one combination of processing units in accordance with the present invention.

FIGS. 5-10 further illustrate the modular structure of the processors of the members of network 104. For example, as shown in FIG. 5, a processor may comprise a single PU 502. As discussed above, this PU typically comprises a PU, DMAC and eight SPUs. Each SPU includes local storage (LS). On the other hand, a processor may comprise the structure of visualizer (VS) 505. As shown in FIG. 5, VS 505 comprises PU 512, DMAC 514 and four SPUs, namely, SPU 516, SPU 518, SPU 520 and SPU 522. The space within the chip package normally occupied by the other four SPUs of a PU is occupied in this case by pixel engine 508, image cache 510 and cathode ray tube controller (CRTC) 504. Depending upon the speed of communications required for PU 502 or VS 505, optical interface 506 also may be included on the chip package.

Using this standardized, modular structure, numerous other variations of processors can be constructed easily and efficiently. For example, the processor shown in FIG. 6 comprises two chip packages, namely, chip package 602 comprising a BE and chip package 604 comprising four VSs. Input/output (I/O) 606 provides an interface between the BE of chip package 602 and network 104. Bus 608 provides communications between chip package 602 and chip package 604. Input output processor (IOP) 610 controls the flow of data into and out of I/O 606. I/O 606 may be fabricated as an application specific integrated circuit (ASIC). The output from the VSs is video signal 612.

Figure 7:
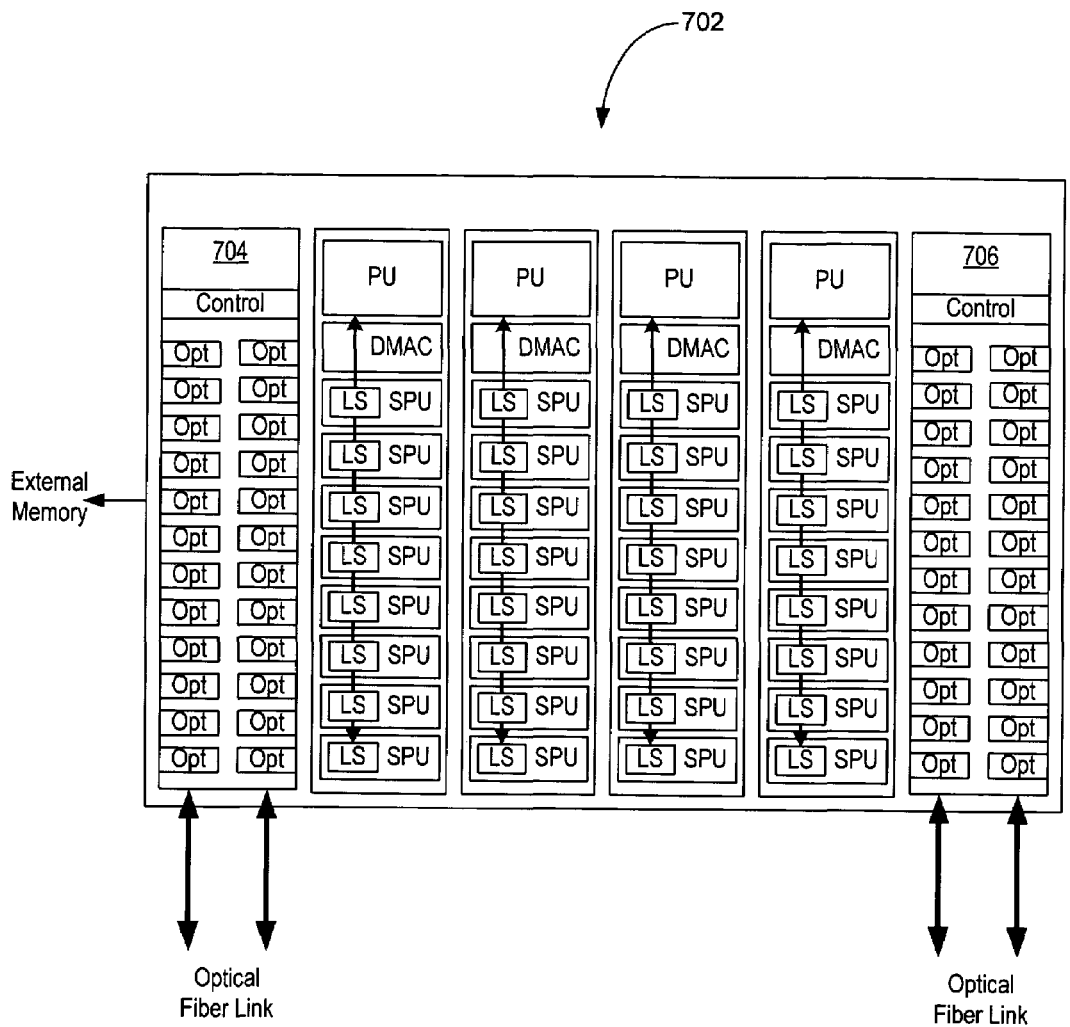
FIG. 7 illustrates another combination of processing units in accordance with the present invention.

FIG. 7 illustrates a chip package for a BE 702 with two optical interfaces 704 and 706 for providing ultra high speed communications to the other members of network 104 (or other chip packages locally connected). BE 702 can function as, e.g., a server on network 104.

Figure 8:
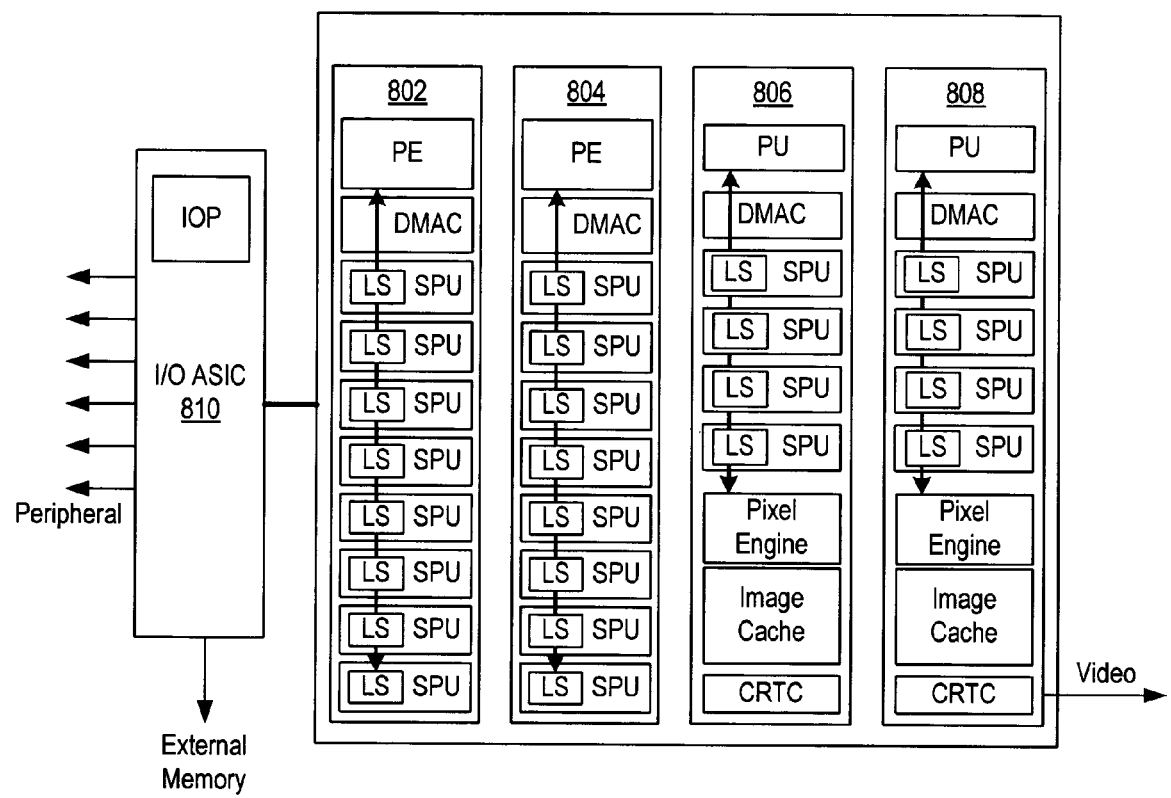
FIG. 8 illustrates yet another combination of processing units in accordance with the present invention.

The chip package of FIG. 8 comprises two PEs 802 and 804 and two VSs 806 and 808. An I/O 810 provides an interface between the chip package and network 104. The output from the chip package is a video signal. This configuration may function as, e.g., a graphics work station.

Figure 9:
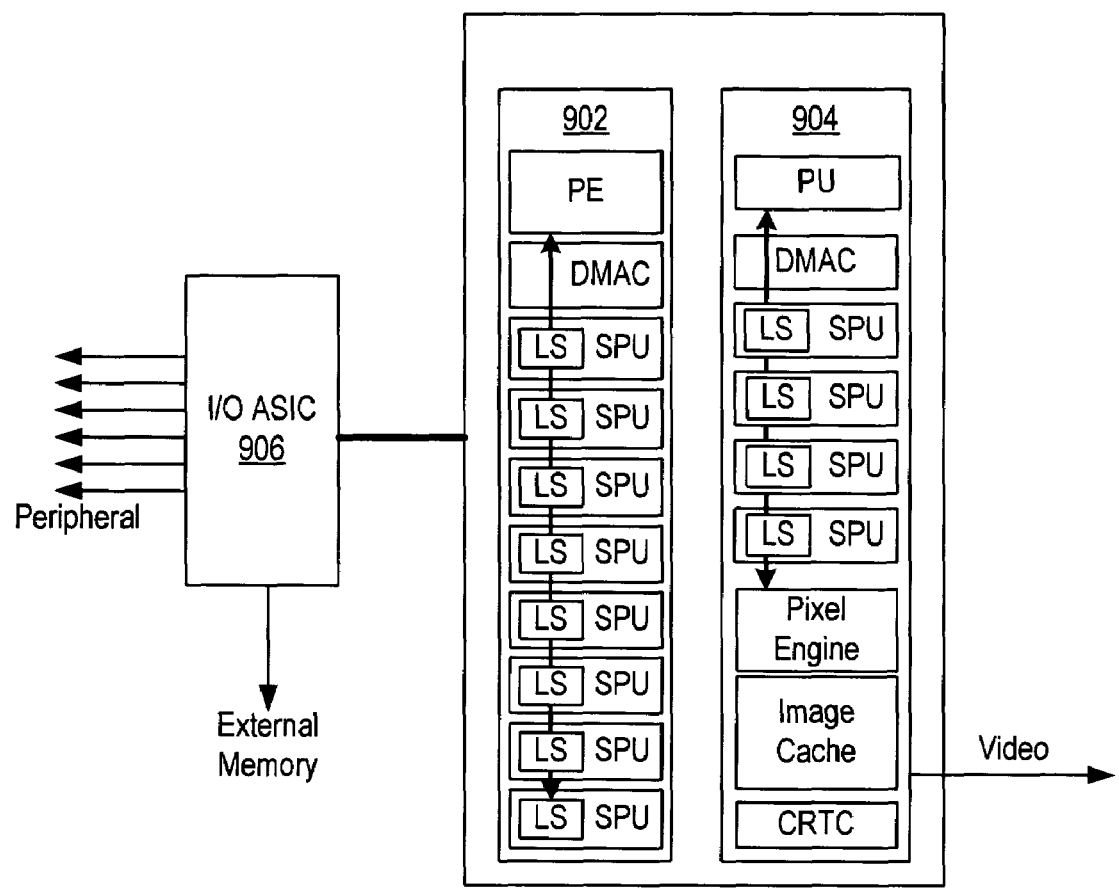
FIG. 9 illustrates yet another combination of processing units in accordance with the present invention.

FIG. 9 illustrates yet another configuration. This configuration contains one-half of the processing power of the configuration illustrated in FIG. 8. Instead of two PUs, one PE 902 is provided, and instead of two VSs, one VS 904 is provided. I/O 906 has one-half the bandwidth of the I/O illustrated in FIG. 8. Such a processor also may function, however, as a graphics work station.

Figure 10:
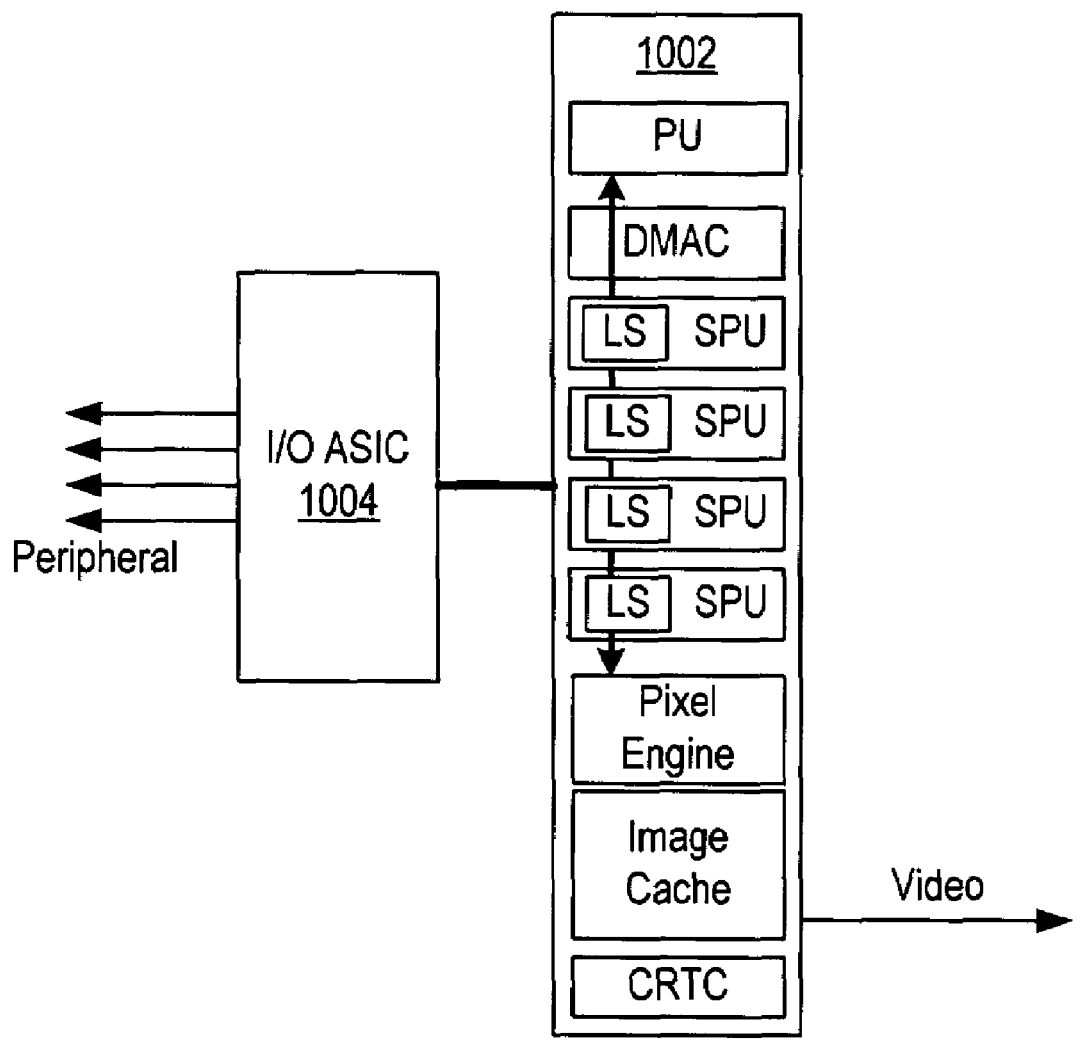
FIG. 10 illustrates yet another combination of processing units in accordance with the present invention.

A final configuration is shown in FIG. 10. This processor consists of only a single VS 1002 and an I/O 1004. This configuration may function as, e.g., a PDA.

Figure 11A:
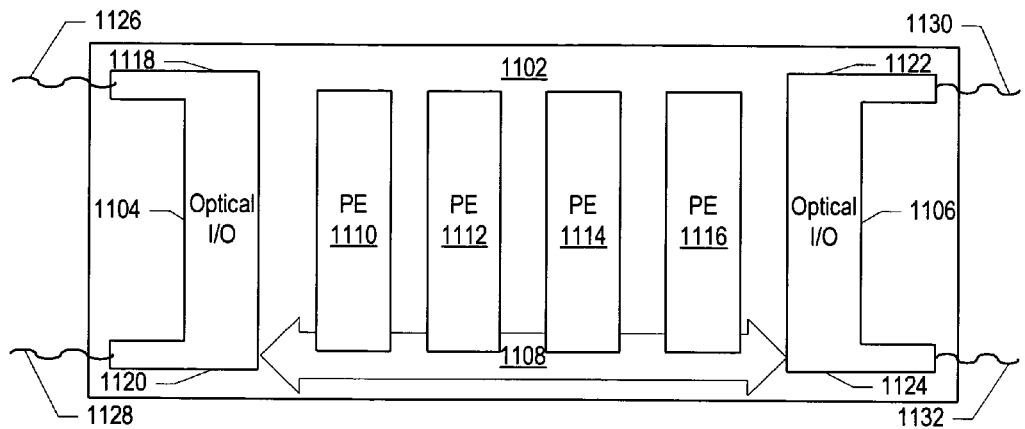
FIG. 11A illustrates the integration of optical interfaces within a chip package in accordance with the present invention.
Figure 11B:
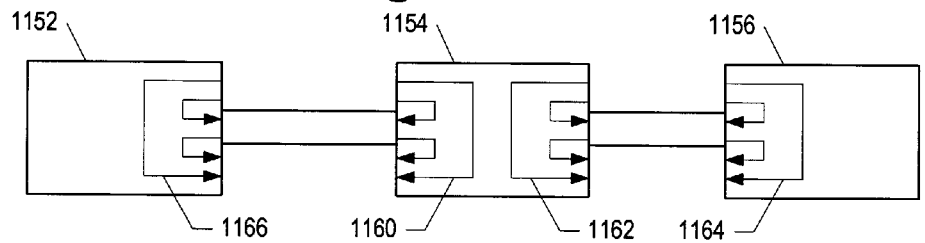
FIG. 11B is a diagram of one configuration of processors using the optical interfaces of FIG. 11A.

FIG. 11A illustrates the integration of optical interfaces into a chip package of a processor of network 104. These optical interfaces convert optical signals to electrical signals and electrical signals to optical signals and can be constructed from a variety of materials including, e.g., gallium arsinide, aluminum gallium arsinide, germanium and other elements or compounds. As shown in this figure, optical interfaces 1104 and 1106 are fabricated on the chip package of BE 1102. BE bus 1108 provides communication among the PUs of BE 1102, namely, PE 1110, PE 1112, PE 1114, PE 1116, and these optical interfaces. Optical interface 1104 includes two ports, namely, port 1118 and port 1120, and optical interface 1106 also includes two ports, namely, port 1122 and port 1124. Ports 1118, 1120, 1122 and 1124 are connected to, respectively, optical wave guides 1126, 1128, 1130 and 1132. Optical signals are transmitted to and from BE 1102 through these optical wave guides via the ports of optical interfaces 1104 and 1106.

plurality of BEs can be connected together in various configurations using such optical wave guides and the four optical ports of each BE. For example, as shown in FIG. 11B, two or more BEs, e.g., BE 1152, BE 1154 and BE 1156, can be connected serially through such optical ports. In this example, optical interface 1166 of BE 1152 is connected through its optical ports to the optical ports of optical interface 1160 of BE 1154. In a similar manner, the optical ports of optical interface 1162 on BE 1154 are connected to the optical ports of optical interface 1164 of BE 1156.

Figure 11C:
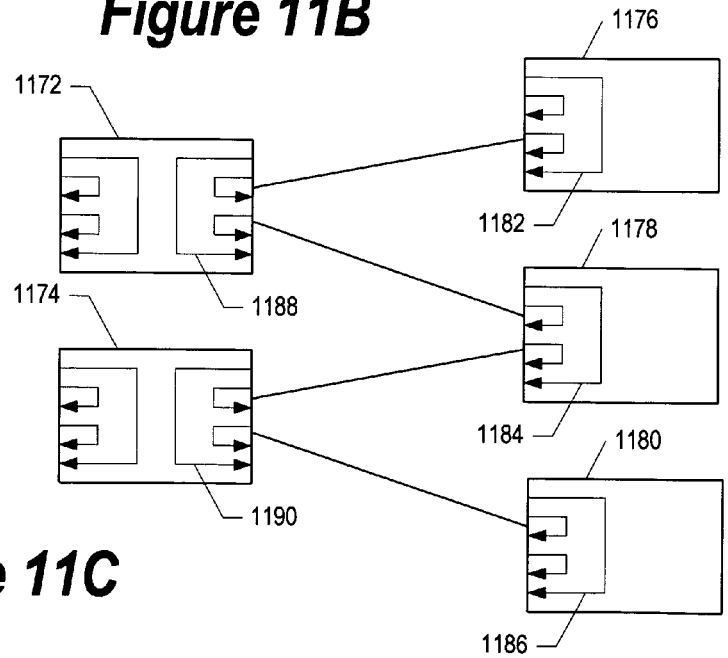
FIG. 11C is a diagram of another configuration of processors using the optical interfaces of FIG. 11A.

A matrix configuration is illustrated in FIG. 11C. In this configuration, the optical interface of each BE is connected to two other BEs. As shown in this figure, one of the optical ports of optical interface 1188 of BE 1172 is connected to an optical port of optical interface 1182 of BE 1176. The other optical port of optical interface 1188 is connected to an optical port of optical interface 1184 of BE 1178. In a similar manner, one optical port of optical interface 1190 of BE 1174 is connected to the other optical port of optical interface 1184 of BE 1178. The other optical port of optical interface 1190 is connected to an optical port of optical interface 1186 of BE 1180. This matrix configuration can be extended in a similar manner to other BEs.

Using either a serial configuration or a matrix configuration, a processor for network 104 can be constructed of any desired size and power. Of course, additional ports can be added to the optical interfaces of the BEs, or to processors having a greater or lesser number of PUs than a BE, to form other configurations.

Figure 12A:
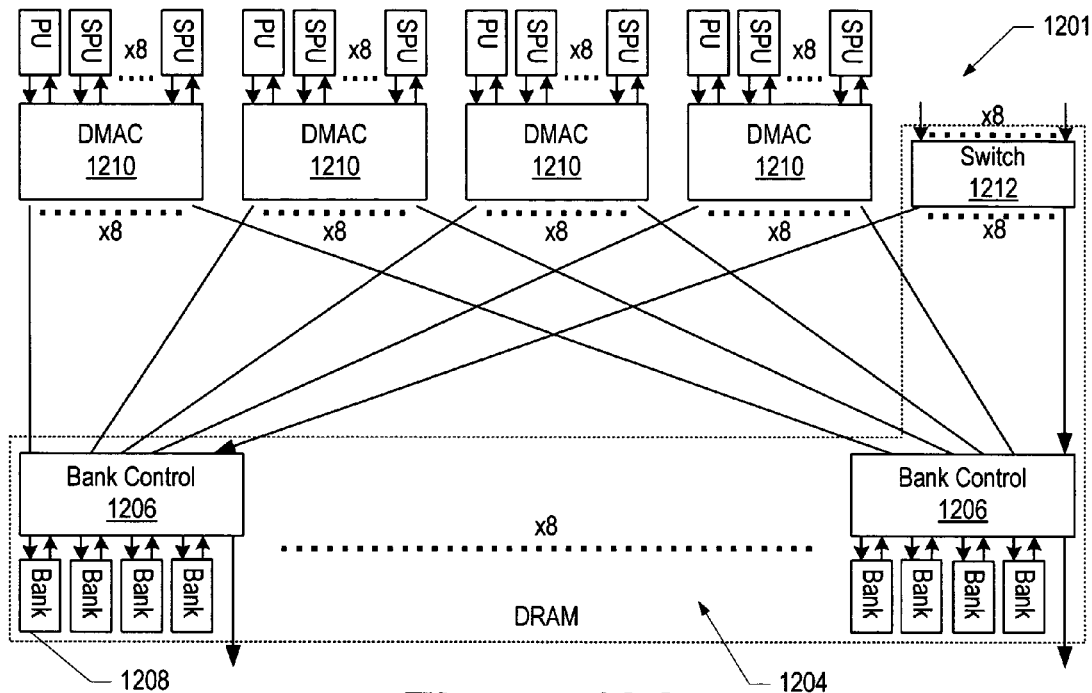
FIG. 12A illustrates the structure of a memory system in accordance with the present invention.

FIG. 12A illustrates the control system and structure for the DRAM of a BE. A similar control system and structure is employed in processors having other sizes and containing more or less PUs. As shown in this figure, a cross-bar switch connects each DMAC 1210 of the four PUs comprising BE 1201 to eight bank controls 1206. Each bank control 1206 controls eight banks 1208 (only four are shown in the figure) of DRAM 1204. DRAM 1204, therefore, comprises a total of sixty-four banks. In a preferred embodiment, DRAM 1204 has a capacity of 64 megabytes, and each bank has a capacity of 1 megabyte. The smallest addressable unit within each bank, in this preferred embodiment, is a block of 1024 bits.

BE 1201 also includes switch unit 1212. Switch unit 1212 enables other SPUs on BEs closely coupled to BE 1201 to access DRAM 1204. A second BE, therefore, can be closely coupled to a first BE, and each SPU of each BE can address twice the number of memory locations normally accessible to an SPU. The direct reading or writing of data from or to the DRAM of a first BE from or to the DRAM of a second BE can occur through a switch unit such as switch unit 1212.

Figure 12B:
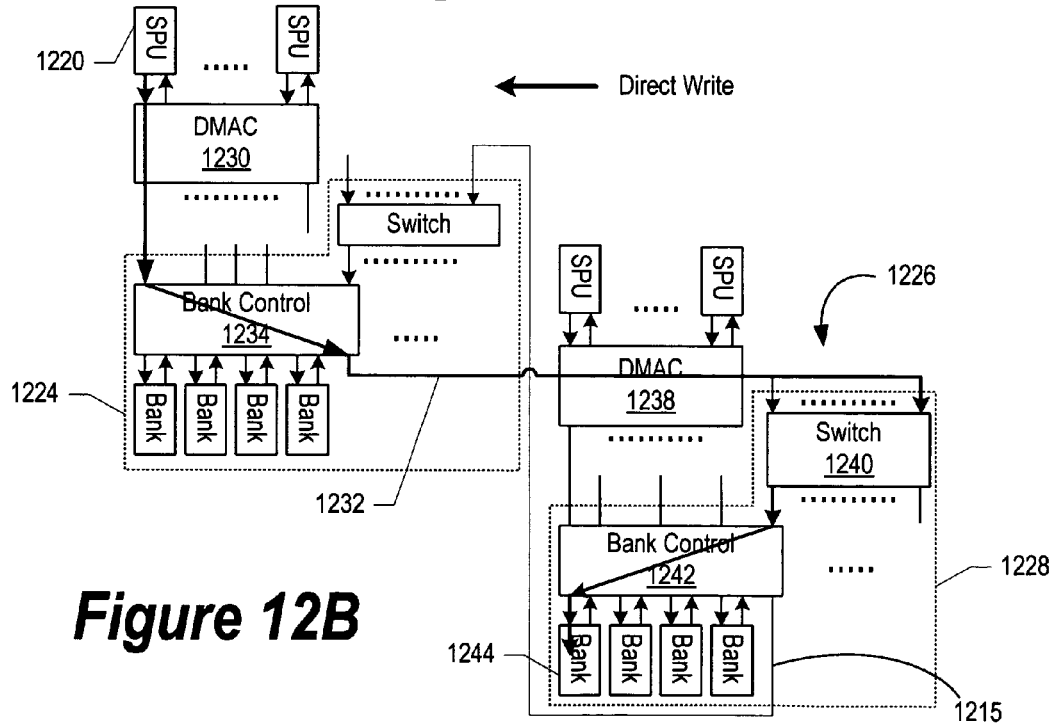
FIG. 12B illustrates the writing of data from a first broadband engine to a second broadband engine in accordance with the present invention.

For example, as shown in FIG. 12B, to accomplish such writing, the SPU of a first BE, e.g., SPU 1220 of BE 1222, issues a write command to a memory location of a DRAM of a second BE, e.g., DRAM 1228 of BE 1226 (rather than, as in the usual case, to DRAM 1224 of BE 1222). DMAC 1230 of BE 1222 sends the write command through cross-bar switch 1221 to bank control 1234, and bank control 1234 transmits the command to an external port 1232 connected to bank control 1234. DMAC 1238 of BE 1226 receives the write command and transfers this command to switch unit 1240 of BE 1226. Switch unit 1240 identifies the DRAM address contained in the write command and sends the data for storage in this address through bank control 1242 of BE 1226 to bank 1244 of DRAM 1228. Switch unit 1240, therefore, enables both DRAM 1224 and DRAM 1228 to function as a single memory space for the SPUs of BE 1226.

Figure 13:
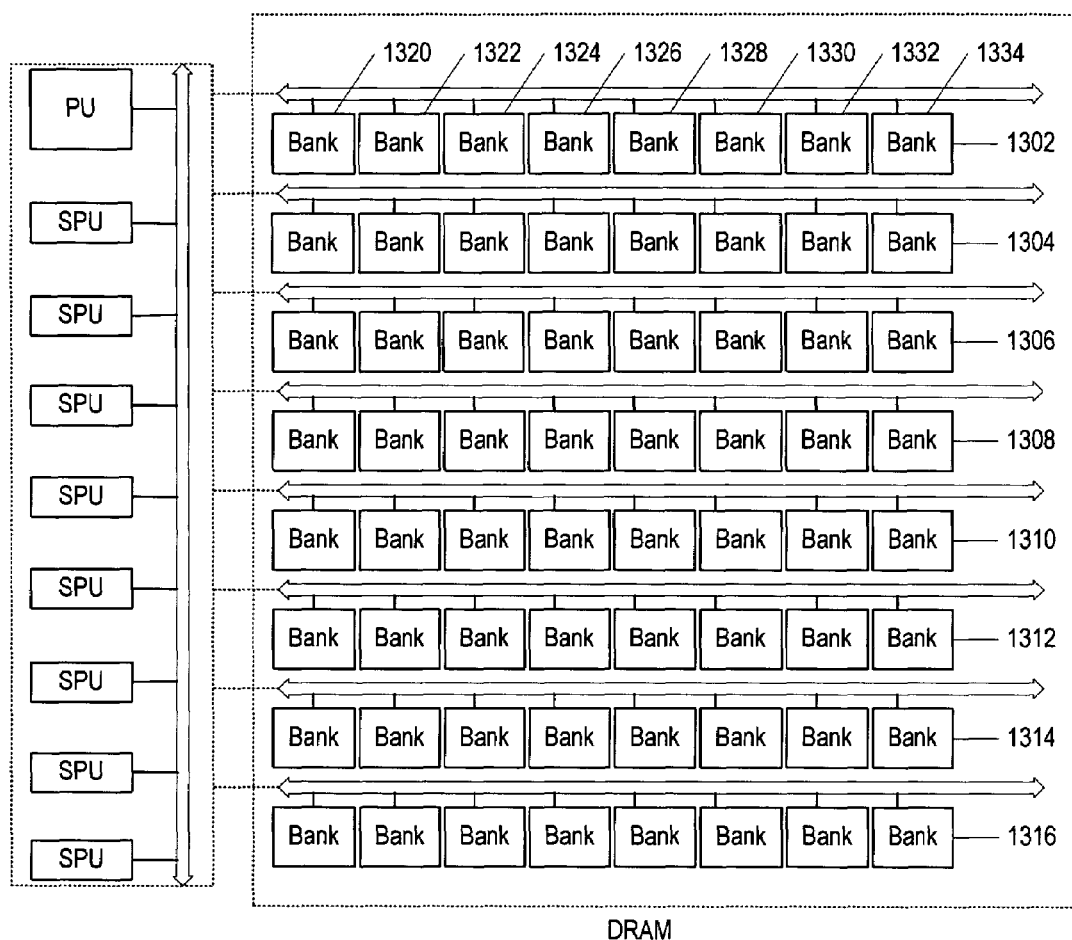
FIG. 13 is a diagram of the structure of a shared memory for a processing unit in accordance with the present invention.

FIG. 13 shows the configuration of the sixty-four banks of a DRAM. These banks are arranged into eight rows, namely, rows 1302, 1304, 1306, 1308, 1310, 1312, 1314 and 1316 and eight columns, namely, columns 1320, 1322, 1324, 1326, 1328, 1330, 1332 and 1334. Each row is controlled by a bank controller. Each bank controller, therefore, controls eight megabytes of memory.

Figure 14A:
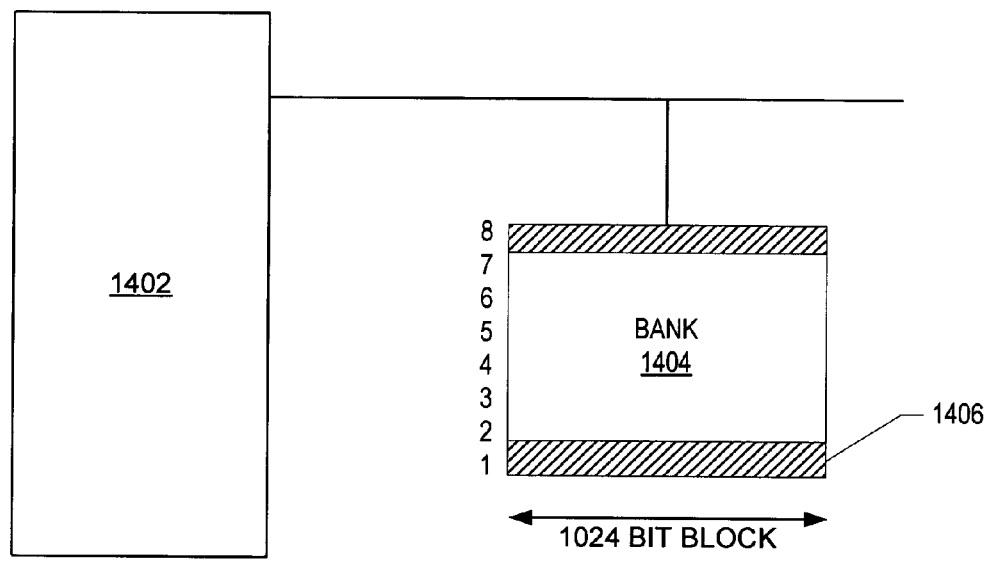
FIG. 14A illustrates one structure for a bank of the memory shown in FIG. 13.
Figure 14B:
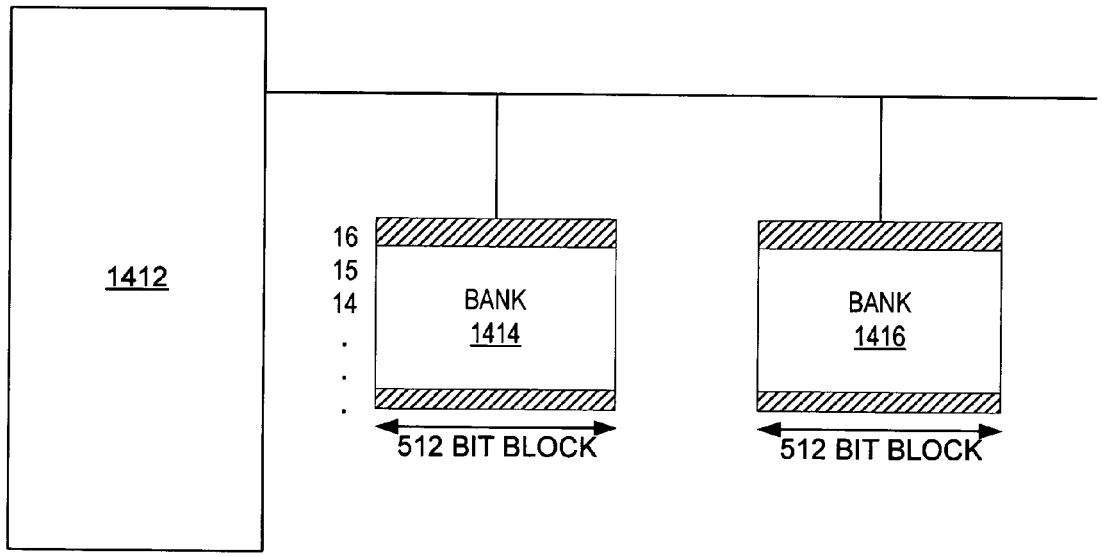
FIG. 14B illustrates another structure for a bank of the memory shown in FIG. 13.

FIGS. 14A and 14B illustrate different configurations for storing and accessing the smallest addressable memory unit of a DRAM, e.g., a block of 1024 bits. In FIG. 14A, DMAC 1402 stores in a single bank 1404 eight 1024 bit blocks 1406. In FIG. 14B, on the other hand, while DMAC 1412 reads and writes blocks of data containing 1024 bits, these blocks are interleaved between two banks, namely, bank 1414 and bank 1416. Each of these banks, therefore, contains sixteen blocks of data, and each block of data contains 512 bits. This interleaving can facilitate faster accessing of the DRAM and is useful in the processing of certain applications.

Figure 15:
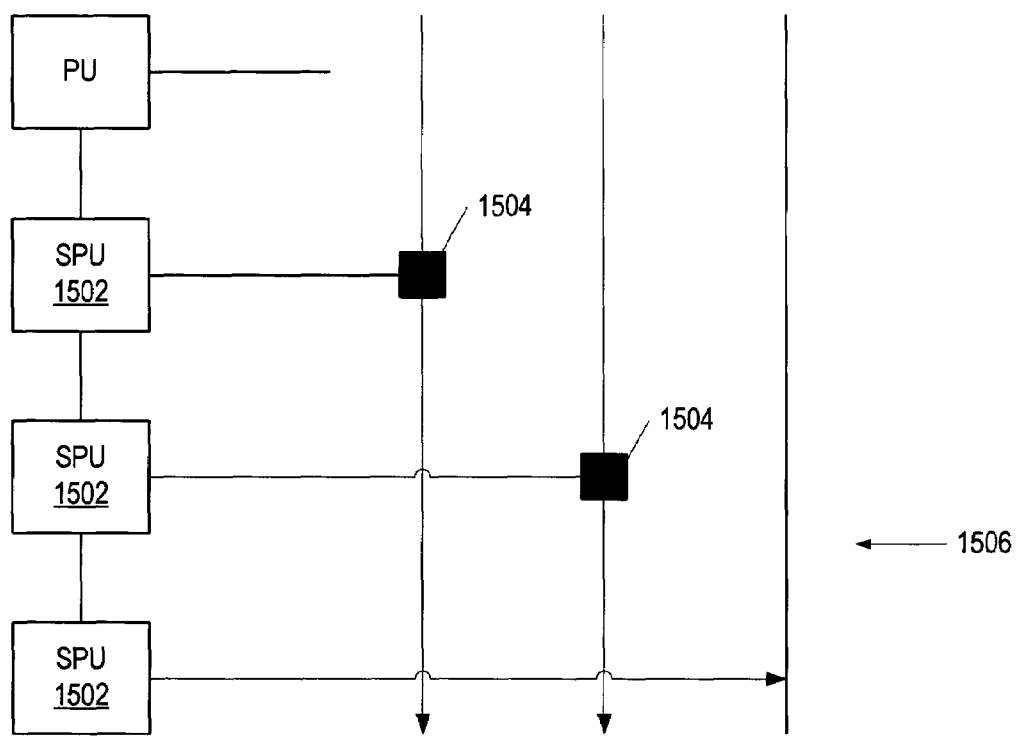
FIG. 15 illustrates a structure for a direct memory access controller in accordance with the present invention.

FIG. 15 illustrates the architecture for a DMAC 1504 within a PE. As illustrated in this figure, the structural hardware comprising DMAC 1506 is distributed throughout the PE such that each SPU 1502 has direct access to a structural node 1504 of DMAC 1506. Each node executes the logic appropriate for memory accesses by the SPU to which the node has direct access.

Figure 16:
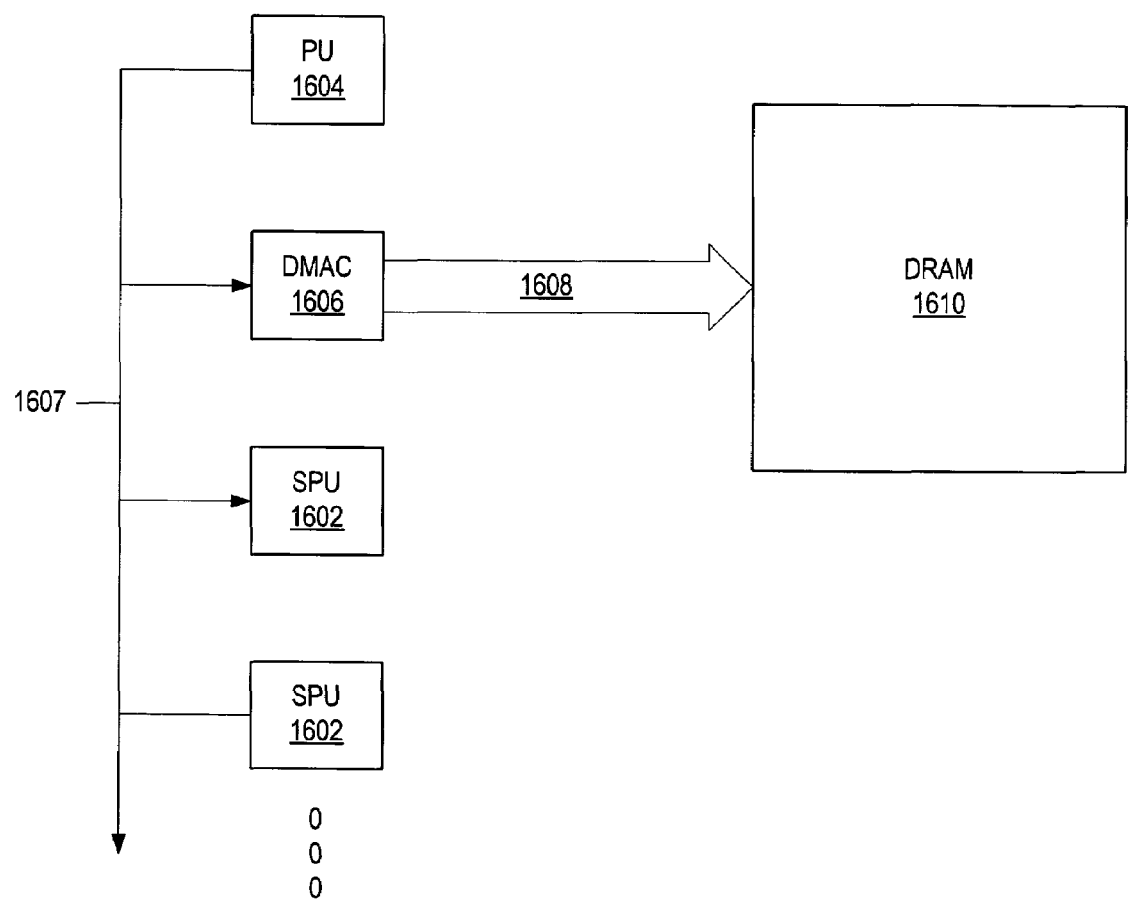
FIG. 16 illustrates an alternative structure for a direct memory access controller in accordance with the present invention.

FIG. 16 shows an alternative embodiment of the DMAC, namely, a non-distributed architecture. In this case, the structural hardware of DMAC 1606 is centralized. SPUs 1602 and PU 1604 communicate with DMAC 1606 via local PE bus 1607. DMAC 1606 is connected through a cross-bar switch to a bus 1608. Bus 1608 is connected to DRAM 1610.

As discussed above, all of the multiple SPUs of a PU can independently access data in the shared DRAM. As a result, a first SPU could be operating upon particular data in its local storage at a time during which a second SPU requests these data. If the data were provided to the second SPU at that time from the shared DRAM, the data could be invalid because of the first SPU's ongoing processing which could change the data's value. If the second processor received the data from the shared DRAM at that time, therefore, the second processor could generate an erroneous result. For example, the data could be a specific value for a global variable. If the first processor changed that value during its processing, the second processor would receive an outdated value. A scheme is necessary, therefore, to synchronize the SPUs' reading and writing of data from and to memory locations within the shared DRAM. This scheme must prevent the reading of data from a memory location upon which another SPU currently is operating in its local storage and, therefore, which are not current, and the writing of data into a memory location storing current data.

To overcome these problems, for each addressable memory location of the DRAM, an additional segment of memory is allocated in the DRAM for storing status information relating to the data stored in the memory location. This status information includes a full/empty (F/E) bit, the identification of an SPU (SPU ID) requesting data from the memory location and the address of the SPU's local storage (LS address) to which the requested data should be read. An addressable memory location of the DRAM can be of any size. In a preferred embodiment, this size is 1024 bits.

The setting of the F/E bit to 1 indicates that the data stored in the associated memory location are current. The setting of the F/E bit to 0, on the other hand, indicates that the data stored in the associated memory location are not current. If an SPU requests the data when this bit is set to 0, the SPU is prevented from immediately reading the data. In this case, an SPU ID identifying the SPU requesting the data, and an LS address identifying the memory location within the local storage of this SPU to which the data are to be read when the data become current, are entered into the additional memory segment.

An additional memory segment also is allocated for each memory location within the local storage of the SPUs. This additional memory segment stores one bit, designated the "busy bit." The busy bit is used to reserve the associated LS memory location for the storage of specific data to be retrieved from the DRAM. If the busy bit is set to 1 for a particular memory location in local storage, the SPU can use this memory location only for the writing of these specific data. On the other hand, if the busy bit is set to 0 for a particular memory location in local storage, the SPU can use this memory location for the writing of any data.

Examples of the manner in which the F/E bit, the SPU ID, the LS address and the busy bit are used to synchronize the reading and writing of data from and to the shared DRAM of a PU are illustrated in FIGS. 17-31.

Figure 17:
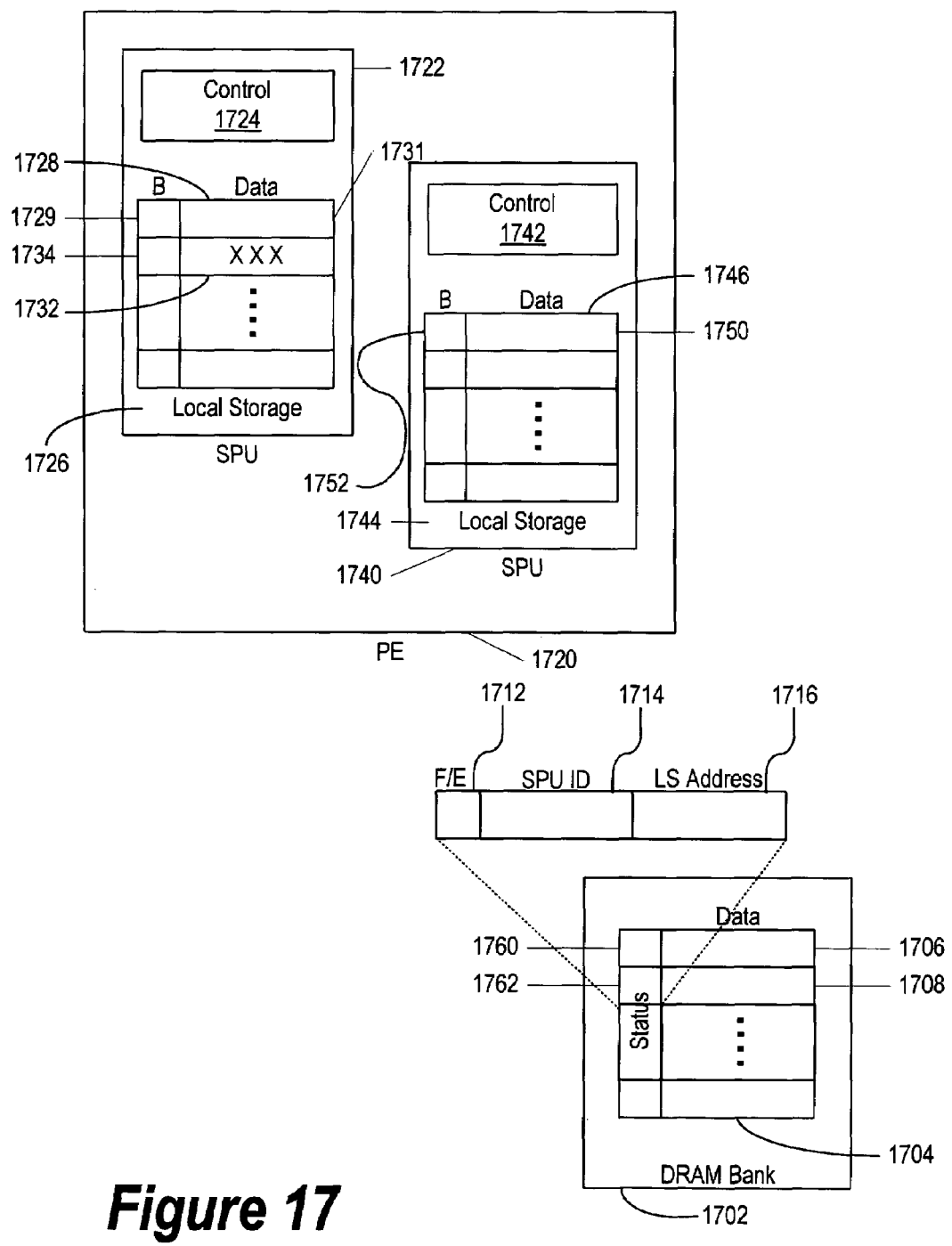
FIGS. 17-31 illustrate the operation of data synchronization in accordance with the present invention.

As shown in FIG. 17, one or more PUs, e.g., PE 1720, interact with DRAM 1702. PE 1720 includes SPU 1722 and SPU 1740. SPU 1722 includes control logic 1724, and SPU 1740 includes control logic 1742. SPU 1722 also includes local storage 1726. This local storage includes a plurality of addressable memory locations 1728. SPU 1740 includes local storage 1744, and this local storage also includes a plurality of addressable memory locations 1746. All of these addressable memory locations preferably are 1024 bits in size.

An additional segment of memory is associated with each LS addressable memory location. For example, memory segments 1729 and 1734 are associated with, respectively, local memory locations 1731 and 1732, and memory segment 1752 is associated with local memory location 1750. A "busy bit," as discussed above, is stored in each of these additional memory segments. Local memory location 1732 is shown with several Xs to indicate that this location contains data.

DRAM 1702 contains a plurality of addressable memory locations 1704, including memory locations 1706 and 1708. These memory locations preferably also are 1024 bits in size. An additional segment of memory also is associated with each of these memory locations. For example, additional memory segment 1760 is associated with memory location 1706, and additional memory segment 1762 is associated with memory location 1708. Status information relating to the data stored in each memory location is stored in the memory segment associated with the memory location. This status information includes, as discussed above, the F/E bit, the SPU ID and the LS address. For example, for memory location 1708, this status information includes F/E bit 1712, SPU ID 1714 and LS address 1716.

Using the status information and the busy bit, the synchronized reading and writing of data from and to the shared DRAM among the SPUs of a PU, or a group of PUs, can be achieved.

Figure 18:
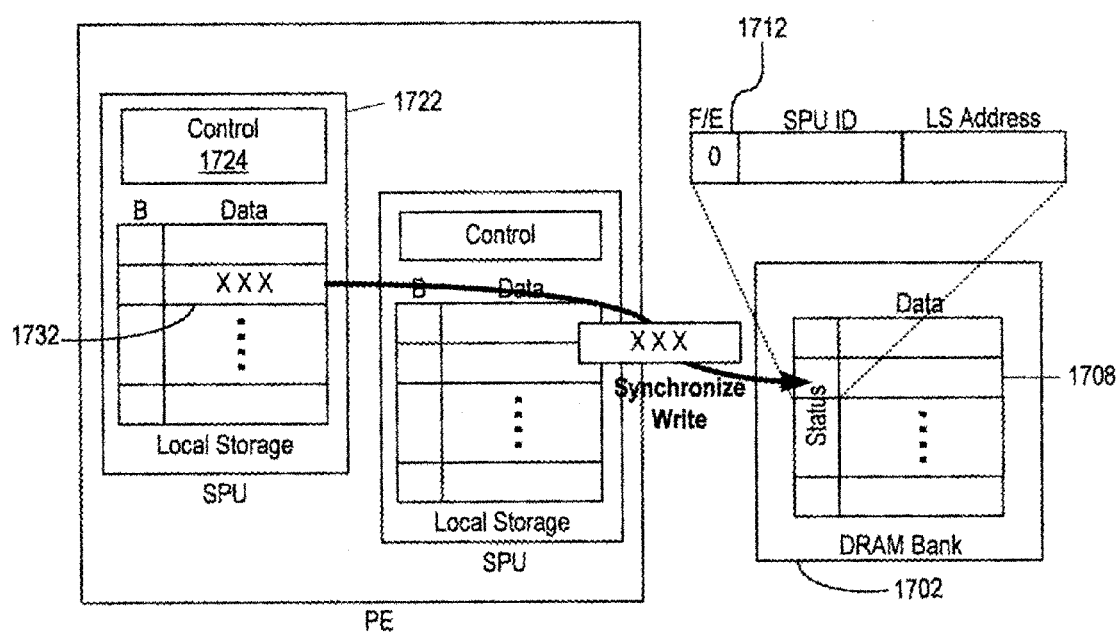

FIG. 18 illustrates the initiation of the synchronized writing of data from LS memory location 1732 of SPU 1722 to memory location 1708 of DRAM 1702. Control 1724 of SPU 1722 initiates the synchronized writing of these data. Since memory location 1708 is empty, F/E bit 1712 is set to 0. As a result, the data in LS location 1732 can be written into memory location 1708. If this bit were set to 1 to indicate that memory location 1708 is full and contains current, valid data, on the other hand, control 1722 would receive an error message and be prohibited from writing data into this memory location.

Figure 19:
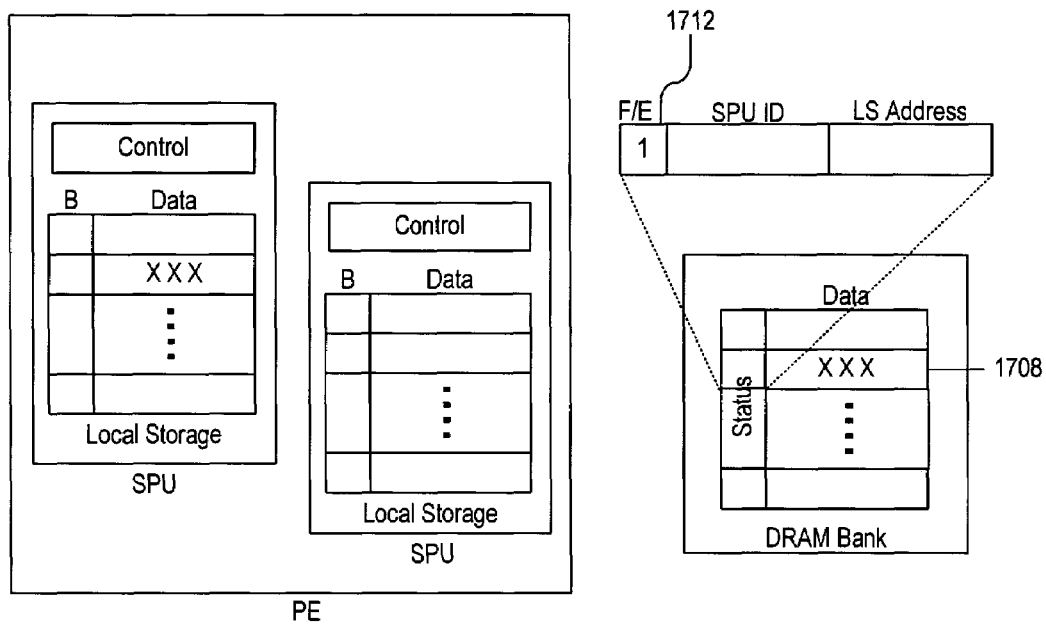

The result of the successful synchronized writing of the data into memory location 1708 is shown in FIG. 19. The written data are stored in memory location 1708, and F/E bit 1712 is set to 1. This setting indicates that memory location 1708 is full and that the data in this memory location are current and valid.

Figure 20:
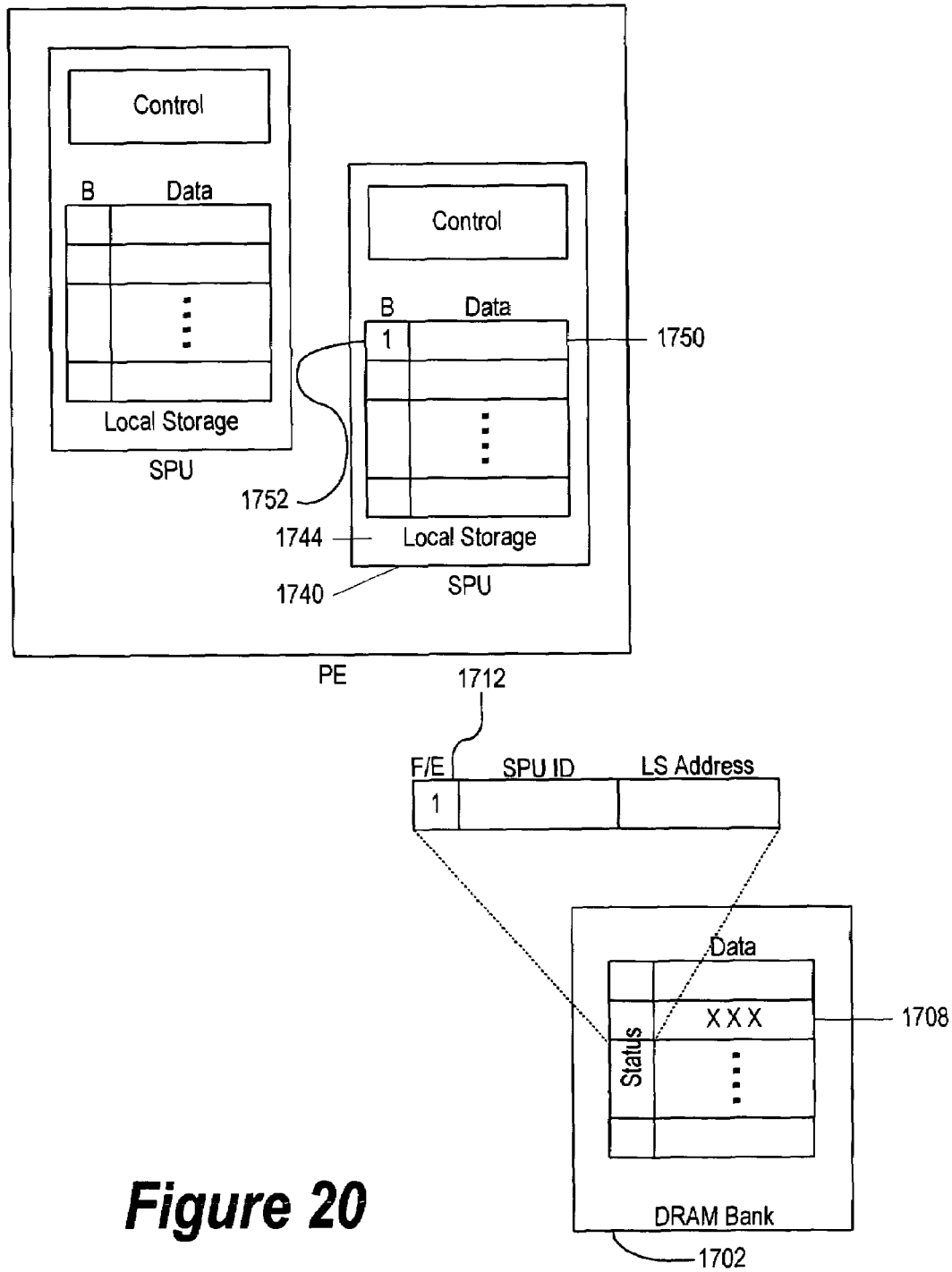

FIG. 20 illustrates the initiation of the synchronized reading of data from memory location 1708 of DRAM 1702 to LS memory location 1750 of local storage 1744. To initiate this reading, the busy bit in memory segment 1752 of LS memory location 1750 is set to 1 to reserve this memory location for these data. The setting of this busy bit to 1 prevents SPU 1740 from storing other data in this memory location.

Figure 21:
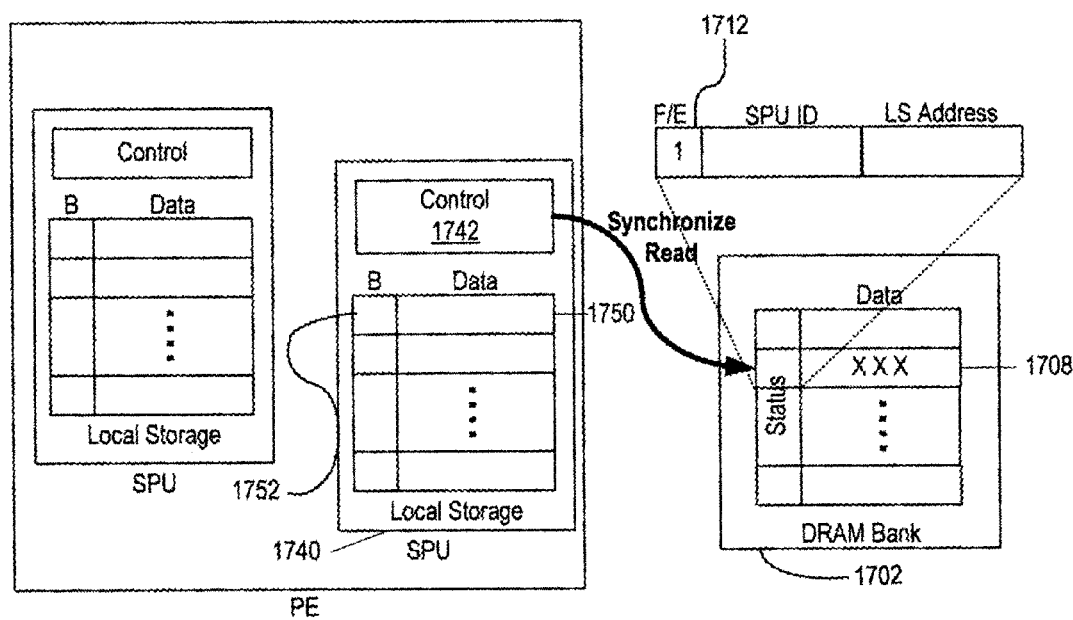
Figure 22:
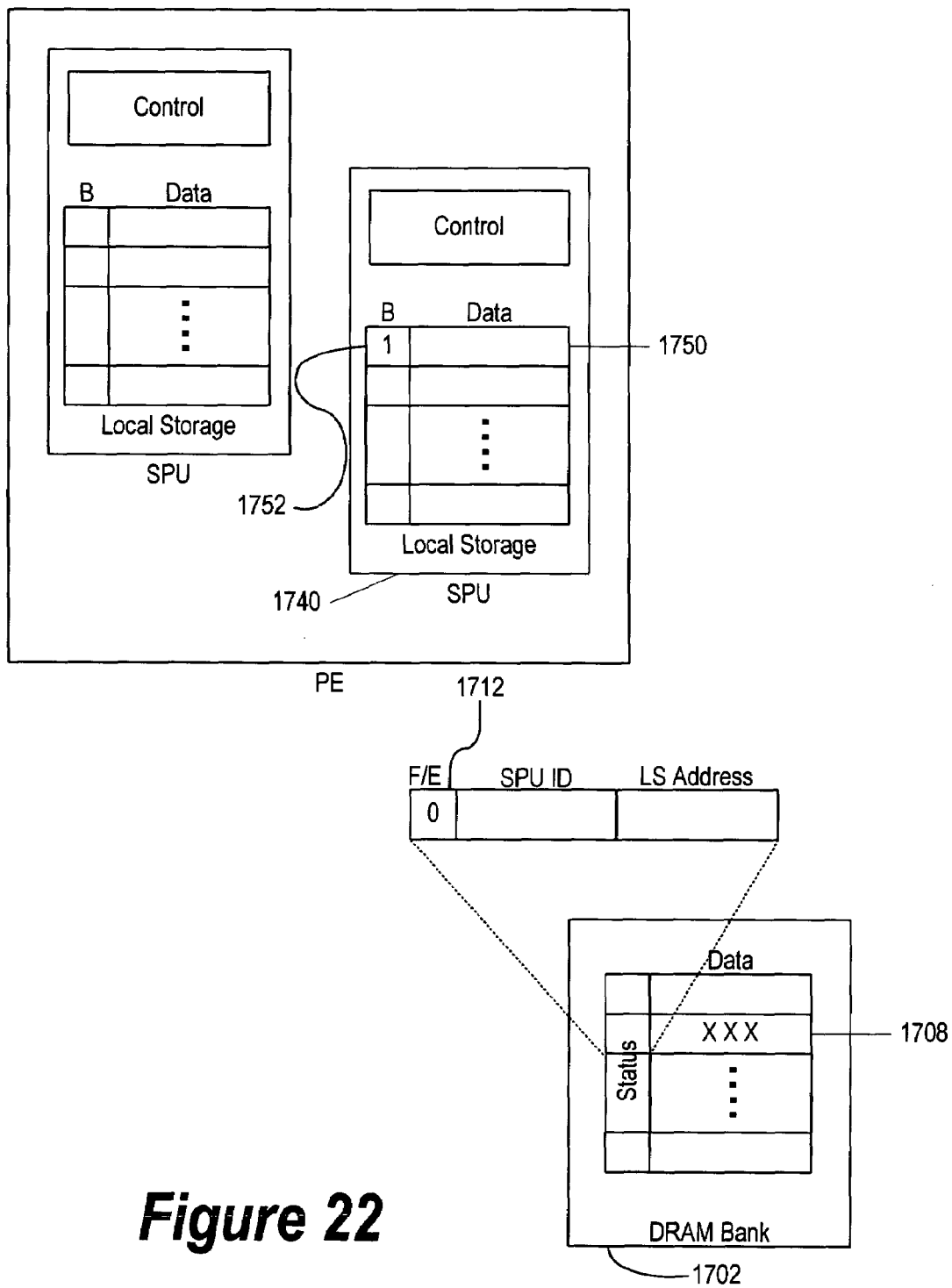

As shown in FIG. 21, control logic 1742 next issues a synchronize read command for memory location 1708 of DRAM 1702. Since F/E bit 1712 associated with this memory location is set to 1, the data stored in memory location 1708 are considered current and valid. As a result, in preparation for transferring the data from memory location 1708 to LS memory location 1750, F/E bit 1712 is set to 0. This setting is shown in FIG. 22. The setting of this bit to 0 indicates that, following the reading of these data, the data in memory location 1708 will be invalid.

Figure 23:
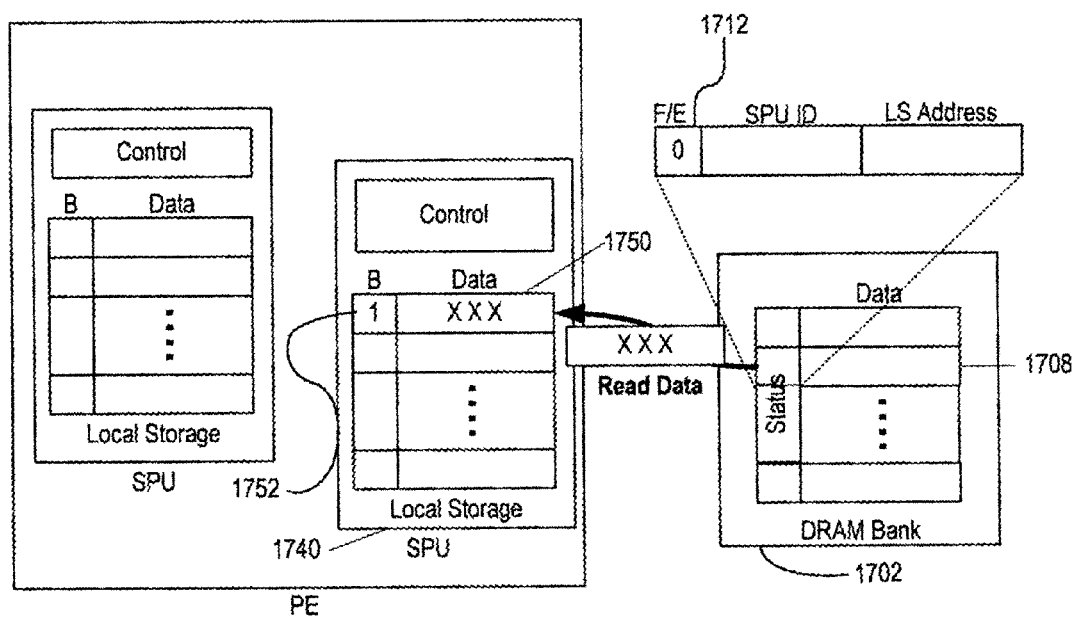
Figure 24:
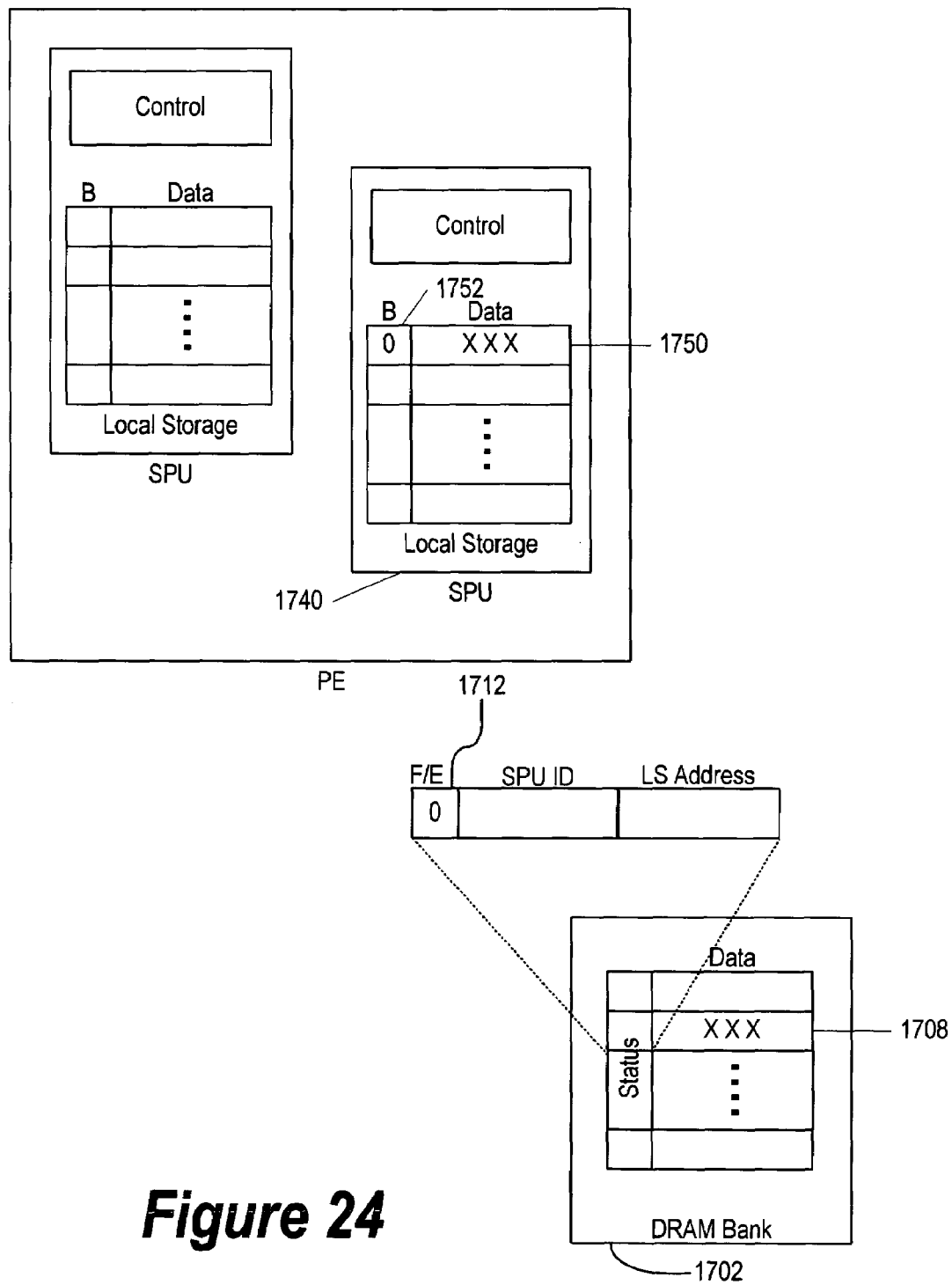

As shown in FIG. 23, the data within memory location 1708 next are read from memory location 1708 to LS memory location 1750. FIG. 24 shows the final state. A copy of the data in memory location 1708 is stored in LS memory location 1750. F/E bit 1712 is set to 0 to indicate that the data in memory location 1708 are invalid. This invalidity is the result of alterations to these data to be made by SPU 1740. The busy bit in memory segment 1752 also is set to 0. This setting indicates that LS memory location 1750 now is available to SPU 1740 for any purpose, i.e., this LS memory location no longer is in a reserved state waiting for the receipt of specific data. LS memory location 1750, therefore, now can be accessed by SPU 1740 for any purpose.

Figure 25:
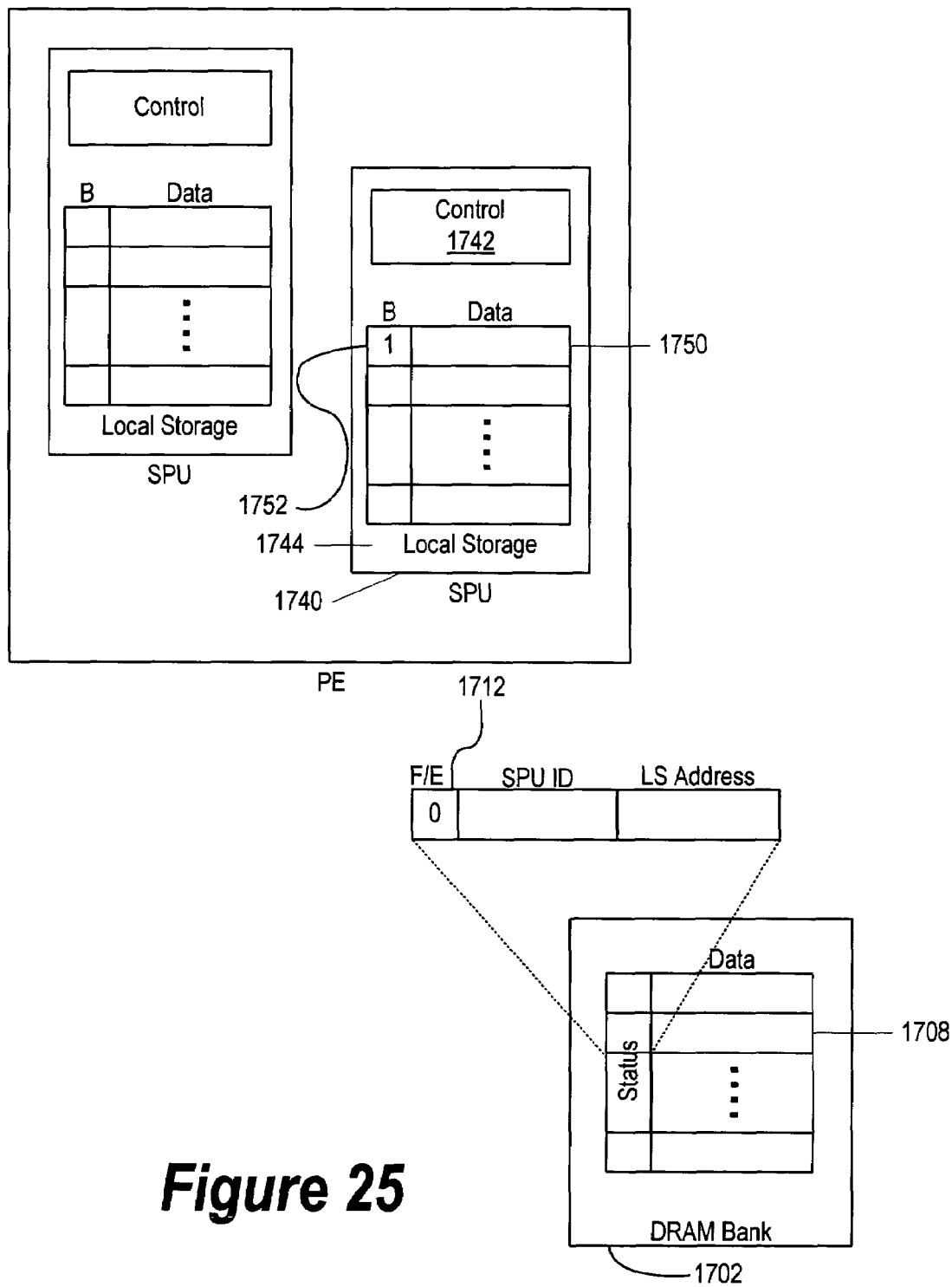
Figure 26:
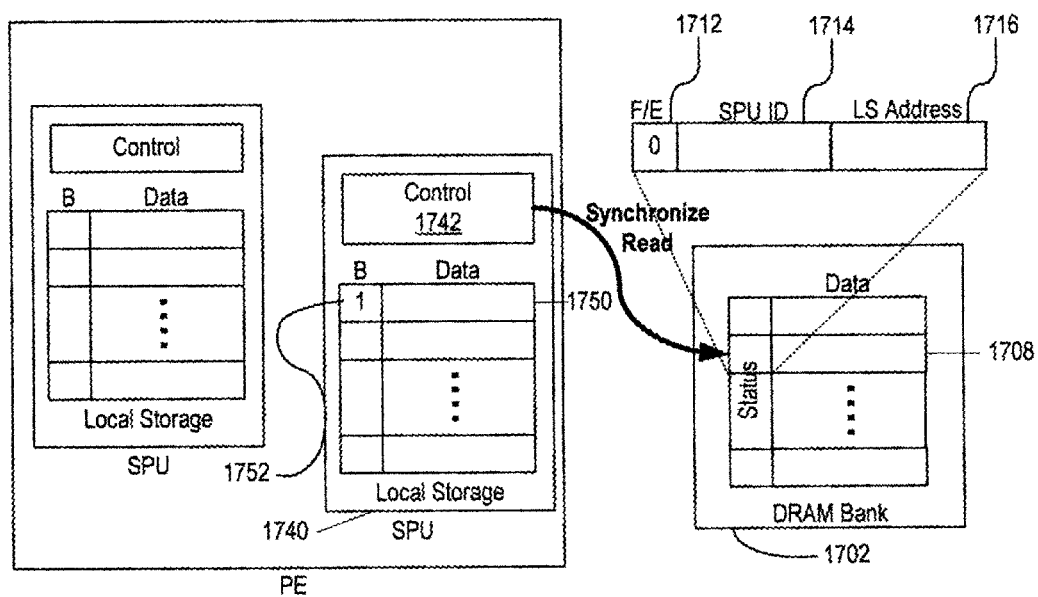

FIGS. 25-31 illustrate the synchronized reading of data from a memory location of DRAM 1702, e.g., memory location 1708, to an LS memory location of an SPU's local storage, e.g., LS memory location 1752 of local storage 1744, when the F/E bit for the memory location of DRAM 1702 is set to 0 to indicate that the data in this memory location are not current or valid. As shown in FIG. 25, to initiate this transfer, the busy bit in memory segment 1752 of LS memory location 1750 is set to 1 to reserve this LS memory location for this transfer of data. As shown in FIG. 26, control logic 1742 next issues a synchronize read command for memory location 1708 of DRAM 1702. Since the F/E bit associated with this memory location, F/E bit 1712, is set to 0, the data stored in memory location 1708 are invalid. As a result, a signal is transmitted to control logic 1742 to block the immediate reading of data from this memory location.

Figure 27:
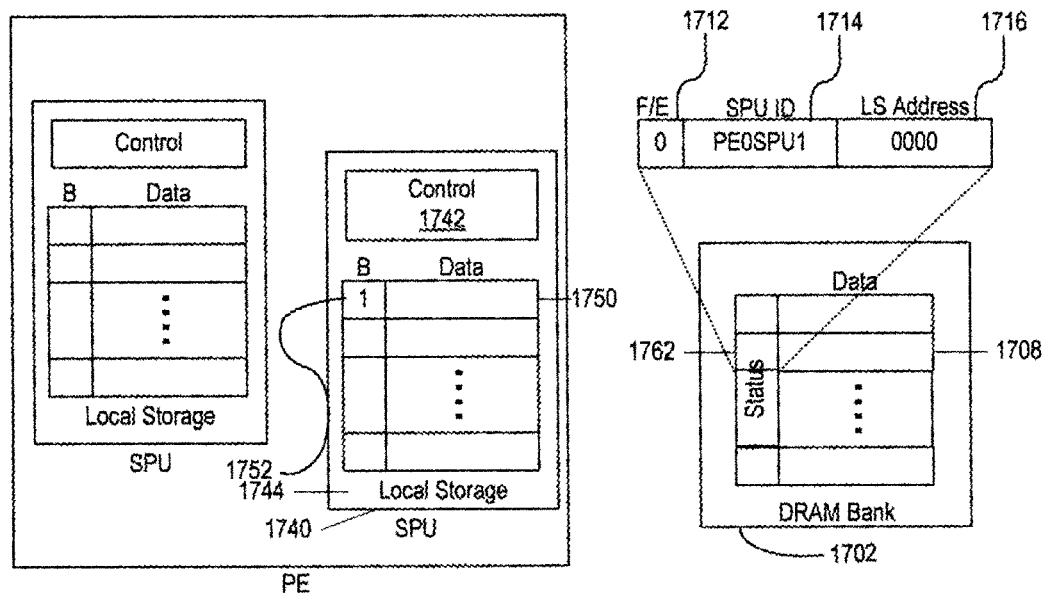

As shown in FIG. 27, the SPU ID 1714 and LS address 1716 for this read command next are written into memory segment 1762. In this case, the SPU ID for SPU 1740 and the LS memory location for LS memory location 1750 are written into memory segment 1762. When the data within memory location 1708 become current, therefore, this SPU ID and LS memory location are used for determining the location to which the current data are to be transmitted.

Figure 28:
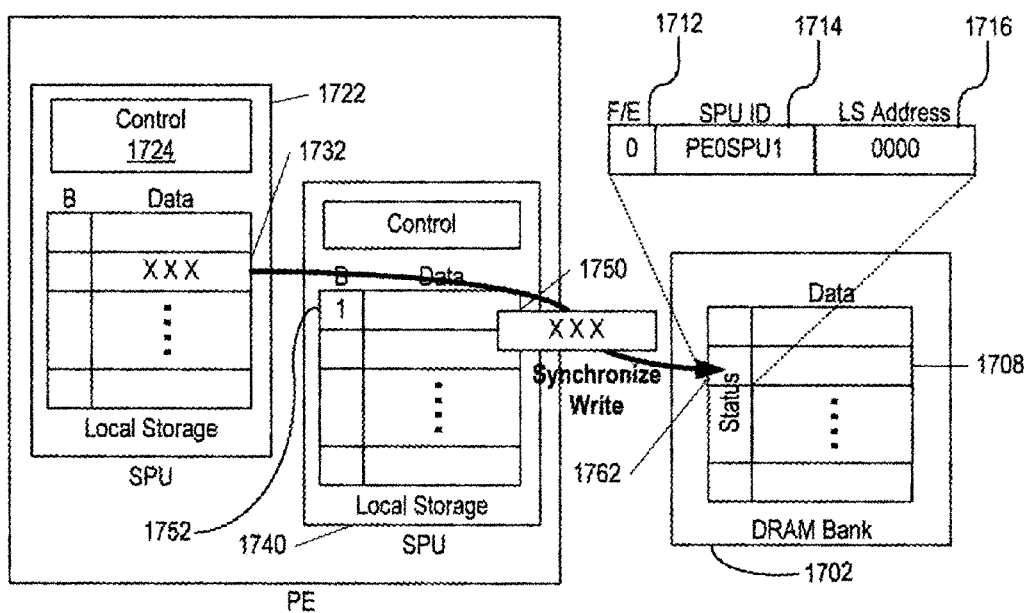

The data in memory location 1708 become valid and current when an SPU writes data into this memory location. The synchronized writing of data into memory location 1708 from, e.g., memory location 1732 of SPU 1722, is illustrated in FIG. 28. This synchronized writing of these data is permitted because F/E bit 1712 for this memory location is set to 0.

Figure 29:
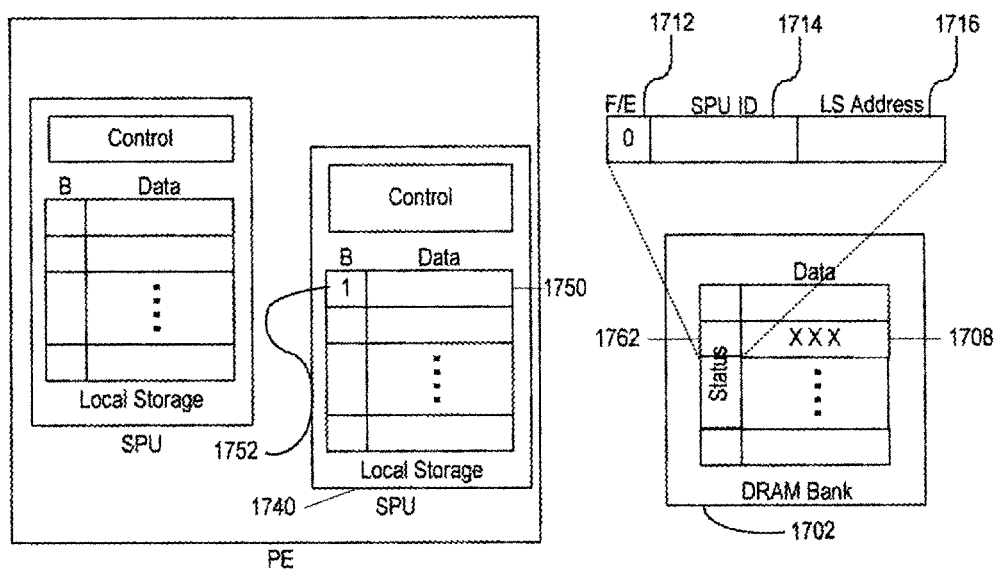
Figure 30:
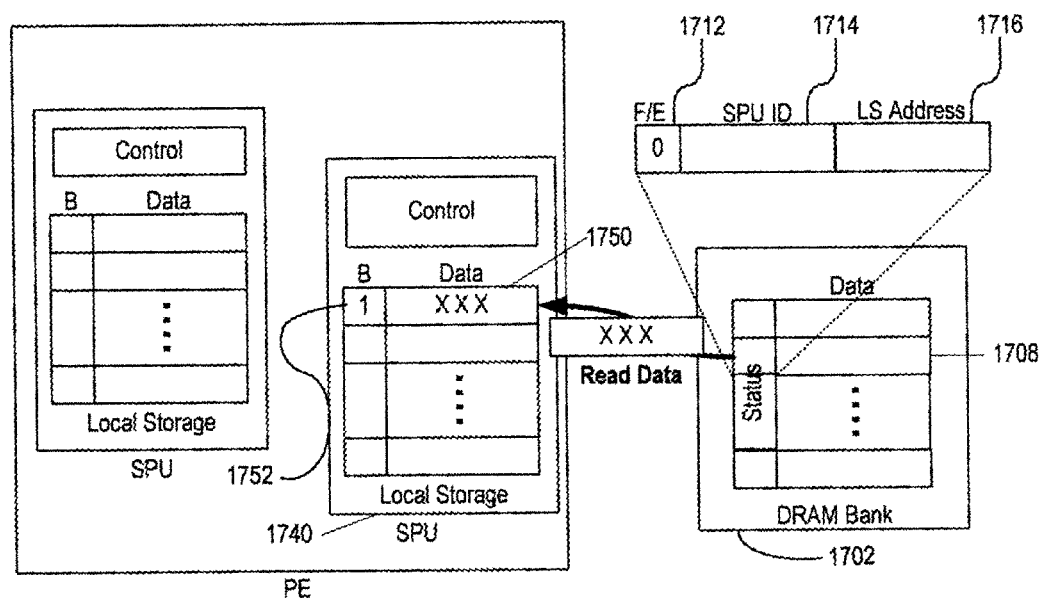
Figure 31:
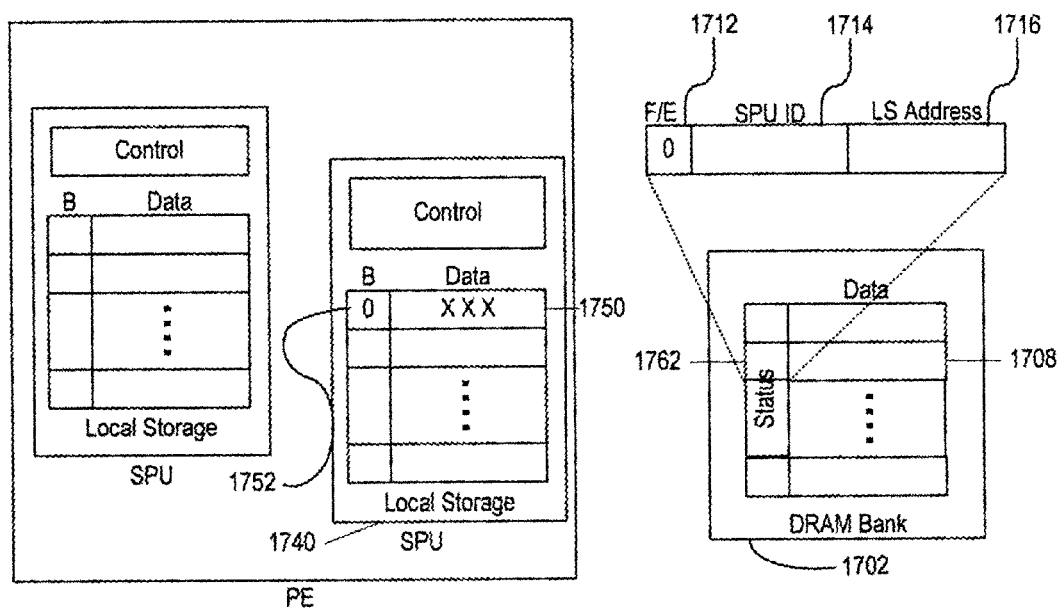

As shown in FIG. 29, following this writing, the data in memory location 1708 become current and valid. SPU ID 1714 and LS address 1716 from memory segment 1762, therefore, immediately are read from memory segment 1762, and this information then is deleted from this segment. F/E bit 1712 also is set to 0 in anticipation of the immediate reading of the data in memory location 1708. As shown in FIG. 30, upon reading SPU ID 1714 and LS address 1716, this information immediately is used for reading the valid data in memory location 1708 to LS memory location 1750 of SPU 1740. The final state is shown in FIG. 31. This figure shows the valid data from memory location 1708 copied to memory location 1750, the busy bit in memory segment 1752 set to 0 and F/E bit 1712 in memory segment 1762 set to 0. The setting of this busy bit to 0 enables LS memory location 1750 now to be accessed by SPU 1740 for any purpose. The setting of this F/E bit to 0 indicates that the data in memory location 1708 no longer are current and valid.

Figure 32:
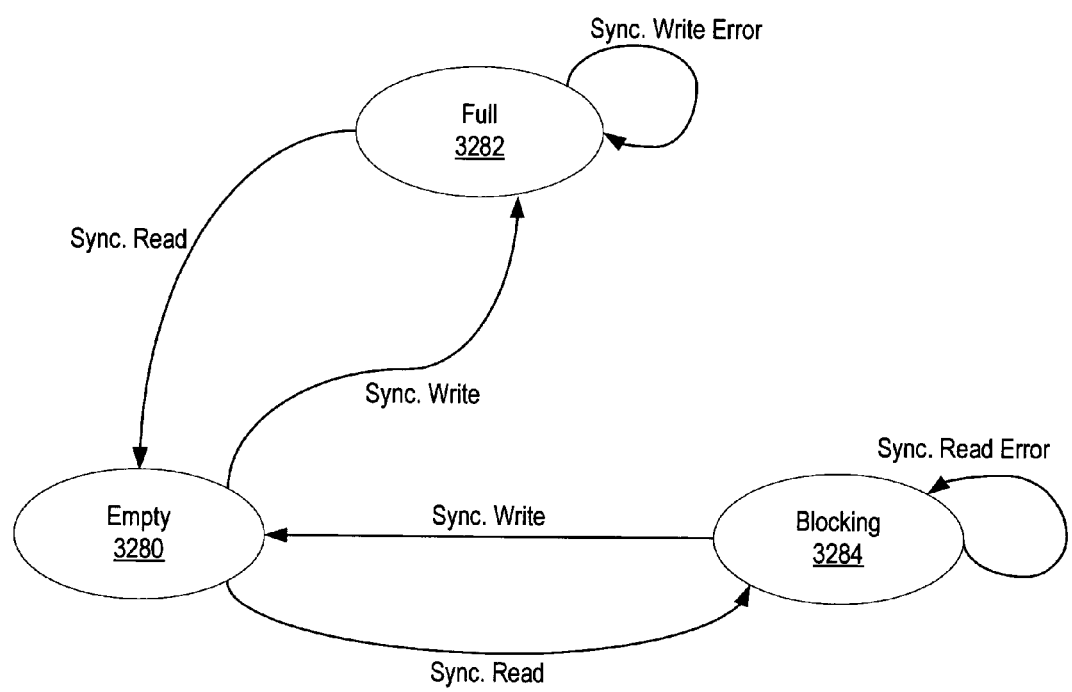
FIG. 32 is a three-state memory diagram illustrating the various states of a memory location in accordance with the data synchronization scheme of the-present invention.

FIG. 32 summarizes the operations described above and the various states of a memory location of the DRAM based upon the states of the F/E bit, the SPU ID and the LS address stored in the memory segment corresponding to the memory location. The memory location can have three states. These three states are an empty state 3280 in which the F/E bit is set to 0 and no information is provided for the SPU ID or the LS address, a full state 3282 in which the F/E bit is set to 1 and no information is provided for the SPU ID or LS address and a blocking state 3284 in which the F/E bit is set to 0 and information is provided for the SPU ID and LS address.

As shown in this figure, in empty state 3280, a synchronized writing operation is permitted and results in a transition to full state 3282. A synchronized reading operation, however, results in a transition to the blocking state 3284 because the data in the memory location, when the memory location is in the empty state, are not current.

In full state 3282, a synchronized reading operation is permitted and results in a transition to empty state 3280. On the other hand, a synchronized writing operation in full state 3282 is prohibited to prevent overwriting of valid data. If such a writing operation is attempted in this state, no state change occurs and an error message is transmitted to the SPU's corresponding control logic.

In blocking state 3284, the synchronized writing of data into the memory location is permitted and results in a transition to empty state 3280. On the other hand, a synchronized reading operation in blocking state 3284 is prohibited to prevent a conflict with the earlier synchronized reading operation which resulted in this state. If a synchronized reading operation is attempted in blocking state 3284, no state change occurs and an error message is transmitted to the SPU's corresponding control logic.

The scheme described above for the synchronized reading and writing of data from and to the shared DRAM also can be used for eliminating the computational resources normally dedicated by a processor for reading data from, and writing data to, external devices. This input/output (I/O) function could be performed by a PU. However, using a modification of this synchronization scheme, an SPU running an appropriate program can perform this function. For example, using this scheme, a PU receiving an interrupt request for the transmission of data from an I/O interface initiated by an external device can delegate the handling of this request to this SPU. The SPU then issues a synchronize write command to the I/O interface. This interface in turn signals the external device that data now can be written into the DRAM. The SPU next issues a synchronize read command to the DRAM to set the DRAM's relevant memory space into a blocking state. The SPU also sets to 1 the busy bits for the memory locations of the SPU's local storage needed to receive the data. In the blocking state, the additional memory segments associated with the DRAM's relevant memory space contain the SPU's ID and the address of the relevant memory locations of the SPU's local storage. The external device next issues a synchronize write command to write the data directly to the DRAM's relevant memory space. Since this memory space is in the blocking state, the data are immediately read out of this space into the memory locations of the SPU's local storage identified in the additional memory segments. The busy bits for these memory locations then are set to 0. When the external device completes writing of the data, the SPU issues a signal to the PU that the transmission is complete.

Using this scheme, therefore, data transfers from external devices can be processed with minimal computational load on the PU. The SPU delegated this function, however, should be able to issue an interrupt request to the PU, and the external device should have direct access to the DRAM.

The DRAM of each PU includes a plurality of "sandboxes." A sandbox defines an area of the shared DRAM beyond which a particular SPU, or set of SPUs, cannot read or write data. These sandboxes provide security against the corruption of data being processed by one SPU by data being processed by another SPU. These sandboxes also permit the downloading of software cells from network 104 into a particular sandbox without the possibility of the software cell corrupting data throughout the DRAM. In the present invention, the sandboxes are implemented in the hardware of the DRAMs and DMACs. By implementing these sandboxes in this hardware rather than in software, advantages in speed and security are obtained.

The PU of a PE controls the sandboxes assigned to the SPUs. Since the PU normally operates only trusted programs, such as an operating system, this scheme does not jeopardize security. In accordance with this scheme, the PU builds and maintains a key control table. This key control table is illustrated in FIG. 33. As shown in this figure, each entry in key control table 3302 contains an identification (ID) 3304 for an SPU, an SPU key 3306 for that SPU and a key mask 3308. The use of this key mask is explained below. Key control table 3302 preferably is stored in a relatively fast memory, such as a static random access memory (SRAM), and is associated with the DMAC. The entries in key control table 3302 are controlled by the PU. When an SPU requests the writing of data to, or the reading of data from, a particular storage location of the DRAM, the DMAC evaluates the SPU key 3306 assigned to that SPU in key control table 3302 against a memory access key associated with that storage location.

Figure 34:
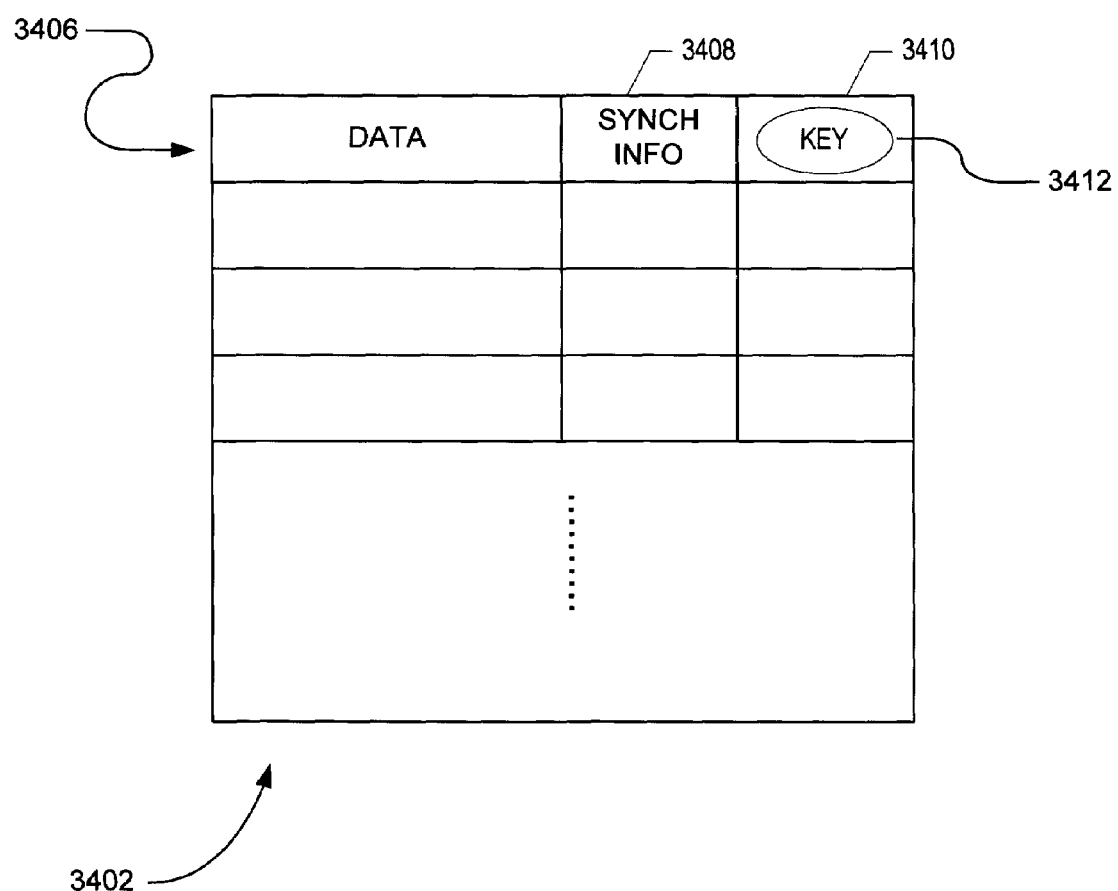
FIG. 34 illustrates a scheme for storing memory access keys for a hardware sandbox in accordance with the present invention.

As shown in FIG. 34, a dedicated memory segment 3410 is assigned to each addressable storage location 3406 of a DRAM 3402. A memory access key 3412 for the storage location is stored in this dedicated memory segment. As discussed above, a further additional dedicated memory segment 3408, also associated with each addressable storage location 3406, stores synchronization information for writing data to, and reading data from, the storage-location.

In operation, an SPU issues a DMA command to the DMAC. This command includes the address of a storage location 3406 of DRAM 3402. Before executing this command, the DMAC looks up the requesting SPU's key 3306 in key control table 3302 using the SPU's ID 3304. The DMAC then compares the SPU key 3306 of the requesting SPU to the memory access key 3412 stored in the dedicated memory segment 3410 associated with the storage location of the DRAM to which the SPU seeks access. If the two keys do not match, the DMA command is not executed. On the other hand, if the two keys match, the DMA command proceeds and the requested memory access is executed.

An alternative embodiment is illustrated in FIG. 35. In this embodiment, the PU also maintains a memory access control table 3502. Memory access control table 3502 contains an entry for each sandbox within the DRAM. In the particular example of FIG. 35, the DRAM contains 64 sandboxes. Each entry in memory access control table 3502 contains an identification (ID) 3504 for a sandbox, a base memory address 3506, a sandbox size 3508, a memory access key 3510 and an access key mask 3512. Base memory address 3506 provides the address in the DRAM which starts a particular memory sandbox. Sandbox size 3508 provides the size of the sandbox and, therefore, the endpoint of the particular sandbox.

Figure 36:
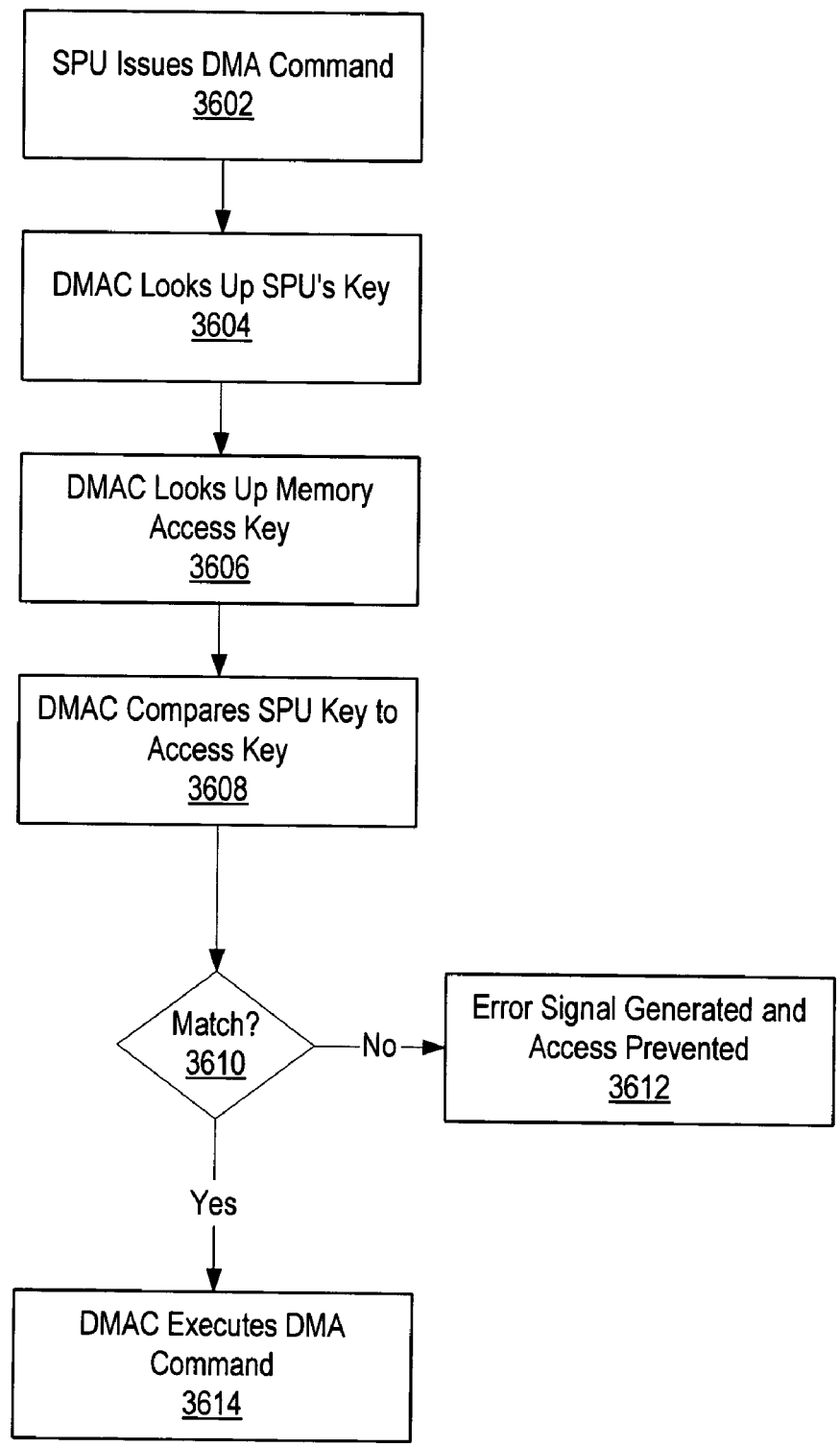
FIG. 36 is a flow diagram of the steps for accessing a memory sandbox using the key control table of FIG. 33 and the memory access control table of FIG. 35.

FIG. 36 is a flow diagram of the steps for executing a DMA command using key control table 3302 and memory access control table 3502. In step 3602, an SPU issues a DMA command to the DMAC for access to a particular memory location or locations within a sandbox. This command includes a sandbox ID 3504 identifying the particular sandbox for which access is requested. In step 3604, the DMAC looks up the requesting SPU's key 3306 in key control table 3302 using the SPU's ID 3304. In step 3606, the DMAC uses the sandbox ID 3504 in the command to look up in memory access control table 3502 the memory access key 3510 associated with that sandbox. In step 3608, the DMAC compares the SPU key 3306 assigned to the requesting SPU to the access key 3510 associated with the sandbox. In step 3610, a determination is made of whether the two keys match. If the two keys do not match, the process moves to step 3612 where the DMA command does not proceed and an error message is sent to either the requesting SPU, the PU or both. On the other hand, if at step 3610 the two keys are found to match, the process proceeds to step 3614 where the DMAC executes the DMA command.

The key masks for the SPU keys and the memory access keys provide greater flexibility to this system. A key mask for a key converts a masked bit into a wildcard. For example, if the key mask 3308 associated with an SPU key 3306 has its last two bits set to "mask," designated by, e.g., setting these bits in key mask 3308 to 1, the SPU key can be either a 1 or a 0 and still match the memory access key. For example, the SPU key might be 1010. This SPU key normally allows access only to a sandbox having an access key of 1010. If the SPU key mask for this SPU key is set to 0001, however, then this SPU key can be used to gain access to sandboxes having an access key of either 1010 or 1011. Similarly, an access key 1010 with a mask set to 0001 can be accessed by an SPU with an SPU key of either 1010 or 1011. Since both the SPU key mask and the memory key mask can be used simultaneously, numerous variations of accessibility by the SPUs to the sandboxes can be established.

The present invention also provides a new programming model for the processors of system 101. This programming model employs software cells 102. These cells can be transmitted to any processor on network 104 for processing. This new programming model also utilizes the unique modular architecture of system 101 and the processors of system 101.

Software cells are processed directly by the SPUs from the SPU's local storage. The SPUs do not directly operate on any data or programs in the DRAM. Data and programs in the DRAM are read into the SPU's local storage before the SPU processes these data and programs. The SPU's local storage, therefore, includes a program counter, stack and other software elements for executing these programs. The PU controls the SPUs by issuing direct memory access (DMA) commands to the DMAC.

Figure 37:
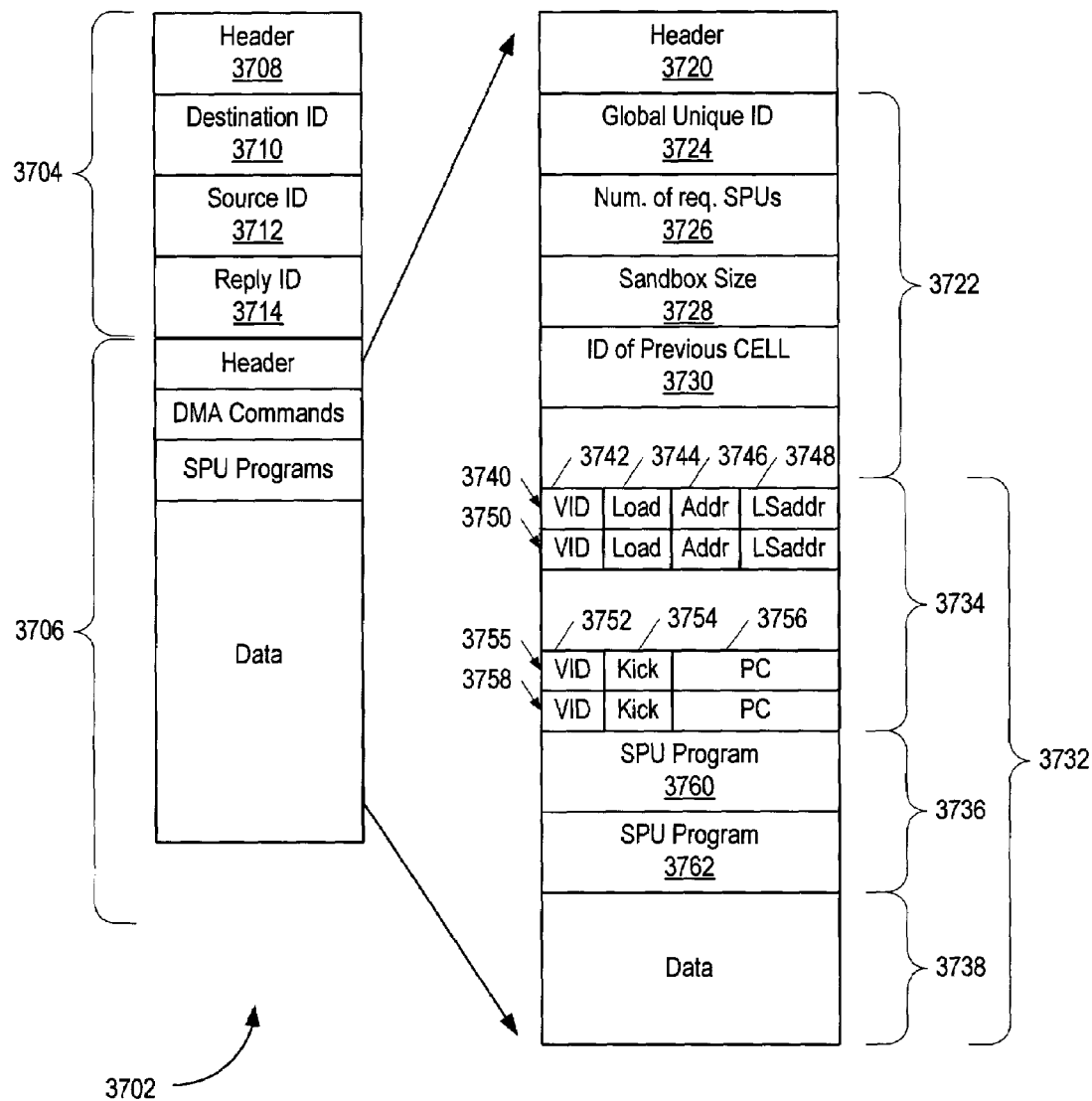
FIG. 37 illustrates the structure of a software cell in accordance with the present invention.

The structure of software cells 102 is illustrated in FIG. 37. As shown in this figure, a software cell, e.g., software cell 3702, contains routing information section 3704 and body 3706. The information contained in routing information section 3704 is dependent upon the protocol of network 104. Routing information section 3704 contains header 3708, destination ID 3710, source ID 3712 and reply ID 3714. The destination ID includes a network address. Under the TCP/IP protocol, e.g., the network address is an Internet protocol (IP) address. Destination ID 3710 further includes the identity of the PU and SPU to which the cell should be transmitted for processing. Source ID 3712 contains a network address and identifies the PU and SPU from which the cell originated to enable the destination PU and SPU to obtain additional information regarding the cell if necessary. Reply ID 3714 contains a network address and identifies the PU and SPU to which queries regarding the cell, and the result of processing of the cell, should be directed.

Cell body 3706 contains information independent of the network's protocol. The exploded portion of FIG. 37 shows the details of cell body 3706. Header 3720 of cell body 3706 identifies the start of the cell body. Cell interface 3722 contains information necessary for the cell's utilization. This information includes global unique ID 3724, required SPUs 3726, sandbox size 3728 and previous cell ID 3730.

Global unique ID 3724 uniquely identifies software cell 3702 throughout network 104. Global unique ID 3724 is generated on the basis of source ID 3712, e.g. the unique identification of a PU or SPU within source ID 3712, and the time and date of generation or transmission of software cell 3702. Required SPUs 3726 provides the minimum number of SPUs required to execute the cell. Sandbox size 3728 provides the amount of protected memory in the required SPUs' associated DRAM necessary to execute the cell. Previous cell ID 3730 provides the identity of a previous cell in a group of cells requiring sequential execution, e.g., streaming data.

Implementation section 3732 contains the cell's core information. This information includes DMA command list 3734, programs 3736 and data 3738. Programs 3736 contain the programs to be run by the SPUs (called "spulets"), e.g., SPU programs 3760 and 3762, and data 3738 contain the data to be processed with these programs. DMA command list 3734 contains a series of DMA commands needed to start the programs. These DMA commands include DMA commands 3740, 3750, 3755 and 3758. The PU issues these DMA commands to the DMAC.

DMA command 3740 includes VID 3742. VID 3742 is the virtual ID of an SPU which is mapped to a physical ID when the DMA commands are issued. DMA command 3740 also includes load command 3744 and address 3746. Load command 3744 directs the SPU to read particular information from the DRAM into local storage. Address 3746 provides the virtual address in the DRAM containing this information. The information can be, e.g., programs from programs section 3736, data from data section 3738 or other data. Finally, DMA command 3740 includes local storage address 3748. This address identifies the address in local storage where the information should be loaded. DMA commands 3750 contain similar information. Other DMA commands are also possible.

DMA command list 3734 also includes a series of kick commands, e.g., kick commands 3755 and 3758. Kick commands are commands issued by a PU to an SPU to initiate the processing of a cell. DMA kick command 3755 includes virtual SPU ID 3752, kick command 3754 and program counter 3756. Virtual SPU ID 3752 identifies the SPU to be kicked, kick command 3754 provides the relevant kick command and program counter 3756 provides the address for the program counter for executing the program. DMA kick command 3758 provides similar information for the same SPU or another SPU.

As noted, the PUs treat the SPUs as independent processors, not co-processors. To control processing by the SPUs, therefore, the PU uses commands analogous to remote procedure calls. These commands are designated "SPU Remote Procedure Calls" (SRPCs). A PU implements an SRPC by issuing a series of DMA commands to the DMAC. The DMAC loads the SPU program and its associated stack frame into the local storage of an SPU. The PU then issues an initial kick to the SPU to execute the SPU Program.

Figure 38:
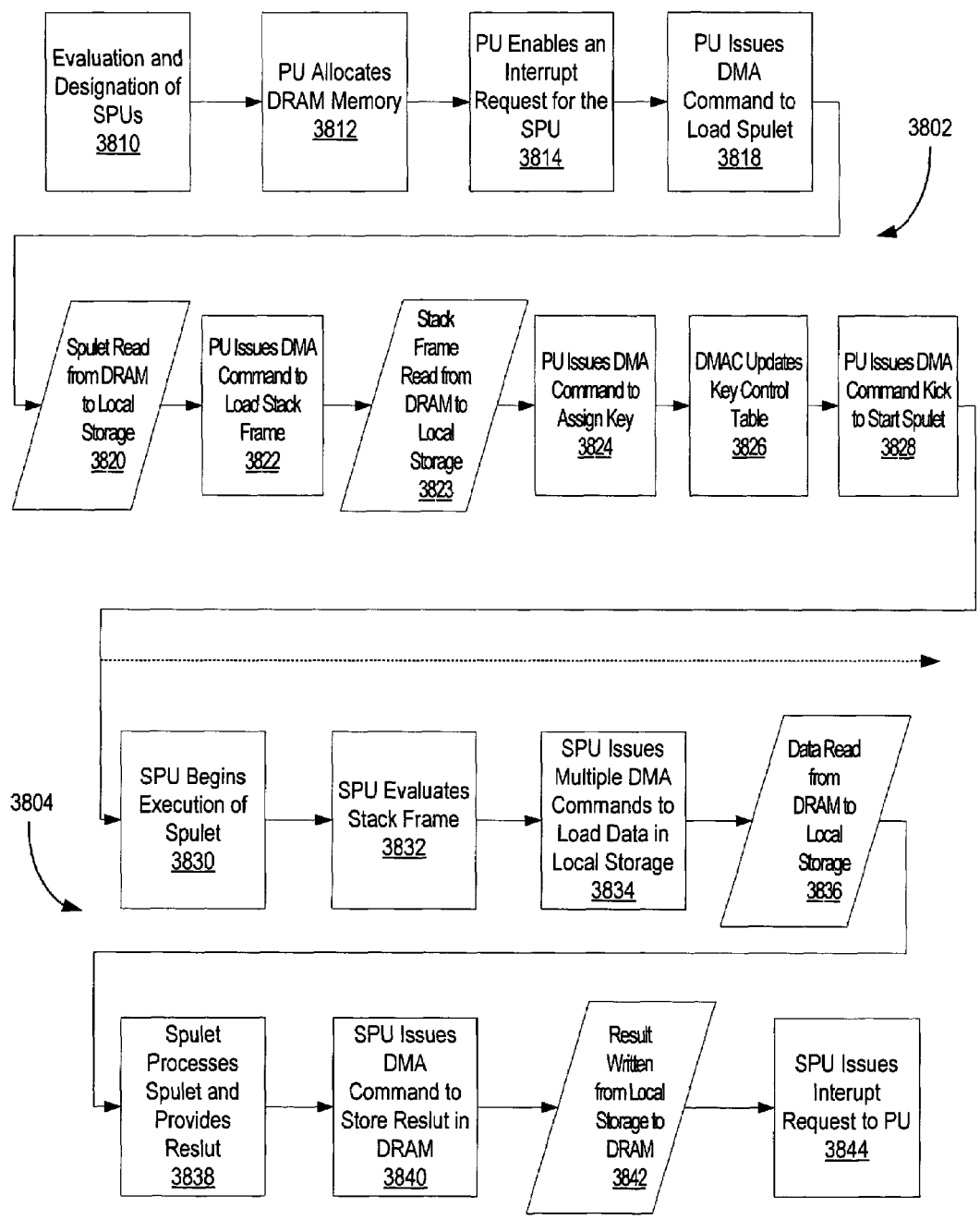
FIG. 38 is a flow diagram of the steps for issuing remote procedure calls to SPUs in accordance with the present invention.

FIG. 38 illustrates the steps of an SRPC for executing an spulet. The steps performed by the PU in initiating processing of the spulet by a designated SPU are shown in the first portion 3802 of FIG. 38, and the steps performed by the designated SPU in processing the spulet are shown in the second portion 3804 of FIG. 38.

In step 3810, the PU evaluates the spulet and then designates an SPU for processing the spulet. In step 3812, the PU allocates space in the DRAM for executing the spulet by issuing a DMA command to the DMAC to set memory access keys for the necessary sandbox or sandboxes. In step 3814, the PU enables an interrupt request for the designated SPU to signal completion of the spulet. In step 3818, the PU issues a DMA command to the DMAC to load the spulet from the DRAM to the local storage of the SPU. In step 3820, the DMA command is executed, and the spulet is read from the DRAM to the SPU's local storage. In step 3822, the PU issues a DMA command to the DMAC to load the stack frame associated with the spulet from the DRAM to the SPU's local storage. In step 3823, the DMA command is executed, and the stack frame is read from the DRAM to the SPU's local storage. In step 3824, the PU issues a DMA command for the DMAC to assign a key to the SPU to allow the SPU to read and write data from and to the hardware sandbox or sandboxes designated in step 3812. In step 3826, the DMAC updates the key control table (KTAB) with the key assigned to the SPU. In step 3828, the PU issues a DMA command "kick" to the SPU to start processing of the program. Other DMA commands may be issued by the PU in the execution of a particular SRPC depending upon the particular spulet.

As indicated above, second portion 3804 of FIG. 38 illustrates the steps performed by the SPU in executing the spulet. In step 3830, the SPU begins to execute the spulet in response to the kick command issued at step 3828. In step 3832, the SPU, at the direction of the spulet, evaluates the spulet's associated stack frame. In step 3834, the SPU issues multiple DMA commands to the DMAC to load data designated as needed by the stack frame from the DRAM to the SPU's local storage. In step 3836, these DMA commands are executed, and the data are read from the DRAM to the SPU's local storage. In step 3838, the SPU executes the spulet and generates a result. In step 3840, the SPU issues a DMA command to the DMAC to store the result in the DRAM. In step 3842, the DMA command is executed and the result of the spulet is written from the SPU's local storage to the DRAM. In step 3844, the SPU issues an interrupt request to the PU to signal that the SRPC has been completed.

The ability of SPUs to perform tasks independently under the direction of a PU enables a PU to dedicate a group of SPUs, and the memory resources associated with a group of SPUs, to performing extended tasks. For example, a PU can dedicate one or more SPUs, and a group of memory sandboxes associated with these one or more SPUs, to receiving data transmitted over network 104 over an extended period and to directing the data received during this period to one or more other SPUs and their associated memory sandboxes for further processing. This ability is particularly advantageous to processing streaming data transmitted over network 104, e.g., streaming MPEG or streaming ATRAC audio or video data. A PU can dedicate one or more SPUs and their associated memory sandboxes to receiving these data and one or more other SPUs and their associated memory sandboxes to decompressing and further processing these data. In other words, the PU can establish a dedicated pipeline relationship among a group of SPUs and their associated memory sandboxes for processing such data.

In order for such processing to be performed efficiently, however, the pipeline's dedicated SPUs and memory sandboxes should remain dedicated to the pipeline during periods in which processing of spulets comprising the data stream does not occur. In other words, the dedicated SPUs and their associated sandboxes should be placed in a reserved state during these periods. The reservation of an SPU and its associated memory sandbox or sandboxes upon completion of processing of an spulet is called a "resident termination." A resident termination occurs in response to an instruction from a PU.

Figure 39:
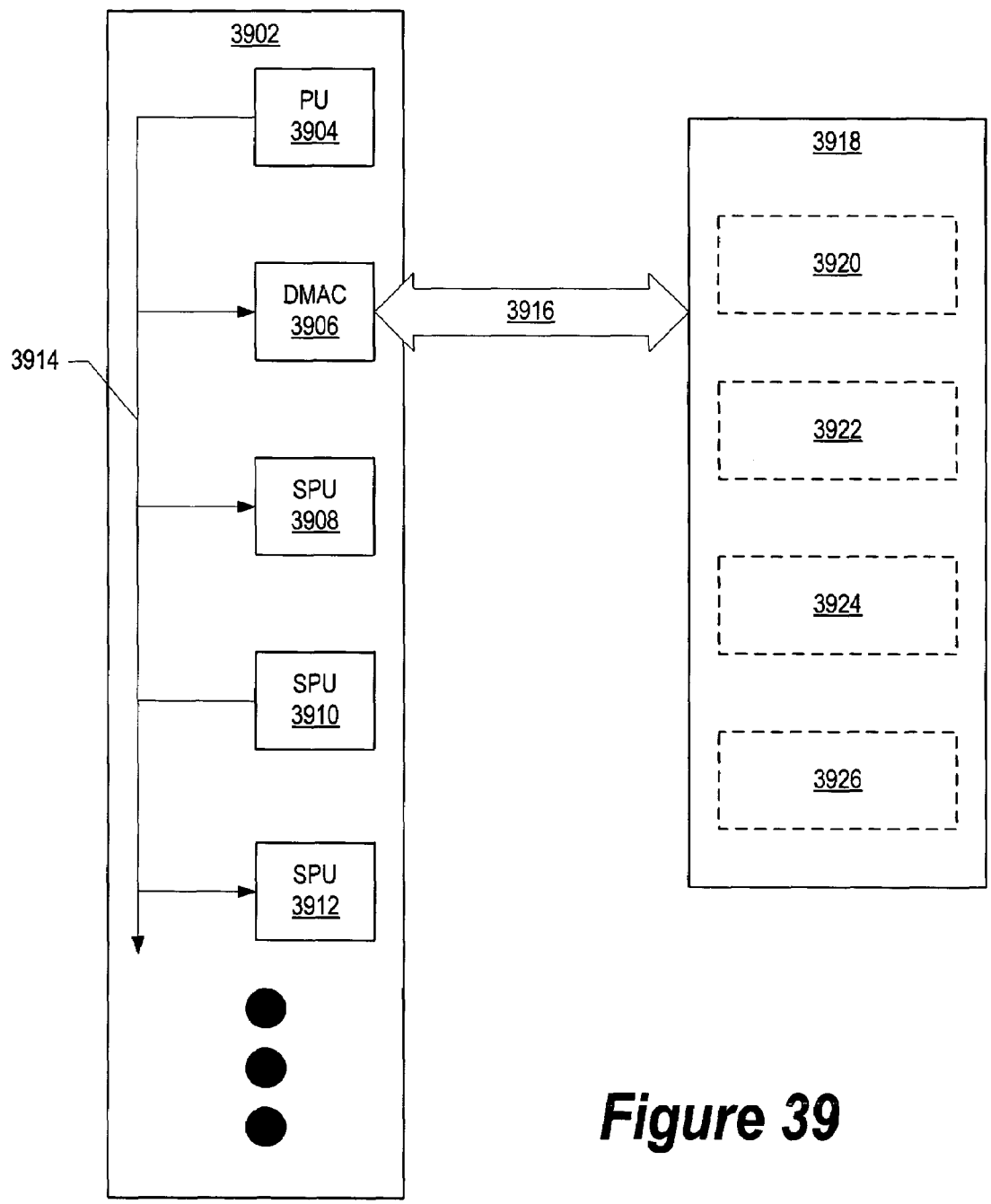
FIG. 39 illustrates the structure of a dedicated pipeline for processing streaming data in accordance with the present invention.
Figure 40A:
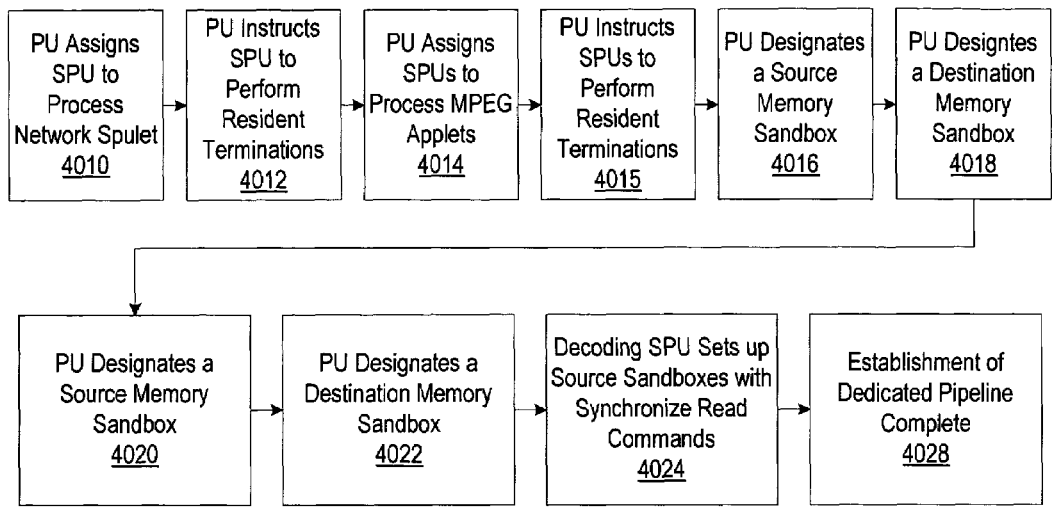
FIG. 40 is a flow diagram of the steps performed by the dedicated pipeline of FIG. 39 in the processing of streaming data in accordance with the present invention.
Figure 40B:
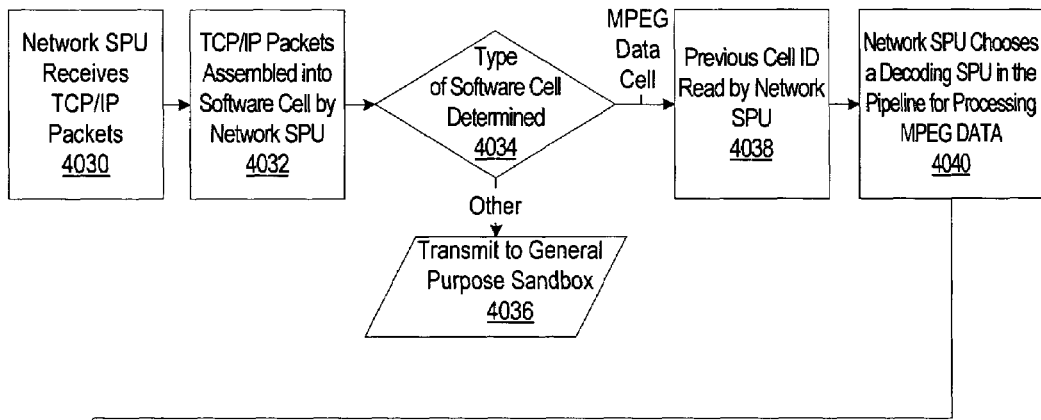
Figure 40B:
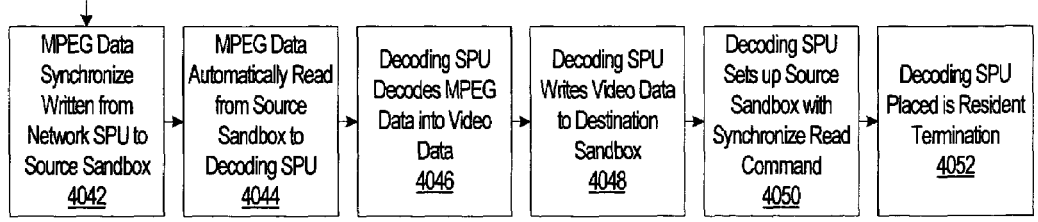

FIGS. 39, 40A and 40B illustrate the establishment of a dedicated pipeline structure comprising a group of SPUs and their associated sandboxes for the processing of streaming data, e.g., streaming MPEG data. As shown in FIG. 39, the components of this pipeline structure include PE 3902 and DRAM 3918. PE 3902 includes PU 3904, DMAC 3906 and a plurality of SPUs, including SPU 3908, SPU 3910 and SPU 3912. Communications among PU 3904, DMAC 3906 and these SPUs occur through PE bus 3914. Wide bandwidth bus 3916 connects DMAC 3906 to DRAM 3918. DRAM 3918 includes a plurality of sandboxes, e.g., sandbox 3920, sandbox 3922, sandbox 3924 and sandbox 3926.

FIG. 40A illustrates the steps for establishing the dedicated pipeline. In step 4010, PU 3904 assigns SPU 3908 to process a network spulet. A network spulet comprises a program for processing the network protocol of network 104. In this case, this protocol is the Transmission Control Protocol/Internet Protocol (TCP/IP). TCP/IP data packets conforming to this protocol are transmitted over network 104. Upon receipt, SPU 3908 processes these packets and assembles the data in the packets into software cells 102. In step 4012, PU 3904 instructs SPU 3908 to perform resident terminations upon the completion of the processing of the network spulet. In step 4014, PU 3904 assigns PUs 3910 and 3912 to process MPEG spulets. In step 4015, PU 3904 instructs SPUs 3910 and 3912 also to perform resident terminations upon the completion of the processing of the MPEG spulets. In step 4016, PU 3904 designates sandbox 3920 as a source sandbox for access by SPU 3908 and SPU 3910. In step 4018, PU 3904 designates sandbox 3922 as a destination sandbox for access by SPU 3910. In step 4020, PU 3904 designates sandbox 3924 as a source sandbox for access by SPU 3908 and SPU 3912. In step 4022, PU 3904 designates sandbox 3926 as a destination sandbox for access by SPU 3912. In step 4024, SPU 3910 and SPU 3912 send synchronize read commands to blocks of memory within, respectively, source sandbox 3920 and source sandbox 3924 to set these blocks of memory into the blocking state. The process finally moves to step 4028 where establishment of the dedicated pipeline is complete and the resources dedicated to the pipeline are reserved. SPUs 3908, 3910 and 3912 and their associated sandboxes 3920, 3922, 3924 and 3926, therefore, enter the reserved state.

FIG. 40B illustrates the steps for processing streaming MPEG data by this dedicated pipeline. In step 4030, SPU 3908, which processes the network spulet, receives in its local storage TCP/IP data packets from network 104. In step 4032, SPU 3908 processes these TCP/IP data packets and assembles the data within these packets into software cells 102. In step 4034, SPU 3908 examines header 3720 (FIG. 37) of the software cells to determine whether the cells contain MPEG data. If a cell does not contain MPEG data, then, in step 4036, SPU 3908 transmits the cell to a general purpose sandbox designated within DRAM 3918 for processing other data by other SPUs not included within the dedicated pipeline. SPU 3908 also notifies PU 3904 of this transmission.

On the other hand, if a software cell contains MPEG data, then, in step 4038, SPU 3908 examines previous cell ID 3730 (FIG. 37) of the cell to identify the MPEG data stream to which the cell belongs. In step 4040, SPU 3908 chooses an SPU of the dedicated pipeline for processing of the cell. In this case, SPU 3908 chooses SPU 3910 to process these data. This choice is based upon previous cell ID 3730 and load balancing factors. For example, if previous cell ID 3730 indicates that the previous software cell of the MPEG data stream to which the software cell belongs was sent to SPU 3910 for processing, then the present software cell normally also will be sent to SPU 3910 for processing. In step 4042, SPU 3908 issues a synchronize write command to write the MPEG data to sandbox 3920. Since this sandbox previously was set to the blocking state, the MPEG data, in step 4044, automatically is read from sandbox 3920 to the local storage of SPU 3910. In step 4046, SPU 3910 processes the MPEG data in its local storage to generate video data. In step 4048, SPU 3910 writes the video data to sandbox 3922. In step 4050, SPU 3910 issues a synchronize read command to sandbox 3920 to prepare this sandbox to receive additional MPEG data. In step 4052, SPU 3910 processes a resident termination. This processing causes this SPU to enter the reserved state during which the SPU waits to process additional MPEG data in the MPEG data stream.

Figure 41:
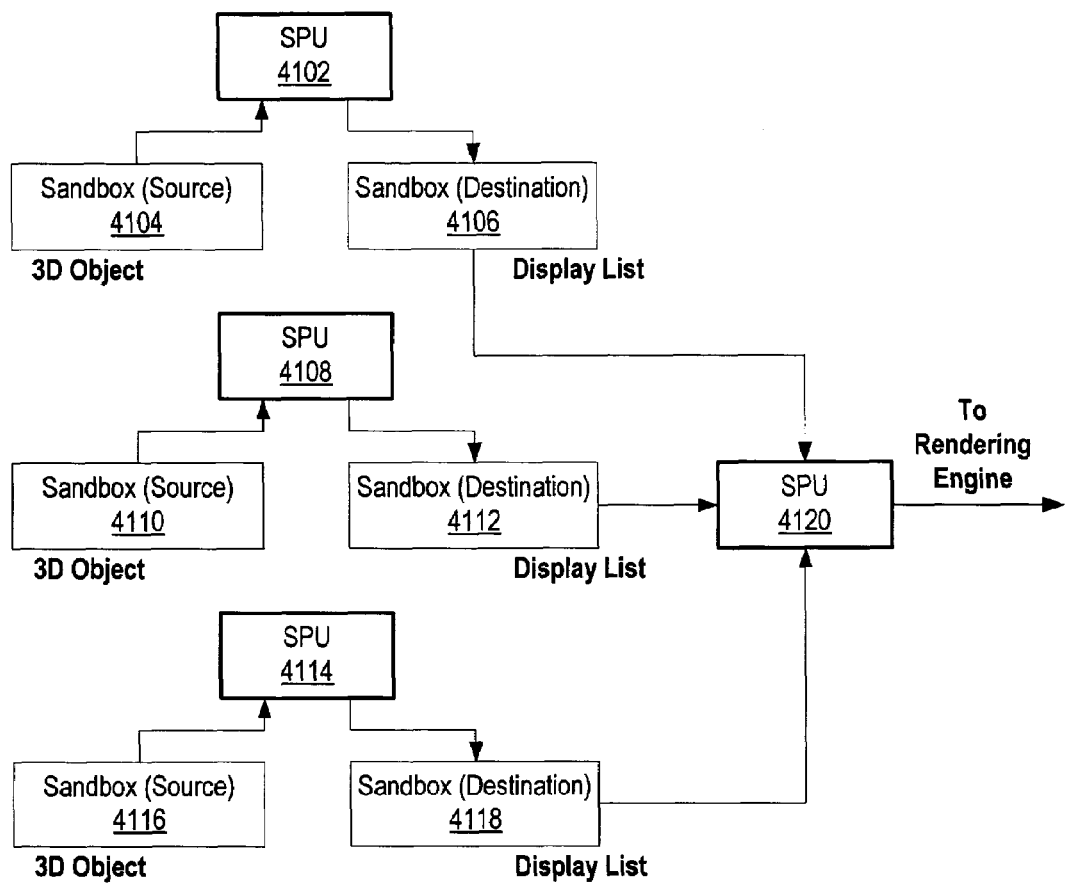
FIG. 41 illustrates an alternative structure for a dedicated pipeline for the processing of streaming data in accordance with the present invention.

Other dedicated structures can be established among a group of SPUs and their associated sandboxes for processing other types of data. For example, as shown in FIG. 41, a dedicated group of SPUs, e.g., SPUs 4102, 4108 and 4114, can be established for performing geometric transformations upon three dimensional objects to generate two dimensional display lists. These two dimensional display lists can be further processed (rendered) by other SPUs to generate pixel data. To perform this processing, sandboxes are dedicated to SPUs 4102, 4108 and 4114 for storing the three dimensional objects and the display lists resulting from the processing of these objects. For example, source sandboxes 4104, 4110 and 4116 are dedicated to storing the three dimensional objects processed by, respectively, SPU 4102, SPU 4108 and SPU 4114. In a similar manner, destination sandboxes 4106, 4112 and 4118 are dedicated to storing the display lists resulting from the processing of these three dimensional objects by, respectively, SPU 4102, SPU 4108 and SPU 4114.

Coordinating SPU 4120 is dedicated to receiving in its local storage the display lists from destination sandboxes 4106, 4112 and 4118. SPU 4120 arbitrates among these display lists and sends them to other SPUs for the rendering of pixel data.

Figure 42:
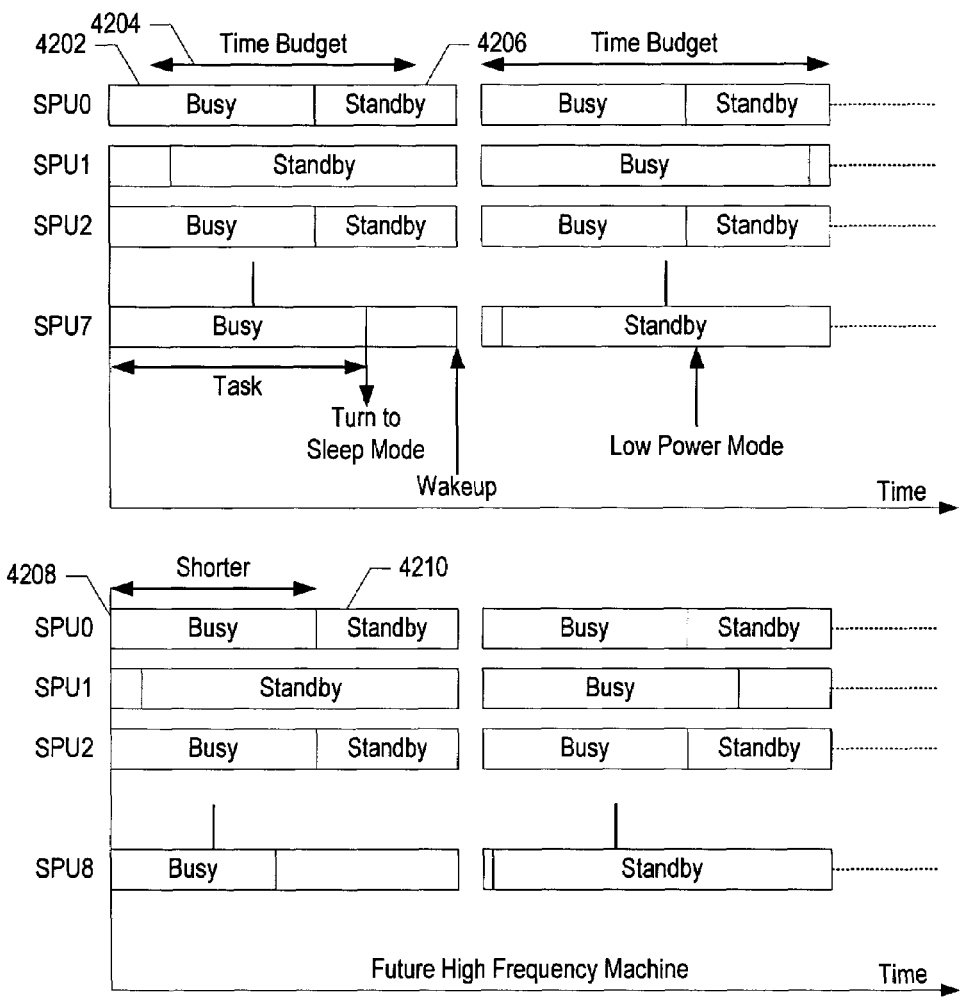
FIG. 42 illustrates a scheme for an absolute timer for coordinating the parallel processing of applications and data by SPUs in accordance with the present invention.

The processors of system 101 also employ an absolute timer. The absolute timer provides a clock signal to the SPUs and other elements of a PU which is both independent of, and faster than, the clock signal driving these elements. The use of this absolute timer is illustrated in FIG. 42.

As shown in this figure, the absolute timer establishes a time budget for the performance of tasks by the SPUs. This time budget provides a time for completing these tasks which is longer than that necessary for the SPUs' processing of the tasks. As a result, for each task, there is, within the time budget, a busy period and a standby period. All spulets are written for processing on the basis of this time budget regardless of the SPUs' actual processing time or speed.

For example, for a particular SPU of a PU, a particular task may be performed during busy period 4202 of time budget 4204. Since busy period 4202 is less than time budget 4204, a standby period 4206 occurs during the time budget. During this standby period, the SPU goes into a sleep mode during which less power is consumed by the SPU.

The results of processing a task are not expected by other SPUs, or other elements of a PU, until a time budget 4204 expires. Using the time budget established by the absolute timer, therefore, the results of the SPUs' processing always are coordinated regardless of the SPUs' actual processing speeds.

In the future, the speed of processing by the SPUs will become faster. The time budget established by the absolute timer, however, will remain the same. For example, as shown in FIG. 42, an SPU in the future will execute a task in a shorter period and, therefore, will have a longer standby period. Busy period 4208, therefore, is shorter than busy period 4202, and standby period 4210 is longer than standby period 4206. However, since programs are written for processing on the basis of the same time budget established by the absolute timer, coordination of the results of processing among the SPUs is maintained. As a result, faster SPUs can process programs written for slower SPUs without causing conflicts in the times at which the results of this processing are expected.

In lieu of an absolute timer to establish coordination among the SPUs, the PU, or one or more designated SPUs, can analyze the particular instructions or microcode being executed by an SPU in processing an spulet for problems in the coordination of the SPUs' parallel processing created by enhanced or different operating speeds. "No operation" ("NOOP") instructions can be inserted into the instructions and executed by some of the SPUs to maintain the proper sequential completion of processing by the SPUs expected by the spulet. By inserting these NOOPs into the instructions, the correct timing for the SPUs' execution of all instructions can be maintained.

Figure 43:
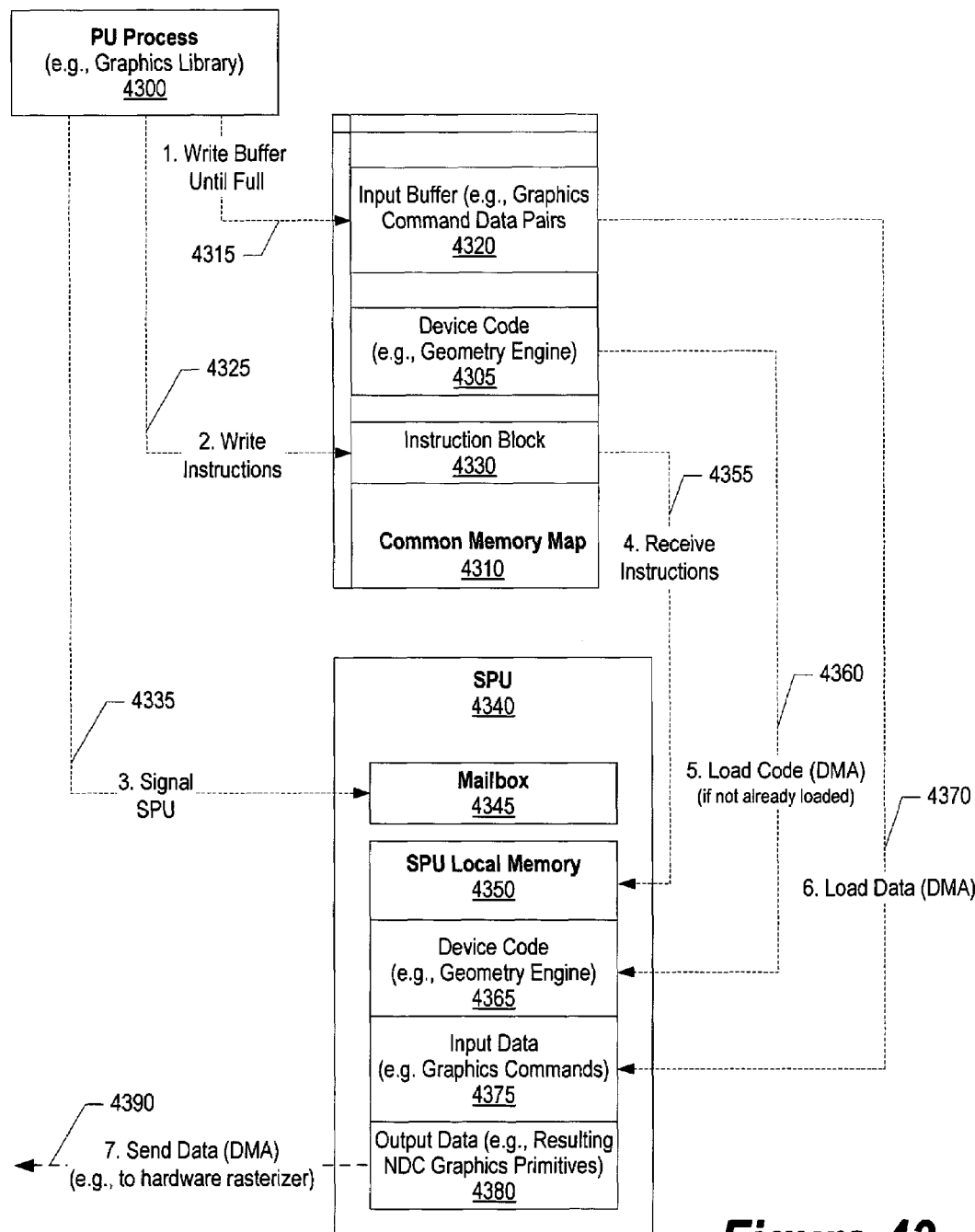
FIG. 43 is a system diagram showing an SPU acting as a virtual device.

FIG. 43 is a system diagram showing an SPU acting as a virtual device. A process running on a different processor, such as the PU processor is depicted as PU Process 4300. While in one embodiment process 4300 is run on the PU processor, it could also be run on a different SPU processor as SPU processor 4340. Importantly, the processor running process 4300 and SPU processor 4340 share a common memory 4310 from which SPU processor 4340 can save and retrieve data.

In one embodiment using SPU processor 4340 as a virtual device, process 4300 writes data to a buffer that, in a traditional system, is transferred to an actual device. In first transmissions 4315, Process 4300, such as a graphics library, writes data to the device's input buffer (4320) until the buffer is full (or nearly full). Device input buffer 4320 is stored in common memory 4310. Common memory 4310 is shared between the processor running process 4300 and SPU 4340.

When the device's input buffer is full (or nearly full), second transmission 4325 is made writing instructions to instruction block 4330, which is also stored in the common memory. Instruction block 4330 details the address of the input buffer, an output buffer (if applicable), and an address of device code 4305 that the process is requesting to be performed on the data stored in the input buffer. In addition, the instruction block may include signaling instructions indicating the method by which the SPU is to signal when the processing is completed. If the SPU is dedicated to performing a particular device function, the address of the device code may also be omitted as the SPU, in this case, performs the same code to process the designated input buffer.

In the third transmission (4335), process 4300 signals SPU 4340 by writing the address of instruction block 4330 into the SPU's mailbox (4345). The mailbox is capable of storing multiple addresses in a FIFO queue, with each address pointing to a different instruction block. SPU 4340 retrieves entries from mailbox 4345 in a FIFO fashion. Instruction block 4330 corresponding to the address stored in mailbox 4355 is retrieved, in fourth transmission 4355, by SPU 4340 using a DMA command to read instruction block 4330 from common memory 4310 and store it in its local memory 4350. The retrieved instruction block indicates the address of input buffer 4320 and code address 4305. If the device code has not already been loaded into the SPU's local memory, at fifth transmission 4360 the device code is retrieved using a DMA command to read device code 4305 from common memory 4310 and store it in SPU's local memory 4340 in local memory location 4365.

During the sixth transmission (4370), input buffer 4320 indicated by the address in the retrieved instruction block is read from common memory 4310 using a DMA command and stored in the SPU's local memory at location 4375. If the input buffer is too large to be completely read into the area of the SPU's local memory assigned for the input data, the data is retrieved in successive blocks. Device code 4365 stored in the SPU's local memory is used to process the input data (4375) stored in the SPU's local memory and store the results in the SPU's local memory at location 4380. An example is using the SPU as a geometry engine to process graphics commands. When the data has been processed by the SPU, in the seventh transmission (4390), the output data, such as graphics primitives data resulting from a geometry engine, are sent to an output device. The output device can also be another SPU acting as another virtual device, such as a hardware rasterizer, with SPU 4340 setting up an instruction block indicating the device code address and input code address needed for the next SPU to process output data 4380 and signaling the next SPU by writing the address of the instruction block into the next SPU's mailbox. The output device can also be an actual hardware device, such as a hardware rasterizer, with SPU 4340 writing output data 4380 to the hardware device using a DMA write command.

Figure 44:
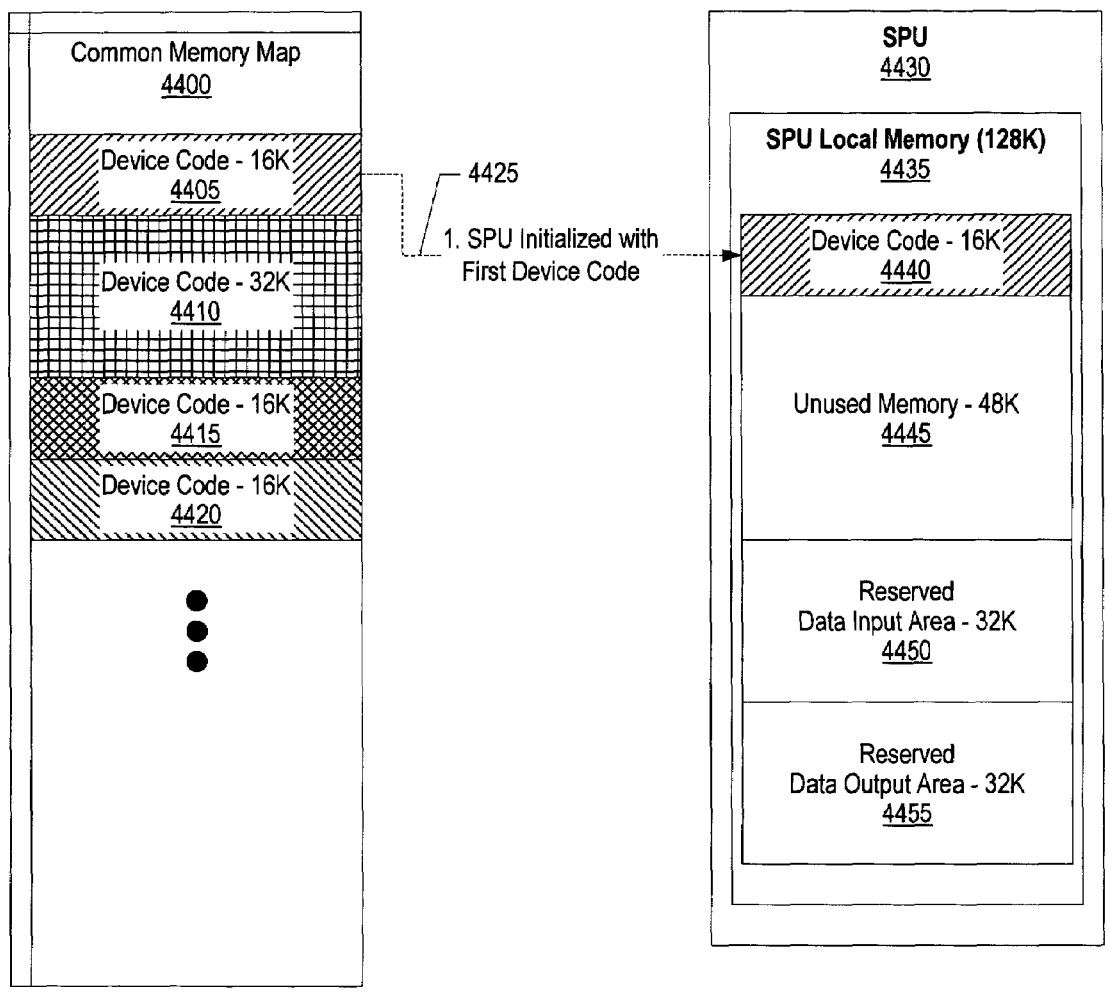
FIGS. 44-46 show various device code modules being loaded into the local memory of the SPU.
Figure 45:
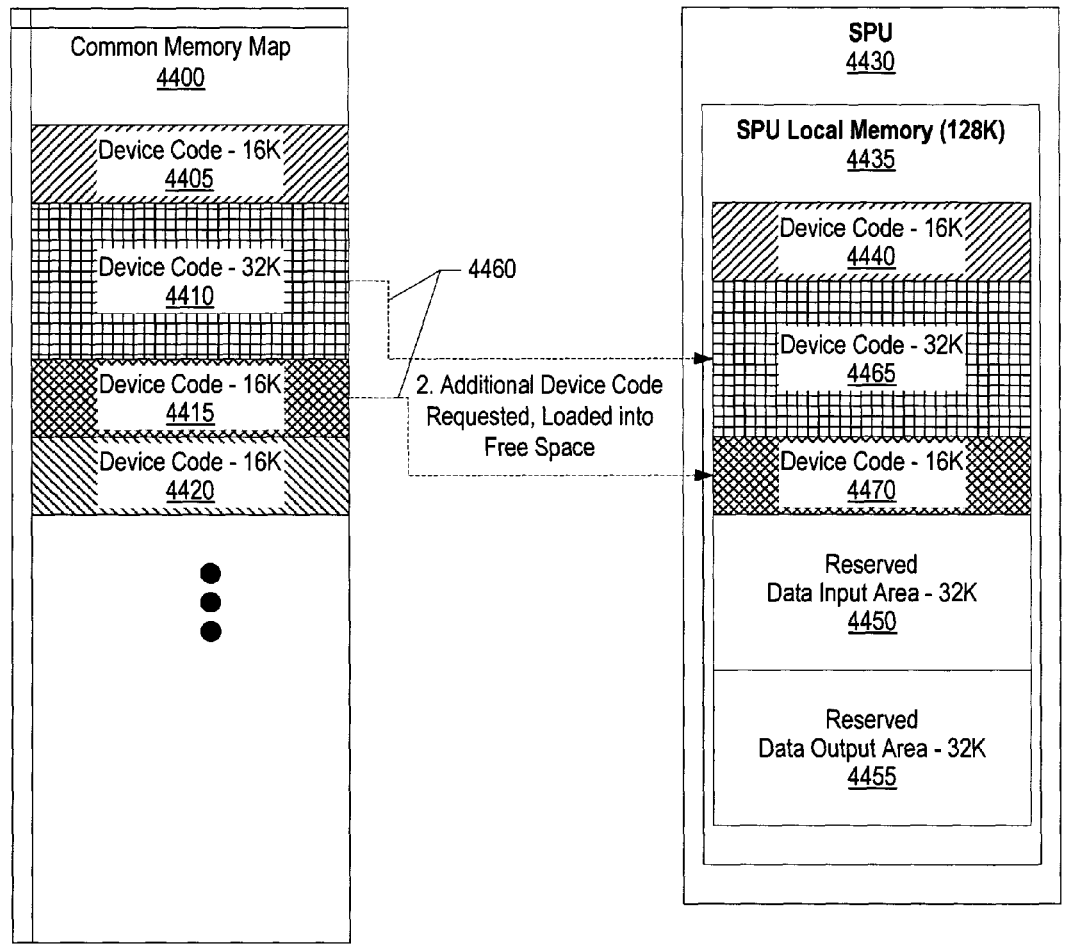
Figure 46:
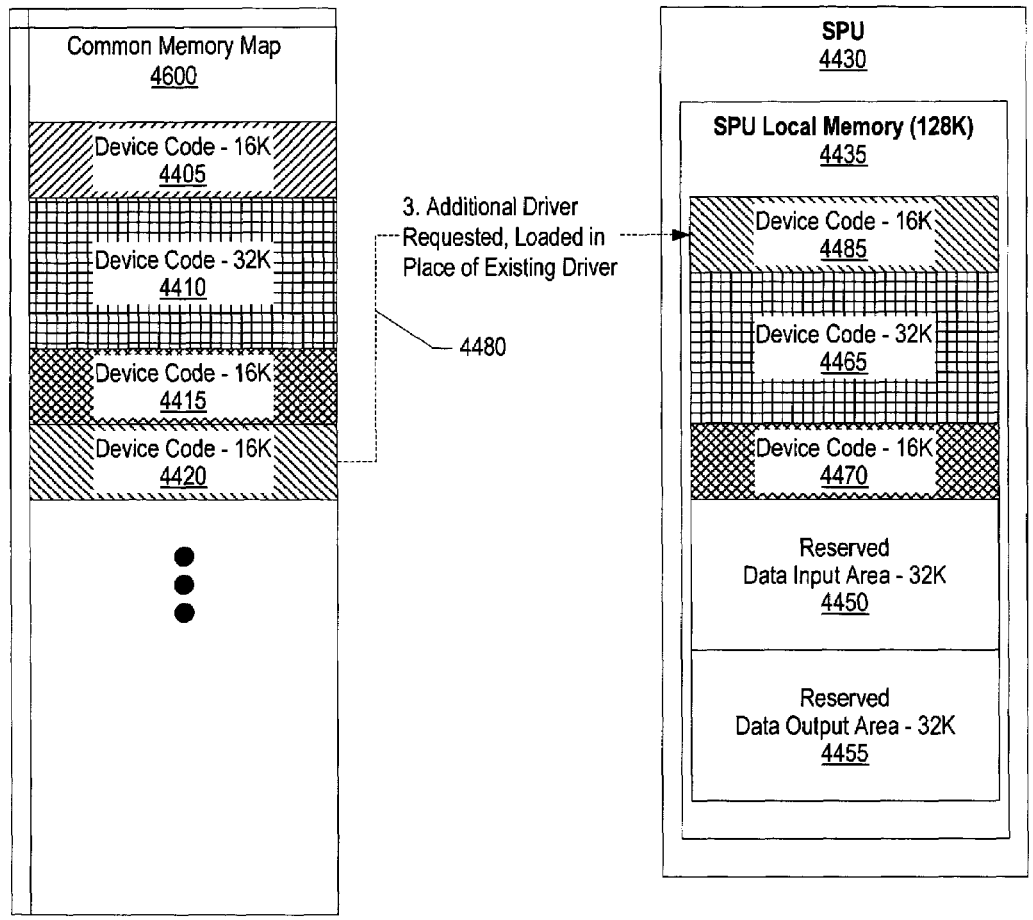

FIGS. 44-46 show various device code modules being loaded into the local memory of the SPU. Common memory 4400 is shown with four different device codes of various sizes. In the example shown, common memory 4400 includes device code 4405 which is 16 kilobytes (16K) in size, device code 4410 which is 32K in size, device code 4415 which is 16K in size, and device code 4420 which is also 16K in size. In FIG. 44, SPU 4430 is shown being initialized with device code 4405 which is read, using a DMA command, and stored in the SPU's local memory 4435. In the example shown, the SPU's local memory is 128K with 32K being reserved for storage of input data (input data area 4450) and another 32K being reserved for storage of resulting data (output data area 4455). Therefore, 64K is unreserved and able to be used to store device code. After first loading device code 4405 (DMA read 4425), 16K of the unreserved memory is allocated to the loaded device code (SPU local data area 4440) with 48K remaining unused (unused data area 4445).

In FIG. 45, device code 4410 (32K) and device code 4415 (16K) are loaded (DMA reads 4460) filling the remaining unused local memory in SPU 4430. At this point, if a request is received for either device code 4405, 4410, or 4415, the corresponding device code, 4440, 4465, and 4470, respectively, can be immediately executed without waiting to load the device code from common memory 4400.

However, in FIG. 46, SPU 4430 is requested to perform an additional device code function (device code 4420) which is 16K in size. Because there is not enough unused memory in SPU local memory 4435 to load the requested device code, device code previously stored in the SPU's local memory is overwritten to accommodate the request. In the example shown, device code 4440 stored in the SPU's local memory is overwritten with device code 4420 read from common memory 4600 (DMA read 4480). The SPU now has device code 4485, 4465, and 4470 loaded and can perform any of these device functions immediately upon request. If device code 4405 is again requested, one of the currently loaded device codes (4485, 4465, or 4470) will be overwritten to accommodate the request.

Figure 47:
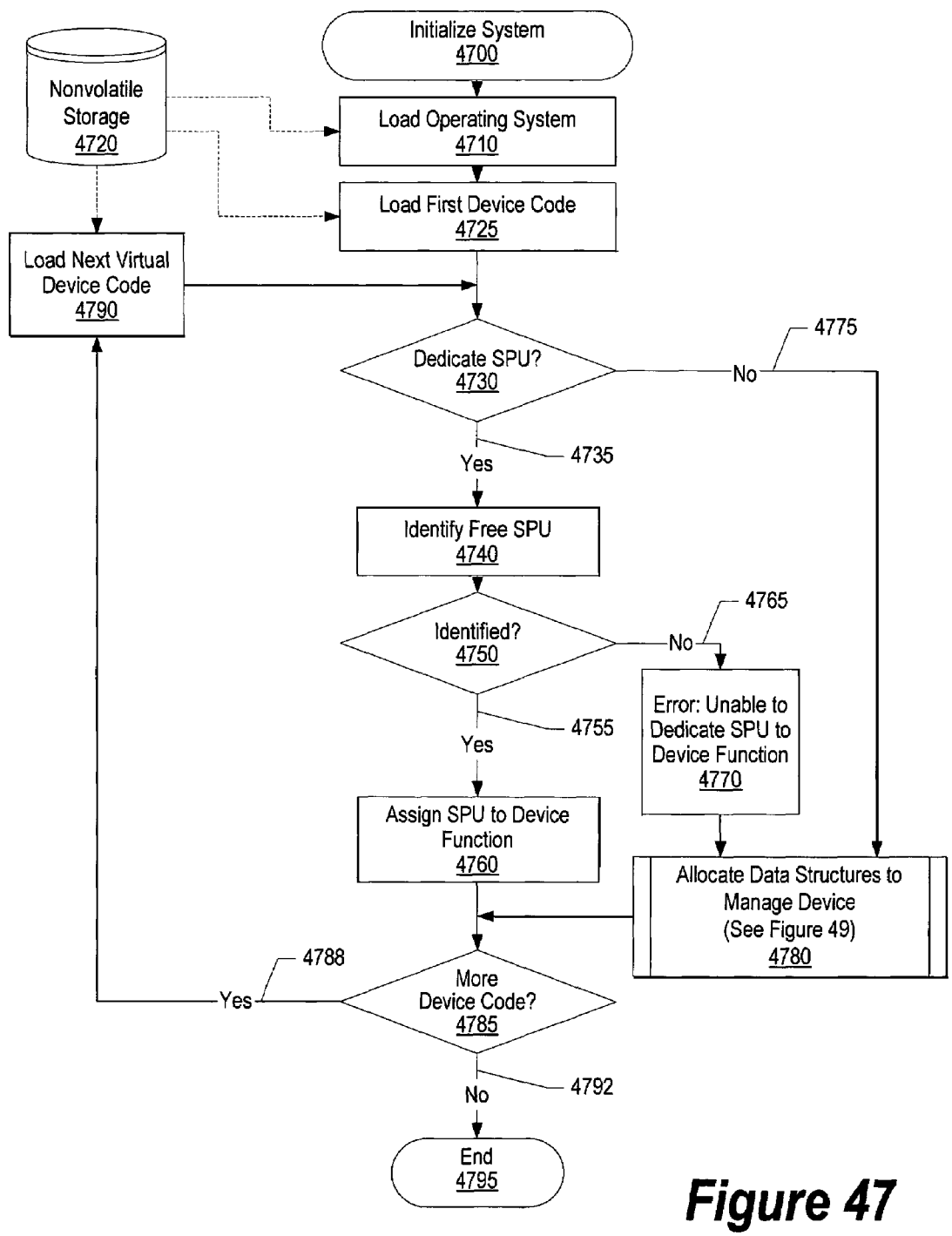
FIG. 47 is a flowchart showing the initialization of a computer system using device code adapted to be executed by an SPU.

FIG. 47 is a flowchart showing the initialization of a computer system using device code adapted to be executed by an SPU. Processing commences at 4700 whereupon, at step 4710, the computer system's operating system is loaded from nonvolatile storage device 4720. At step 4725, the first device code is loaded from nonvolatile storage device 4720 and stored in the common memory so that it can be subsequently retrieved and loaded by one of the SPUs.

A determination is made as to whether an SPU is to be dedicated to perform the loaded device code (decision 4730). If an SPU is to be dedicated, decision 4730 branches to "yes" branch 4735 whereupon a free (i.e., available) SPU is identified at step 4740. A determination is made as to whether an available SPU was able to be identified (decision 4750). For example, all the SPUs may have already been assigned to different tasks. If an available SPU was identified, decision 4750 branches to "yes" branch 4755 whereupon the identified SPU is assigned to the device function. On the other hand, if an available SPU was unable to be identified, decision 4750 branches to "no" branch 4765 whereupon, at step 4765, an error is generated indicating that the system was unable to dedicate an SPU to perform the function and data structures are added to manage the device among one or more non-dedicated SPUs (predefined process 4780, see FIG. 49 and corresponding text for processing details). Returning to decision 4730, if the device code is to be performed by non-dedicated SPUs, then decision 4730 branches to "no" branch 4775 whereupon data structures are also added to manage the device among one or more non-dedicated SPUs (predefined process 4780, see FIG. 49 and corresponding text for processing details).

A determination is made as to whether there are additional device code functions to process (decision 4785). If there are more device code functions, decision 4785 branches to "yes" branch 4788 whereupon the code for the next virtual device is read from nonvolatile storage 4720 at step 4790 and processing loops back to process the newly read device code. This looping continues until there are no more device code functions to process, at which point decision 4785 branches to "no" branch 4792 and initialization processing ends at 4795.

Figure 48:
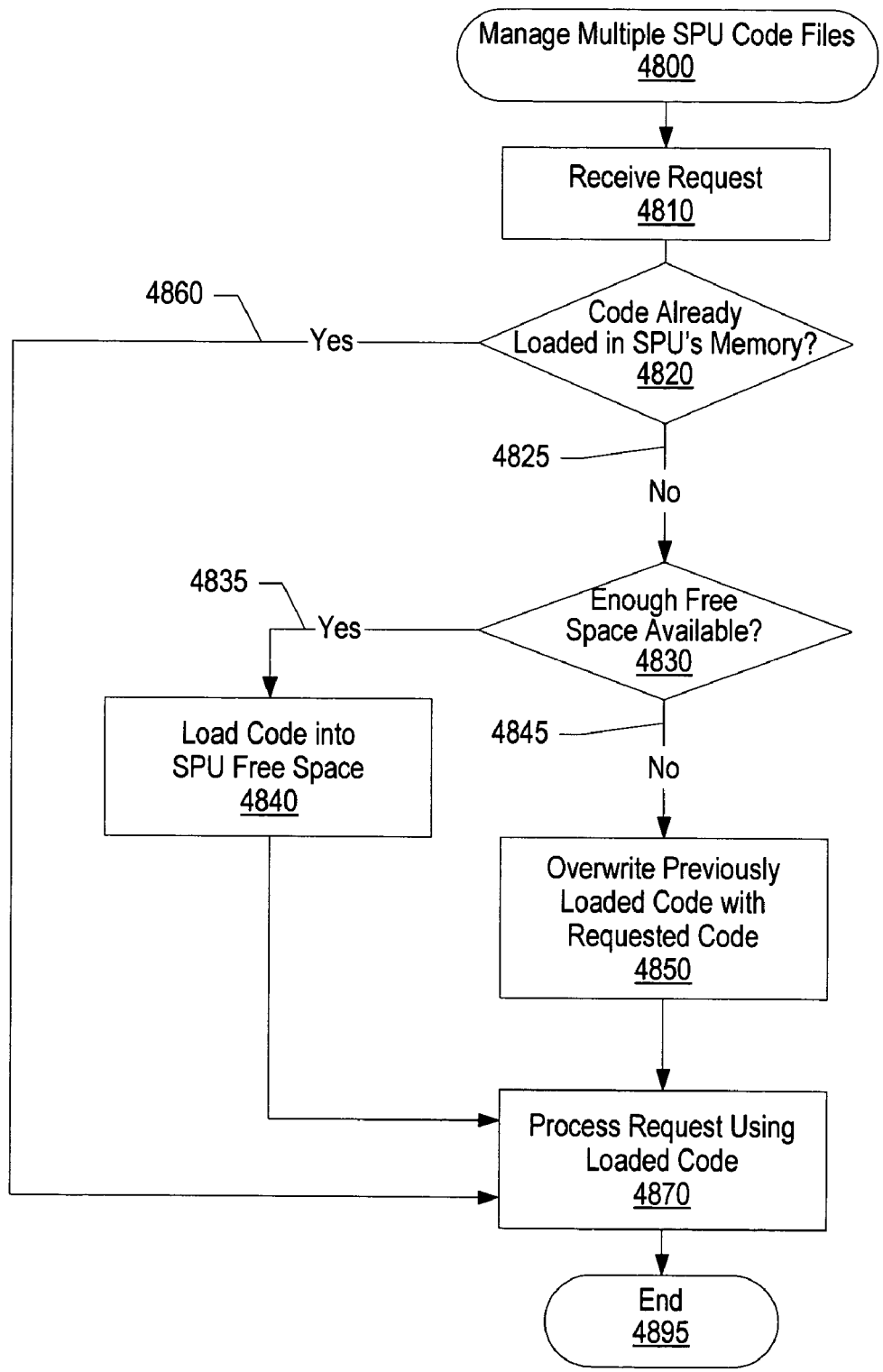
FIG. 48 is a flowchart showing steps taken in managing multiple device code files by an SPU.

FIG. 48 is a flowchart showing steps taken in managing multiple device code files by an SPU. Processing commences at 4800 whereupon, at step 4810, a request is received by an SPU (i.e., by signaling the SPU's mailbox with an address of an instruction block). A determination is made as to whether the device code has already been loaded in the SPU's local memory (decision 4820). If the device code is not already loaded in the SPU's local memory, decision 4820 branches to "no" branch 4825 whereupon another determination is made as to whether there is enough free (i.e., unallocated) space in the SPU's local memory to load the device code (decision 4830). If there is enough free space, decision 4830 branches to "yes" branch 4835 whereupon, at step 4840, the device code is loaded into the free space in the SPU's local storage (i.e., with a DMA read command). On the other hand, if there is not enough free space available for the device code, decision 4830 branches to "no" branch 4845 whereupon, at step 4850, the requested device code is loaded (i.e., with a DMA read command) and overwrites device code that was previously loaded in the SPU. Once the device code is loaded, at step 4870 the code is executed in order to process the request. Returning to decision 4820, if the device code was already in the SPU's local memory, decision 4820 branches to "yes" branch 4860 and the code is executed at step 4870. Processing thereafter ends at 4895.

Figure 49:
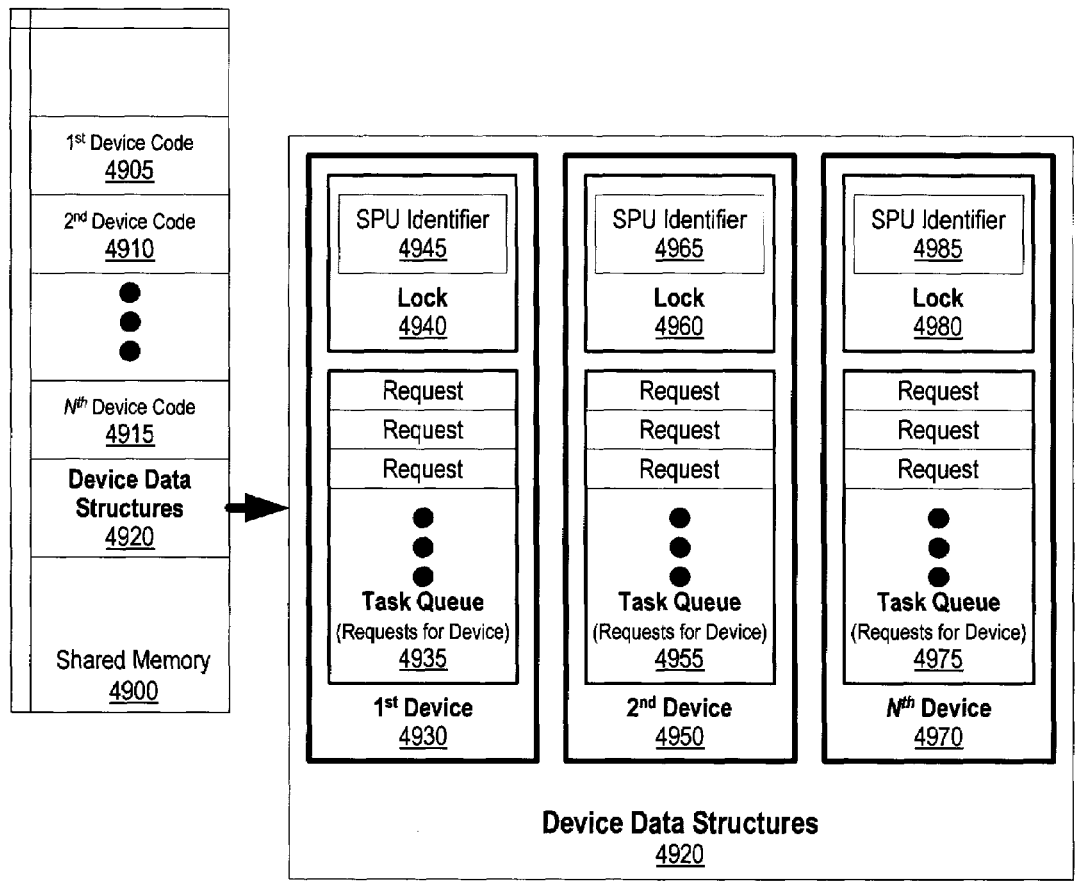
FIG. 49 is a diagram showing data structures used to manage multiple virtual devices that can be performed by one of the SPUs.

FIG. 49 is a diagram showing data structures used to manage multiple virtual devices that can be performed by one of the SPUs. Shared common memory 4900 includes device code for various device functions that is performed on the SPUs (device code 4905, 4910, and 4915). Data structures 4920 are initialized to manage the devices. A data structure is established for each device (data structures 4930, 4950, and 4970 corresponding to device code 4905, 4910, and 4915, respectively). Each of these data structures includes a task queue and a locking structure (task queues 4935, 4955, and 4975 corresponding to device code 4905, 4910, and 4915, respectively, and locking structures 4940, 4960, and 4980 corresponding to device code 4905, 4910, and 4915, respectively). Requests are stored in the task queues for a given device. For example, if a process is requesting the first device code (4905), then an address of an instruction block is written into the task queue that has been established to manage the first device code (task queue 4935). The locking structure include an SPU identifier indicating the SPU, if any, that has acquired the lock and, therefore, is currently performing the device code (SPU identifiers 4945, 4965, and 4985 corresponding to device code 4905, 4910, and 4915, respectively). Periodically, when an SPU has no device code tasks to perform, the SPU checks the various data structures to determine whether there are any device codes that have been requested but do not have an SPU assigned. When an SPU identifies such a data structure, the SPU acquires the lock by writing its identifier in the corresponding locking structure and processes the waiting requests stored in the task queue. When all the requests have been processed, the SPU is free to release the lock and search for another device code that has been requested but does not have an SPU assigned.

Figure 50:
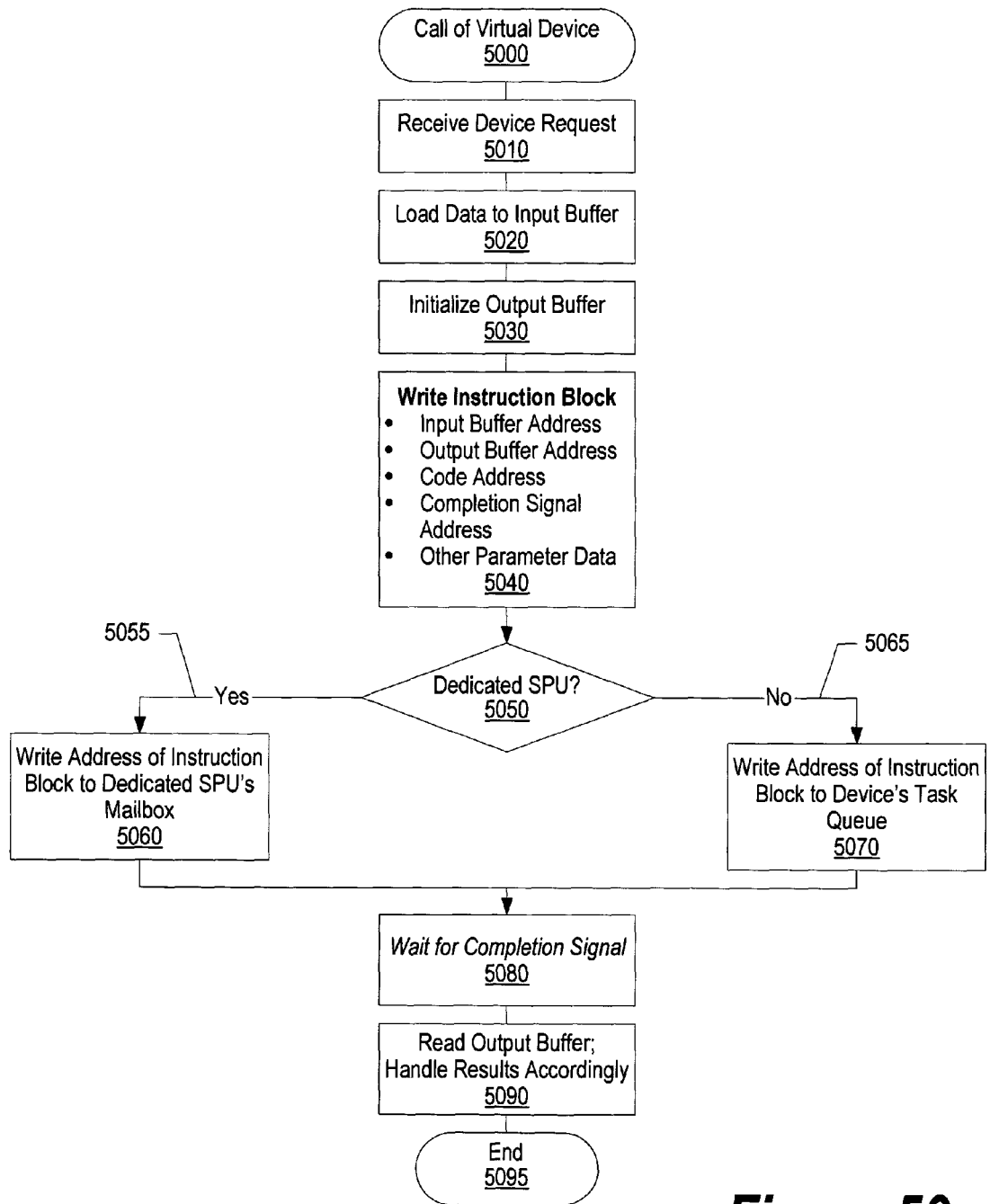
FIG. 50 is a flowchart showing steps taken by a process in calling a virtual device executed by one of the SPUs.

FIG. 50 is a flowchart showing steps taken by a process in calling a virtual device executed by one of the SPUs. When a process running on a PU or one of the SPUs needs to call a virtual device, the steps in FIG. 50 are performed. The actual application running on the PU or SPU may actually call an API included in a library, such as a graphics library, with the library API code actually calling the virtual device loaded on one of the SPUs.

Processing commences at 5000 whereupon, at step 5010, a device request is received (i.e., by the library API code). At step 5020, the input data that is to be processed is loaded into an input buffer located in the common (shared) memory. At step 5030, the output buffer (if any) is initialized. With some virtual devices, data is returned, while with other device requests only a return code is returned. For example, if the virtual device is a geometry engine with the output being sent to a hardware rasterizer the output buffer might not be needed or might only be used to store a return code or error value. At step 5040, an instruction block is written to the shared memory indicating the address of the input buffer, the address of the output buffer (if any), the device code address, signaling instructions (such as a write-back address), and any other parameter data needed to perform the device request.

A determination is made as to whether the requested device code is performed by a dedicated SPU (decision 5050). If the device code is performed by a dedicated SPU, decision 5050 branches to "yes" branch 5055 whereupon, at step 5060, the address of the instruction block is written to the dedicated SPU's mailbox. On the other hand, if the device code is not performed by a dedicated SPU, then decision 5050 branches to "no" branch 5065 whereupon, at step 5070, the address of the instruction block is written to the devices task queue data structure so that a non-dedicated SPU will locate the request and perform the requested device code.

After the request has been made, either through an SPU's mailbox or the device's task queue, processing waits for a completion signal (step 5080) indicating that the SPU has finished the requested processing. At step 5090, the output buffer or write-back address is read and the results are handled accordingly (i.e., error processing if an error occurred, further use or processing of data resulting from the virtual device, etc.). Processing thereafter ends at 5095.

Figure 51:
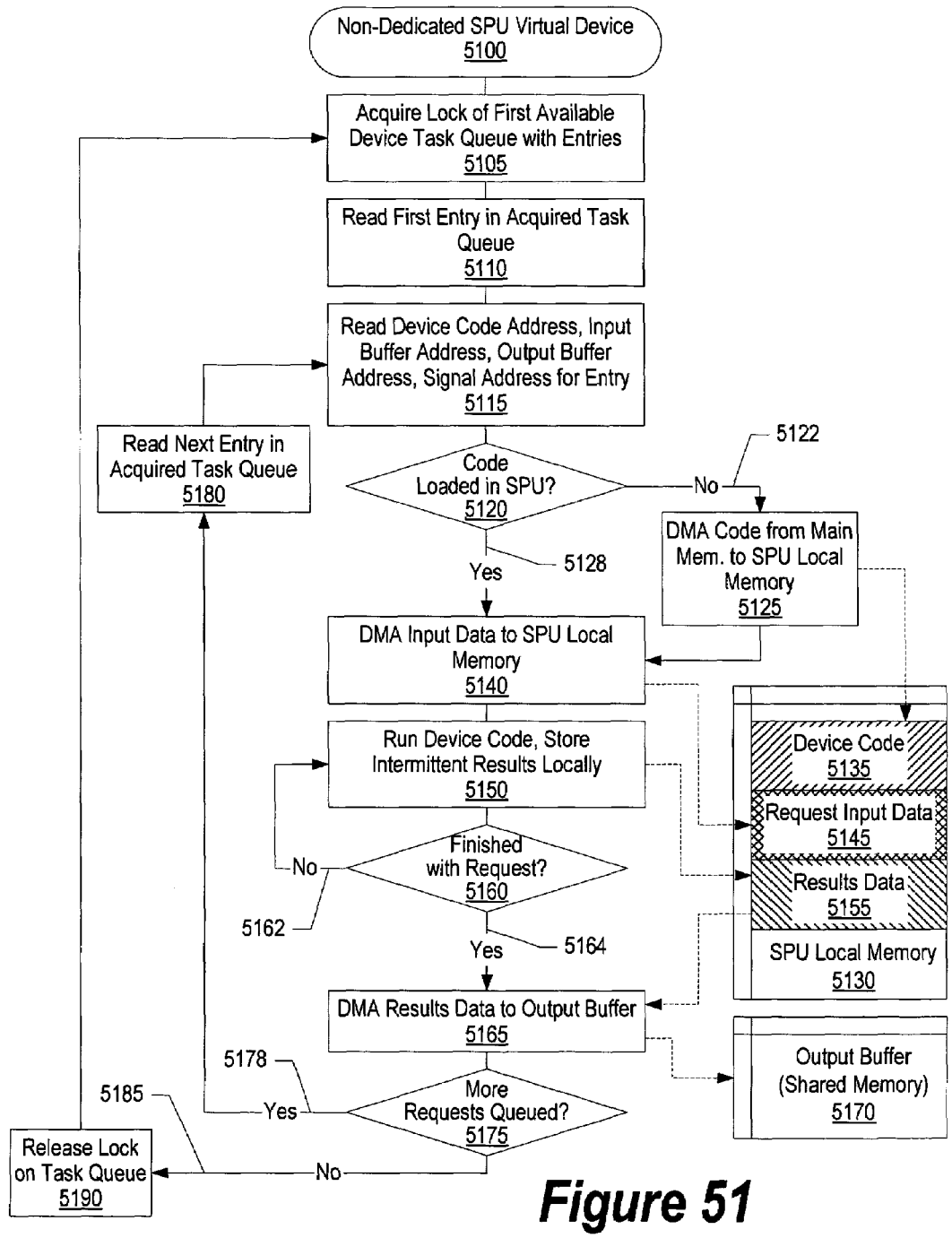
FIG. 51 is a flowchart showing steps taken by non-dedicated SPUs in identifying and performing requested virtual device tasks.

FIG. 51 is a flowchart showing steps taken by non-dedicated SPUs in identifying and performing requested virtual device tasks. Processing commences at 5100 whereupon the non-dedicated SPU acquires the lock of the data structure for the first available (i.e., not yet assigned) device with task queue entries (step 5105). At step 5110, the first entry in the acquired task queue is read. The read task queue entry indicates the address of the instruction block which is read at step 5115, thus providing the device code address, input buffer address, output buffer address (if any), signaling instructions (if any), and any additional parameters needed to perform the device request. A determination is made as to whether the device code is already loaded in the SPU's local memory (decision 5120). If the device code has not yet been loaded in the SPU's local memory, decision 5120 branches to "no" branch 5122 whereupon the device code is read from the shared memory to SPU local memory 5130 using a DMA command (step 5125) resulting in device code 5135 stored in the local memory. On the other hand, if the device code is already loaded in the SPU's local memory, decision 5120 branches to "yes" branch 5128 bypassing step 5125.

The data located in the input buffer is read from the shared memory and stored in the SPU's local memory using a DMA command (step 5140) resulting in input data 5145 stored in SPU local memory 5130. The device code is executed (step 5150) and results of the code are written to output data area 5155 stored in SPU local memory 5130. If either the input data or output data are too large for the SPU local memory, then the input data can be read in blocks, stored in the SPU local memory and processed. In addition, the output data can be written until the output data area is full and then the output data can be written to the output buffer (i.e., a buffer space in the shared memory or sent to an actual hardware device) intermittently.

A determination is made as to whether the input data is finished being processed by the device code (decision 5160). If the input data is not finished being processed, decision 5160 branches to "no" branch 5162 which loops back and continues processing the input data. This looping continues until the input data is finished being processed, at which point decision 5160 branches to "yes" branch 5164.

At step 5165, the results (stored in location 5155 within the SPU's local memory) are written to an output buffer location, which may be an output buffer stored in the shared memory (such as buffer 5170) or may be an actual hardware device, such as a hardware rasterizer. A determination is made as to whether there are more requests for the task queue, the lock for which is being held by the SPU (decision 5175). If there are more requests queued in the tasks queue, decision 5175 branches to "yes" branch 5178 whereupon the next entry in the acquired task queue is read (step 5180) and processing loops back to handle the next entry. This looping continues until there are no more entries in the task queue (i.e., indicating that no processes are currently requesting the device), at which point decision 5175 branches to "no" branch 5185 whereupon the lock corresponding to the task queue is released and the SPU looks for another device task queue that has waiting entries but has not been acquired by another SPU.

Figure 52:
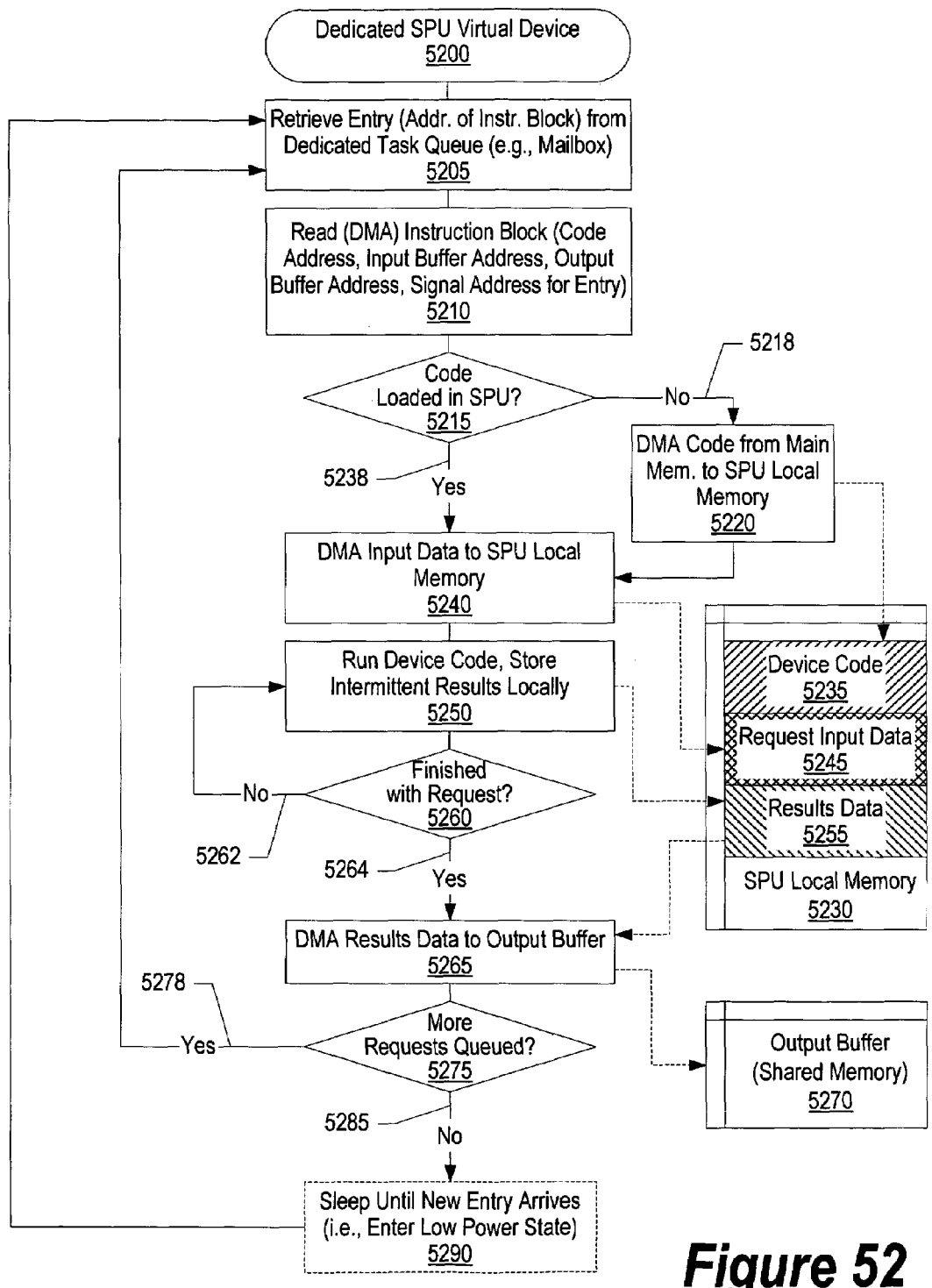
FIG. 52 is a flowchart showing steps taken by a dedicated SPU in performing requested virtual device tasks.

FIG. 52 is a flowchart showing steps taken by a dedicated SPU in performing requested virtual device tasks. Processing commences at 5200 whereupon, at step 5205, a request is retrieved indicating the address of an instruction block. In one embodiment, the request of the instruction block is written to a dedicated task queue data structure (see FIG. 49), while in another embodiment, the instruction block address is written to the dedicated SPU's mailbox. The instruction block is read at step 5210, thus providing the device code address, input buffer address, output buffer address (if any), signaling instructions (if any), and any additional parameters needed to perform the device request. A determination is made as to whether the device code is already loaded in the SPU's local memory (decision 5215). If the device code has not yet been loaded in the SPU's local memory, decision 5215 branches to "no" branch 5218 whereupon the device code is read from the shared memory to SPU local memory 5230 using a DMA command (step 5220) resulting in device code 5235 stored in the local memory. On the other hand, if the device code is already loaded in the SPU's local memory, decision 5215 branches to "yes" branch 5238 bypassing step 5220.

The data located in the input buffer is read from the shared memory and stored in the SPU's local memory using a DMA command (step 5240) resulting in input data 5245 stored in SPU local memory 5230. The device code is executed (step 5250) and results of the code are written to output data area 5255 stored in SPU local memory 5230. If either the input data or output data are too large for the SPU local memory, then the input data can be read in blocks, stored in the SPU local memory and processed. In addition, the output data can be written until the output data area is full and then the output data can be written to the output buffer (i.e., a buffer space in the shared memory or sent to an actual hardware device) intermittently.

A determination is made as to whether the input data is finished being processed by the device code (decision 5260). If the input data is not finished being processed, decision 5260 branches to "no" branch 5262 which loops back and continues processing the input data. This looping continues until the input data is finished being processed, at which point decision 5260 branches to "yes" branch 5264.

At step 5265, the results (stored in location 5255 within the SPU's local memory) are written to an output buffer location, which may be an output buffer stored in the shared memory (such as buffer 5270) or may be an actual hardware device, such as a hardware rasterizer. A determination is made as to whether there are more requests for the virtual device (decision 5275). If there are more requests, decision 5275 branches to "yes" branch 5278 whereupon processing loops back to handle the request. If there are no additional requests queued, decision 5275 branches to "no" branch 5285 whereupon the SPU enters a low power state and waits for a new request to be written to the SPU's mailbox (step 5290).

Figure 53:
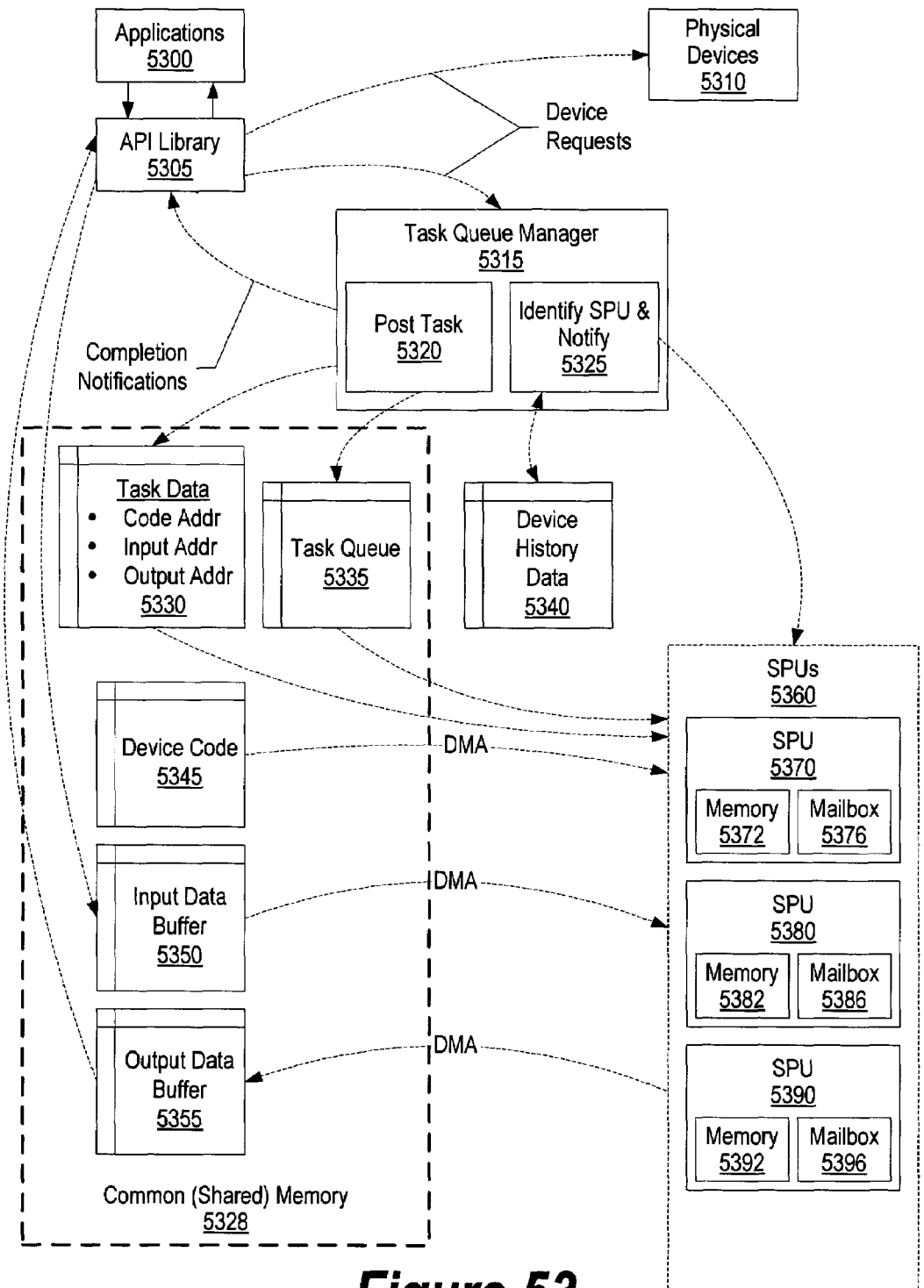
FIG. 53 is a diagram showing a task queue manager being used to facilitate the handling of virtual device tasks by SPUs.

FIG. 53 is a diagram showing a task queue manager being used to facilitate the handling of virtual device tasks by SPUs. Applications 5300 request functions that are often performed by APIs in libraries, such as API library 5305. These functions may include device instructions and requests. The APIs in the library can be programmed to send the requests to physical devices 5310 or to SPUs that are performing device code, such as a geometry engine used in graphics applications. When the functions are performed by SPUs, the request is sent to task queue manager 5315 which provides services on behalf of the requesting application and API. These services include posting the requested task to the appropriate queues (process 5320) and sending the requests to SPUs that have been identified (process 5325). The task queue manager also sends completion notifications back to the requesting API/application.

In posting a task, the task queue manager writes an instruction block 5330 that includes the address of the device code being requested, the addresses of the input and output buffers, signaling instructions (if needed) and any parameters needed to perform the requested device code. In addition, the address of the instruction block is written to FIFO task queue 5335 so that the request will be recorded and handled by the identified SPU.

In identifying the SPU to perform the request, task queues and device histories are checked to determine whether an SPU is currently performing the device code and, if no SPU is currently performing the device code, to select the SPU, based on device history data 5340, that recently performed the code and, therefore, might still have a copy of the code available in the SPU's local memory.

SPUs 5360 include a number of SPUs that each have a local memory and a mailbox. In addition, each of the SPUs is able to write/read data to/from common (shared) memory 5328 using DMA commands. In the example shown, the SPUs include SPUs 5370, 5370, and 5390. Each of these SPUs have a local memory, 5372, 5382, and 5392, respectively. Each of these SPUs also have a mailbox, 5376, 5386, and 5396, respectively. When an SPU receives a request, it retrieves the corresponding instruction block 5330 with details regarding the request. The SPU also retrieves device code 5345, input buffer data 5350, and an output buffer address 5355 (optional). The SPU reads data from the instruction block and the input buffer using DMA commands and writes data to the output buffer (or to another SPU or physical device) also using DMA commands.

Figure 54:
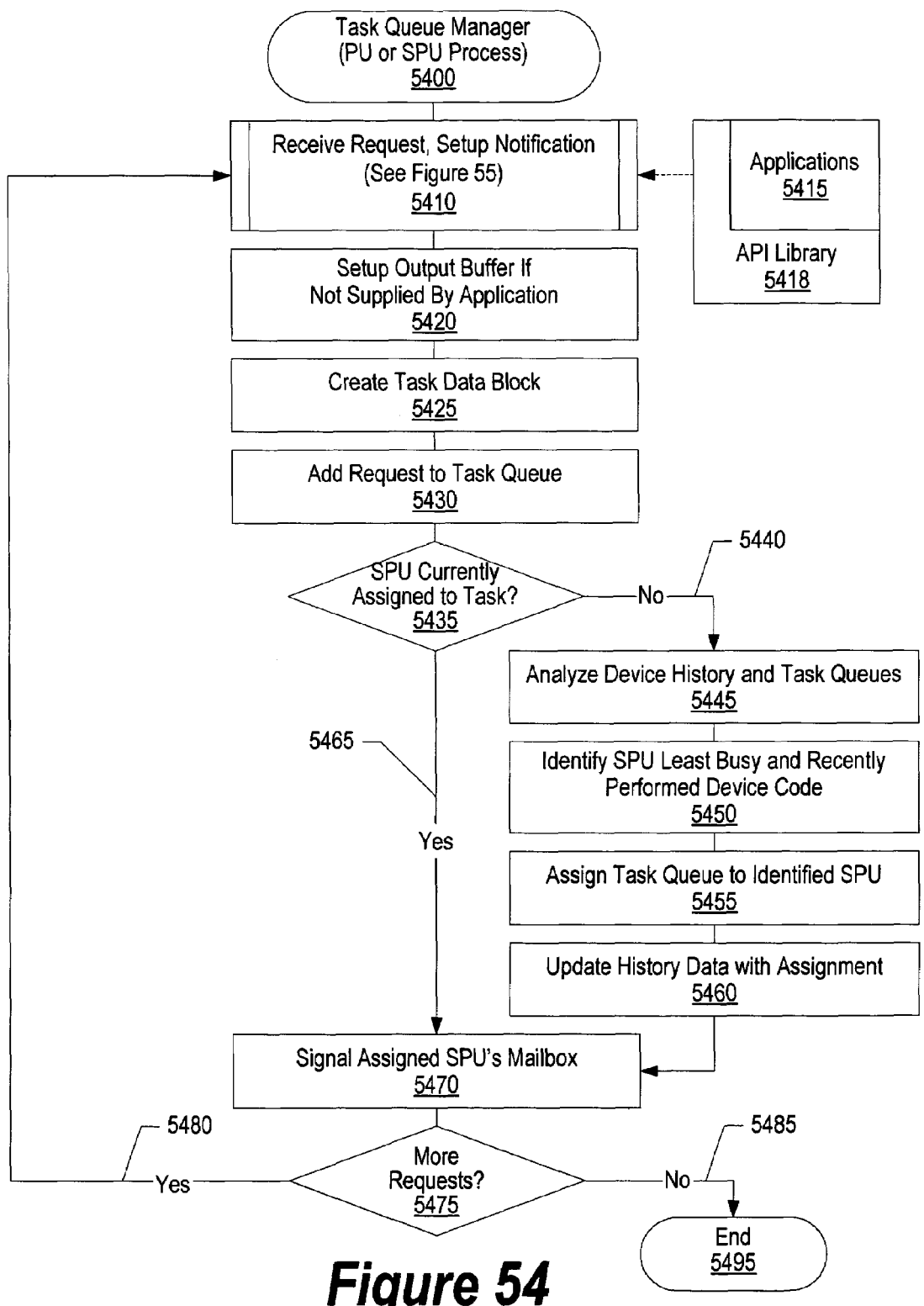
FIG. 54 is a flowchart showing steps taken by the task queue manager in facilitating the handling of device tasks by SPUs.

FIG. 54 is a flowchart showing steps taken by the task queue manager in facilitating the handling of device tasks by SPUs. Task queue manager processing commences at 5400. The task queue manager can be executed as a PU process or as an SPU process.

Figure 55:
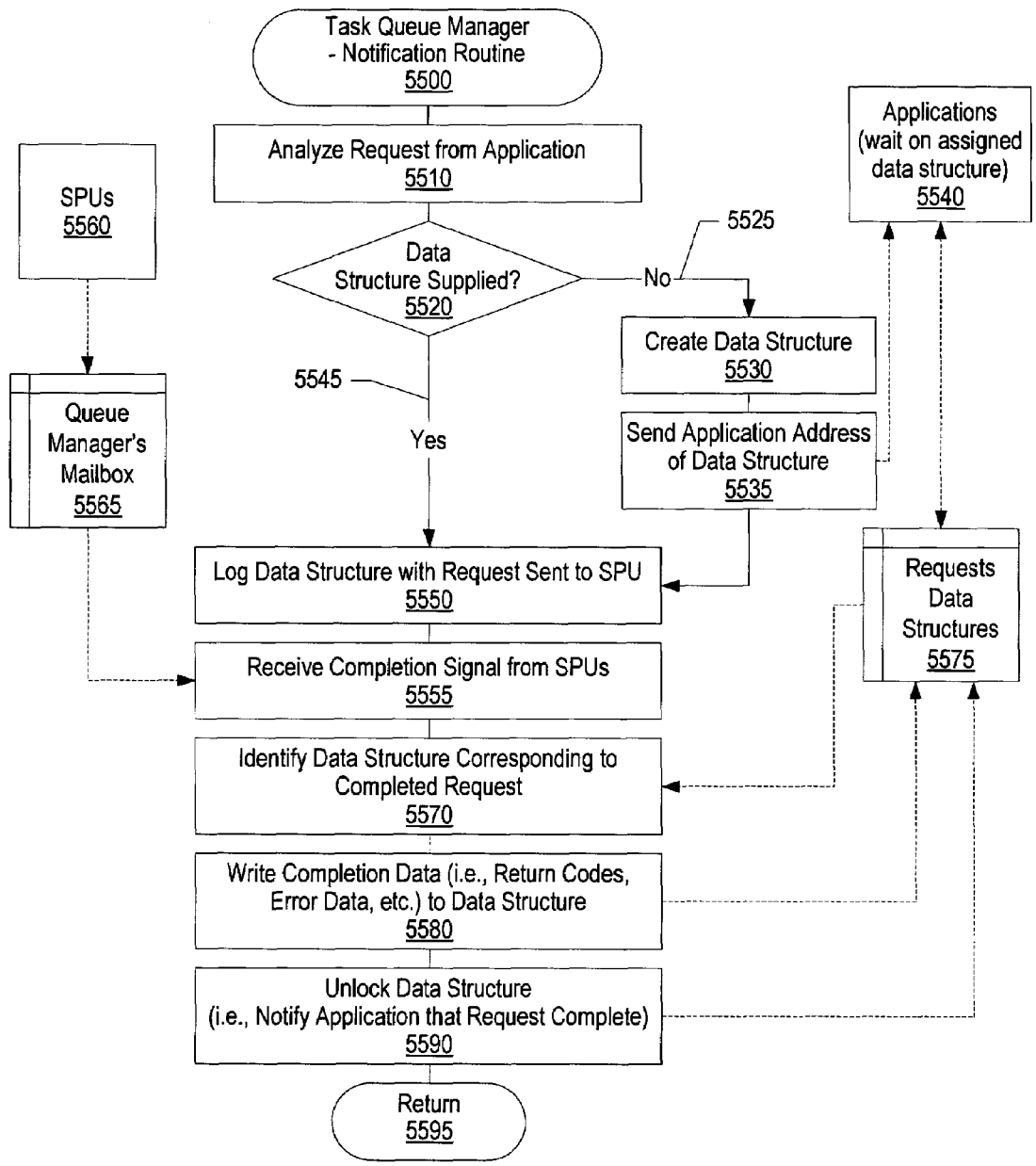
FIG. 55 is a flowchart showing the task queue manager notifying applications that previously requested device requests.

The task queue manager receives a request from applications through APIs included in API library 5418 (predefined process 5410, see FIG. 55 and corresponding text for processing details). An example of such an API library is a graphics library used to perform graphics functions. At step 5420, an output buffer (or write-back address) is set up to retrieve data, or return codes, resulting from the device code processing if the application (i.e., API) has not supplied an output buffer.

At step 5425, a task data block (i.e., information block) is created with the data that the SPU will need to process the request, such as the device code address, the input buffer address, the output buffer address (if needed), signaling instructions (such as a write-back address), and any additional parameters that might be needed to execute the device code request. The request is added to the task queue by writing the address of the created information block to the task queue that corresponds to the requested device code.

The task queue manager determines whether one of the SPUs is currently assigned to the requested device task (decision 5435). If an SPU is not currently assigned to the requested task, decision 5435 branches to "no" branch 5440 whereupon, at step 5445, the task queue manager analyzes device history data and the existing task queues. Based on this analysis, at step 5450 the task queue manager identifies the SPU that is the least busy and recently performed the requested device code. The least busy aspect of the analysis will favor SPUs that are currently not assigned to a particular device code, while the recently performed aspect of the analysis favors those SPUs that may still have the requested device code available in the SPU's local memory. At step 5455, when one of the SPUs has been identified by the task queue manager, the task queue for the device code is assigned to the identified SPU. At step 5460, the history data is updated reflecting the assignment so that during subsequent analyses it will be known that the identified SPU once loaded the device code into the SPU's local memory.

Returning to decision 5435, if one of the SPUs is currently assigned to (i.e., executing) the device code, decision 5435 branches to "yes" branch 5465 bypassing steps 5445-5460.

The mailbox of the SPU that has been assigned to the device code task is signaled, at step 5470, by writing the address of the instruction block that was prepared in step 5425 into the mailbox. In one implementation, each SPU has a limited mailbox size that accommodates four entries. In this implementation, the task queue manager polls the mailbox of the assigned SPU to ensure that space exists in the SPU's mailbox. If space does not exist, the task queue manager queues the request and periodically polls the SPU's mailbox whereupon the request are only added to the mailbox when a slot is available.

A determination is made as to whether there are more requests for the task queue manager to handle (decision 5475). If there are additional requests, decision 5475 branches to "yes" branch 5480 which loops back to handle the next request. On the other hand, when there are no more requests (i.e., system shutdown), decision 5475 branches to "no" branch 5485 whereupon task queue manager processing ends at 5495.

FIG. 55 is a flowchart showing the task queue manager notifying applications that previously requested device requests. This flowchart show the details of the processing that occurs within predefined process 5410 shown in FIG. 54.

Processing commences at 5500 whereupon the request received from the application/API is analyzed (step 5510). A determination is made as to whether the application/API provided an address of a data structure to use to signal the application/API when the request has been completed (decision 5520). If a data structure was not supplied by the application/API, decision 5520 branches to "no" branch 5525 whereupon a data structure is created for storing completion information (step 5530) and the address of the data structure is returned to the application/API at step 5535. On the other hand, if the application/API provided a data structure to use in returning data, decision 5520 branches to "yes" branch 5545 bypassing steps 5530 and 5535.

At step 5550, the data structure is associated with the request sent to the SPU. At step 5555, the task manager receives a response from SPU 5560 that performed the request. In one embodiment, the SPU writes an address to the queue manager's mailbox (5565), in another embodiment, the SPU writes an address back to a write-back queue included with the data structures used by the task manager to manage the virtual device. In any event, at step 5555, the task manager receives a completion signal from the SPU. At step 5570, the output data structure associated with the original request is identified by reading request data structures 5575. At step 5580, the completion data received from the SPU is written to the output data structure. The output data structure is unlocked at step 5590 (i.e., notifying an application/API waiting on the lock or semaphore) so that the application/API 5540 receives the result data from the appropriate data structure. Processing then returns to the calling routine at 5595.

Figure 56:
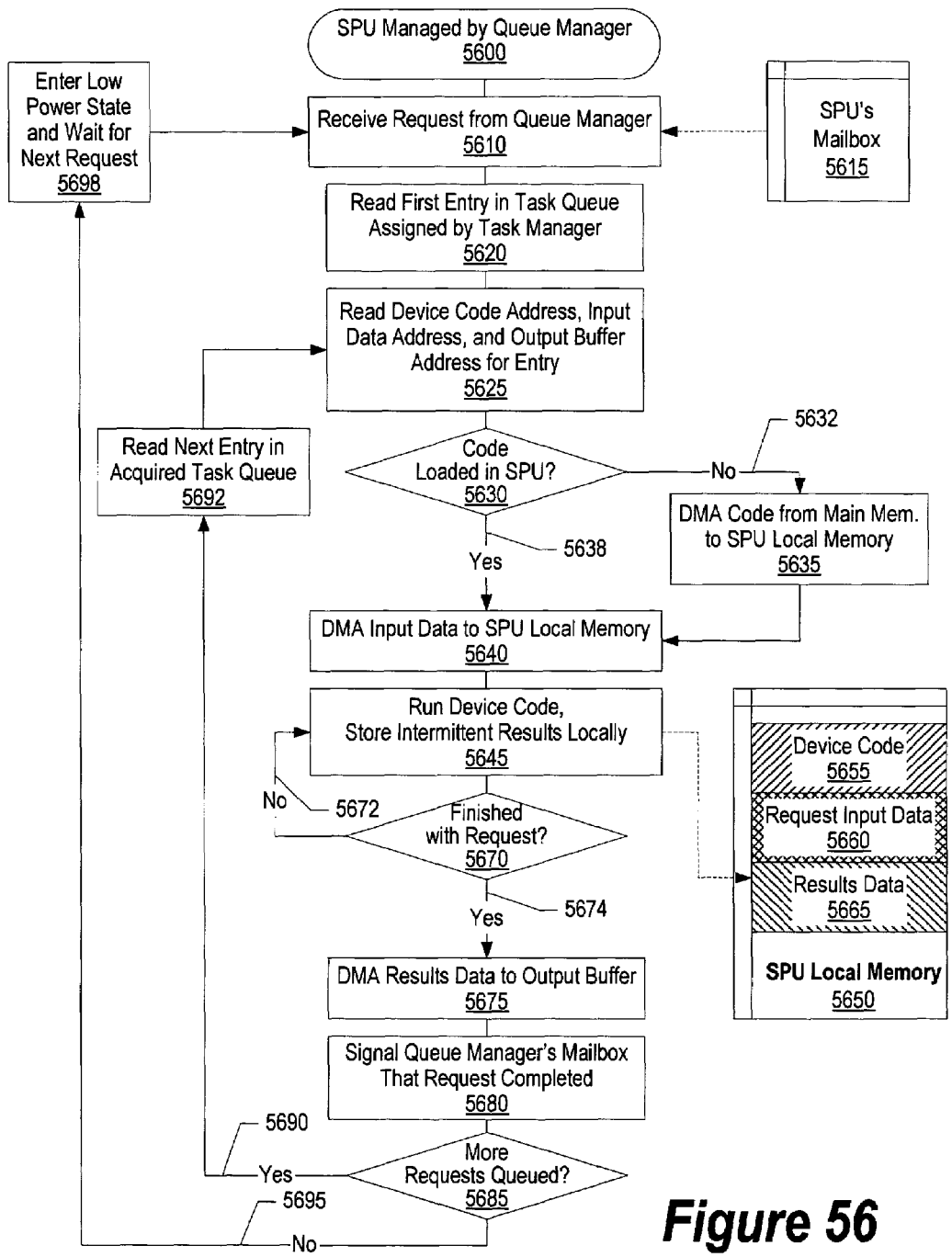
FIG. 56 is a flowchart showing steps taken by SPUs being managed by the task queue manager.

FIG. 56 is a flowchart showing steps taken by SPUs being managed by the task queue manager. SPU processing commences at 5600 whereupon, at step 5610, the SPU receives a mailbox request from the queue manager written to the SPU's mailbox (5615).

The first entry in the SPU's mailbox is read at step 5620. This entry is an address of an instruction block located in shared memory. The SPU reads the instruction block by using DMA commands to retrieve the identified instruction block (step 5625). The instruction block indicates the code address for the code that the SPU is being requested to execute, the addresses of the input and output buffers, the signaling instructions (i.e., write-back address), and any additional parameters needed to perform the request.

A determination is made as to whether the code identified in the instruction block is already loaded in the SPU's local memory (decision 5630). If the code is not currently loaded in the SPU's local memory, decision 5630 branches to "no" branch 5632 whereupon the code is read from shared memory using DMA commands and stored in the SPU's local memory. On the other hand, if the code is already in the SPU's local memory, decision 5630 branches to "yes" branch 5638 bypassing step 5635.

The data located in the input buffer is read from the shared memory and stored in the SPU's local memory using a DMA command (step 5640) resulting in input data 5660 stored in SPU local memory 5650. The device code is executed (step 5645) and results of the code are written to output data area 5665 stored in SPU local memory 5650. If either the input data or output data are too large for the SPU local memory, then the input data can be read in blocks, stored in the SPU local memory and processed. In addition, the output data can be written until the output data area is full and then the output data can be written to the output buffer (i.e., a buffer space in the shared memory or sent to an actual hardware device) intermittently.

A determination is made as to whether the input data is finished being processed by the device code (decision 5670). If the input data is not finished being processed, decision 5670 branches to "no" branch 5672 which loops back and continues processing the input data. This looping continues until the input data is finished being processed, at which point decision 5670 branches to "yes" branch 5674.

At step 5675, the results (stored in location 5665 within the SPU's local memory) are written to an output buffer location, which may be an output buffer stored in the shared memory or may be an actual hardware device, such as a hardware rasterizer. A determination is made as to whether there are more requests waiting in the SPU's mailbox (decision 5685). If there are more requests in SPU's mailbox, decision 5685 branches to "yes" branch 5690 whereupon the next entry (i.e., address) in the SPU's mailbox is read (step 5693) and processing loops back to process the request. This looping continues until there are no more entries in the mailbox, at which point decision 5685 branches to "no" branch 5695 whereupon the SPU enters a low power state and waits for a request to be written to the SPU's mailbox (step 5698).

Figure 57:
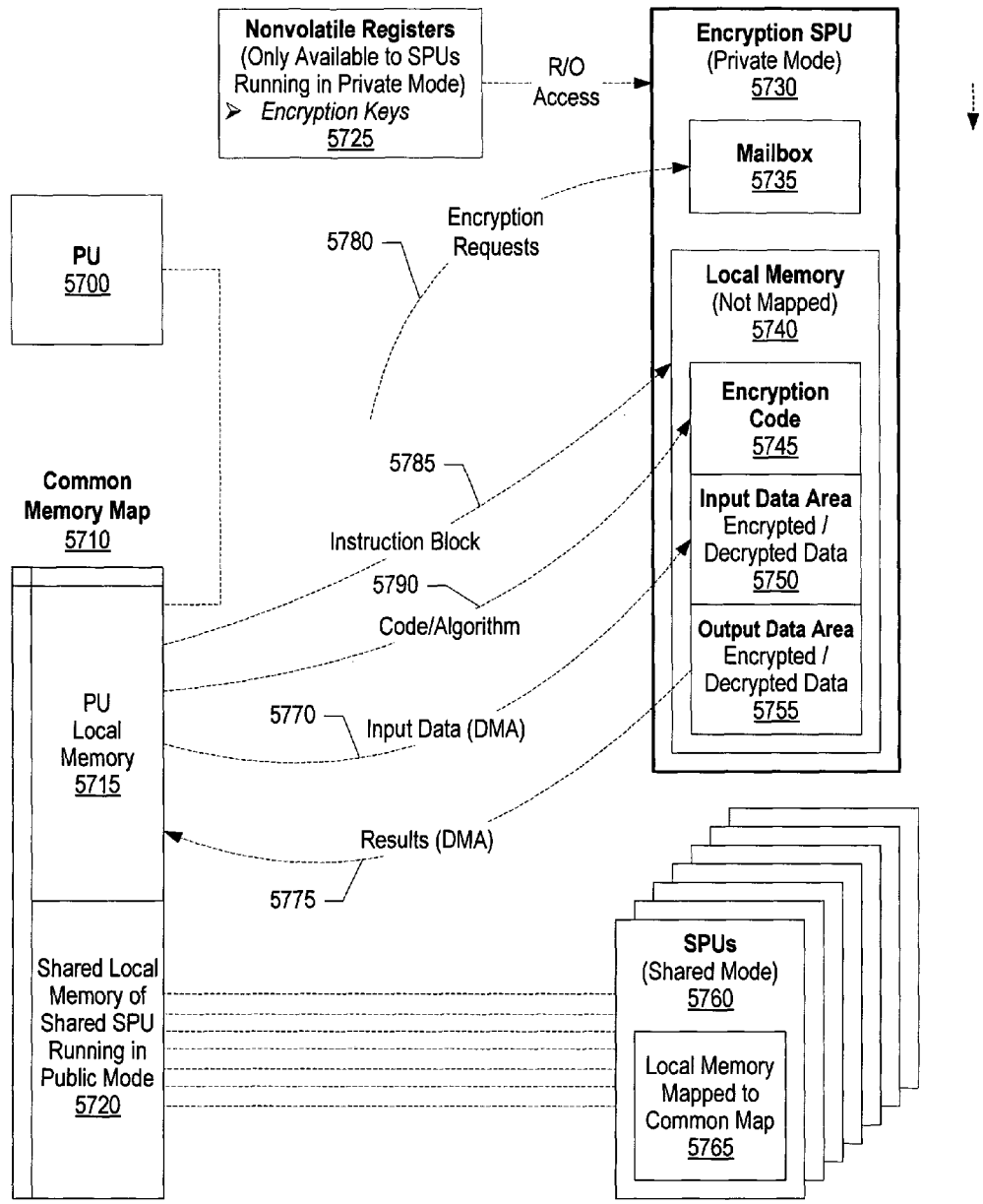
FIG. 57 is a system diagram showing the system components and intercommunication involved in using one of the SPUs as an isolated encryption device.

FIG. 57 is a system diagram showing the system components and intercommunication involved in using one of the SPUs as an isolated encryption device. When an SPU is set up as an encryption device, its local memory is not shared in the common memory map. So, while the encryption SPU can read and write data to and from shared common memory (i.e., using DMA commands), other processors are unable to read and write to the encryption SPU's local memory. In addition, special, nonvolatile registers that can be used to store a variety of encryption keys is available to the encryption SPU, however these special registers cannot be read by SPUs that are operating in "shared" mode (i.e., special registers are not available to SPUs that have local memory mapped to the shared memory map).

Common memory map 5710 shows memory that is shared amongst the processors. In one embodiment, each SPU and PU has its own DMA controller for accessing shared memory. Common (shared) memory includes PU local memory 5715 as well as shared local memory 5720 of those SPUs (5760)

that are running in shared, as opposed to private, mode. In the example shown in FIG. 57, SPU local memory 5765 is mapped to common memory map 5710 as shared memory 5720. As shared memory, other processors, such as PU 5700, are able to read and write data to local memory of SPUs that are running in shared mode.

Encryption SPU 5730, however is running in private mode so that its local memory (5740) is not shared, preventing processes running in other processors to access the encryption SPU's local memory, and therefore making it exceedingly difficult for hackers or other miscreants from discovering the encryption keys used by the encryption SPU. By running in private mode, the encryption SPU is provided with access to nonvolatile special registers 5725 that include encryption keys used by the encryption SPU.

Encryption SPU 5730 includes mailbox 5735 and local memory 5740. Mailbox 5735 is used by other processors to request that the encryption SPU perform a particular encryption task. The request includes an address of an instruction block, as described in FIGS. 43-56. The instruction block is read from the shared memory by the encryption SPU (DMA transmission 5785). The instruction block includes a code address of the encryption process or algorithm being requested (e.g., SHA-256, decryption, encryption, etc.), the address of the input buffer that is being requested to be processed, and the address of the output buffer where the encryption SPU should write the transformed data. If the requested encryption code/algorithm is not currently loaded in the encryption SPU's local memory, the encryption SPU loads the requested code/algorithm from the shared memory using a DMA instruction (DMA transmission 5790) and the SPU authenticates the code to ensure that the code will not compromise the encryption keys stored in the nonvolatile special registers. The encryption code is stored in the encryption SPU's local memory (5745) for processing data. The address of the input buffer is retrieved from the instruction block and the data is read from the shared memory by the encryption SPU using a DMA command (DMA transmission 5770) and stored in encryption SPU local memory area 5750. When the encryption SPU is finished using the encryption code/algorithms to transform the input data (i.e., encrypting the data, decrypting the data, providing a digital signature, etc.), the encryption SPU writes the resulting data stored in encryption SPU local memory area 5755 back to shared memory area 5710 using another DMA command. The encryption SPU can also signal the requesting process indicating that the request has completed.

Figure 58:
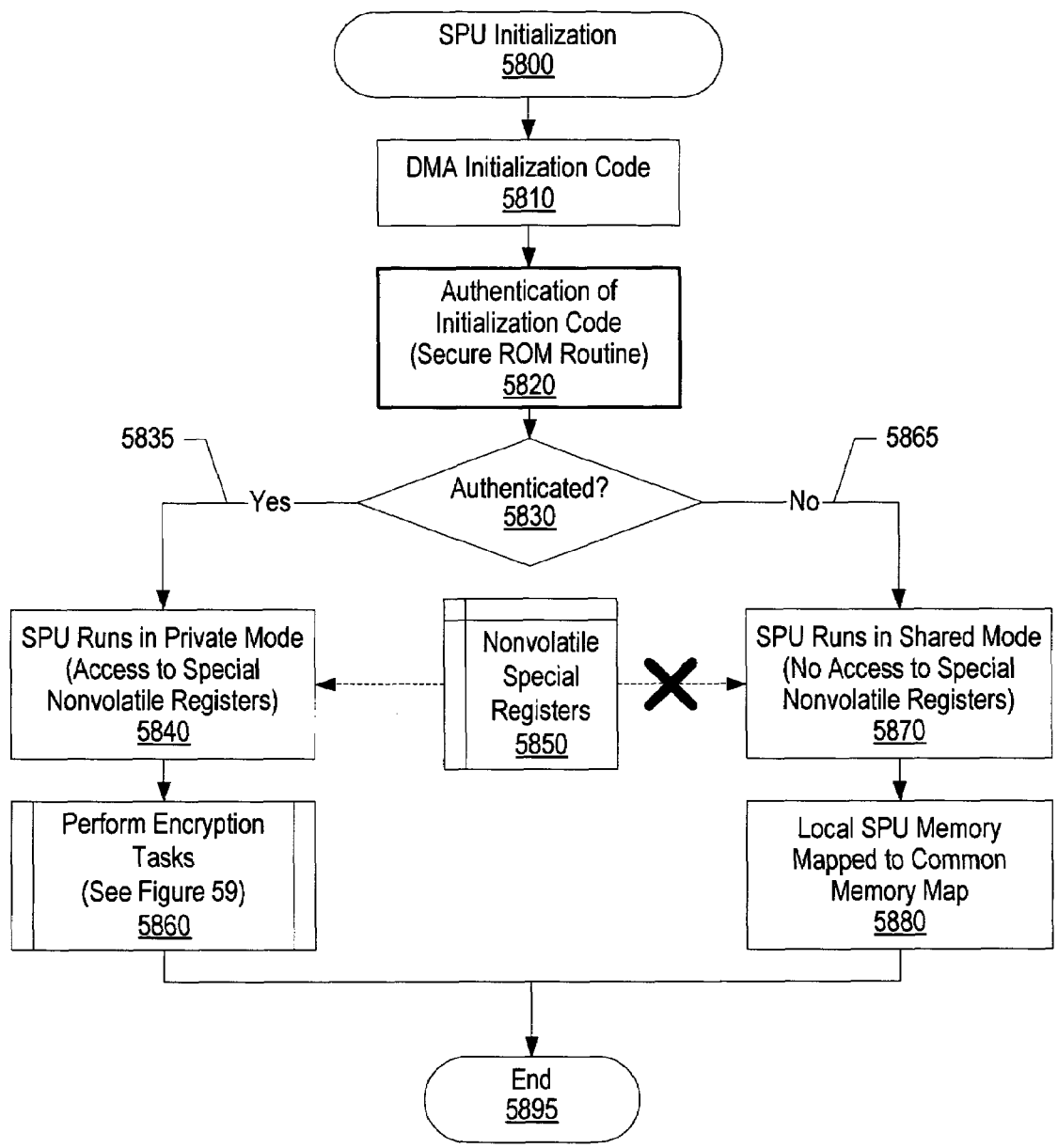
FIG. 58 is a flowchart showing steps taken to initialize one of the SPUs as an isolated encryption device.

FIG. 58 is a flowchart showing steps taken to initialize one of the SPUs as an isolated encryption device. Processing commences at 5800 whereupon, at step 5810, the SPU reads initialization code from the shared memory area and stores the initialization code in the SPU's local memory. At step 5820, the initialization code loaded in the SPU's local memory is authenticated using a secure (i.e., nonchangeable) ROM software routine that ensures that the initialization code is legitimate and will not compromise the system's encryption keys and other sensitive information stored in the nonvolatile special registers.

A determination is made as to whether the loaded initialization code is authentic (decision 5830). If the code is authentic, decision 5830 branches to "yes" branch 5835 whereupon the SPU runs in private mode (step 5480) and receives access to nonvolatile special registers 5850. The SPU is then able to perform encryption tasks using the encryption keys located in the special registers (predefined process 5860, see FIG. 59 and corresponding text for processing details).

On the other hand, if the initialization code is not authentic, indicating that someone has tampered with the code, decision 5830 branches to "no" branch 5865 whereupon, at step 5870, the SPU is able to run in shared mode (or private mode), but does not receive access to the nonvolatile special registers. If the SPU is running in shared mode, at step 5880, some or all of its local memory is mapped to the common shared memory map.

SPU initialization processing thereafter ends at 5895.

Figure 59:
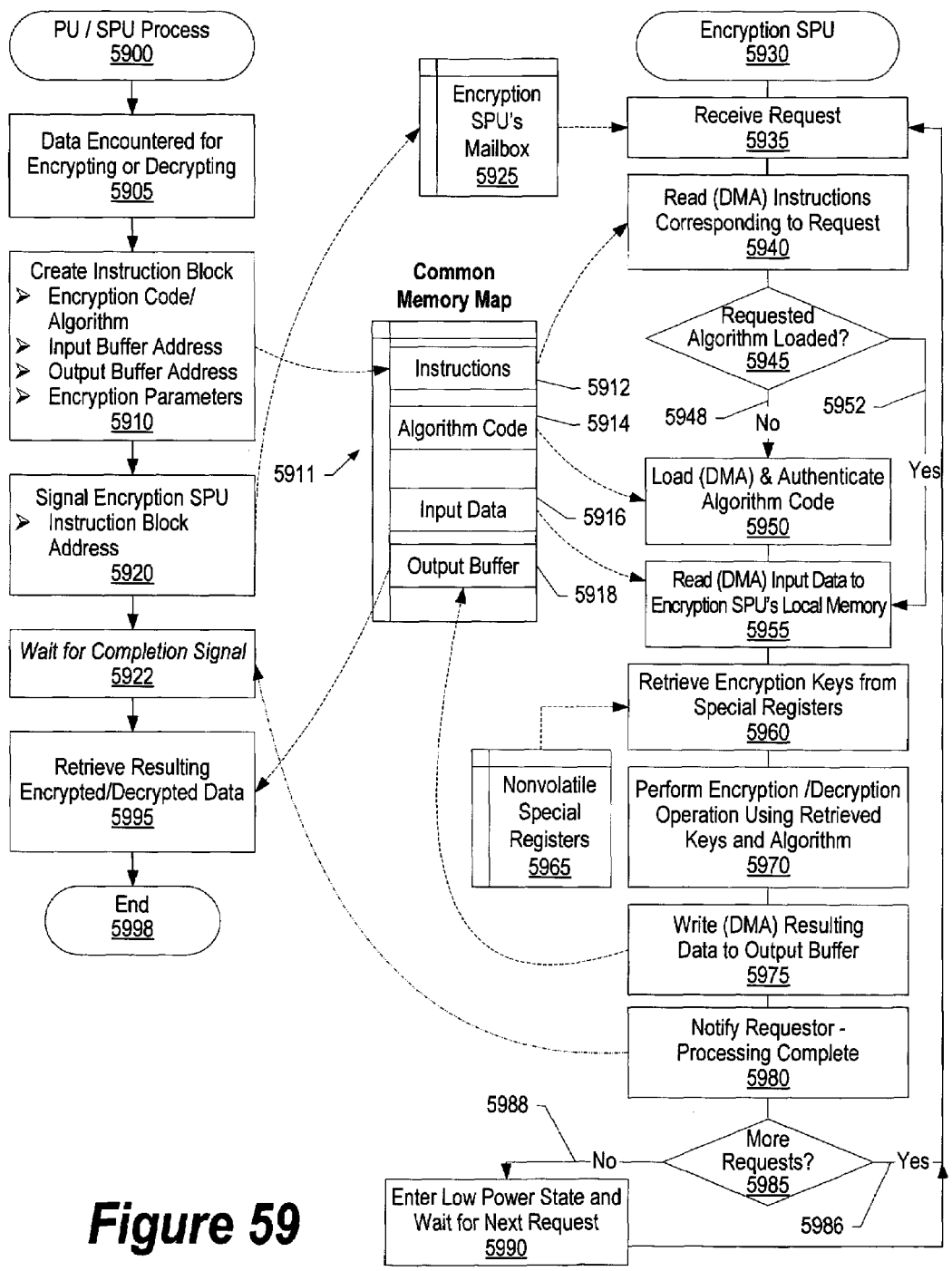
FIG. 59 is a flowchart showing steps taken by an encryption SPU in receiving and processing encryption requests from other system components, such as processors including other SPUs and PUs.

FIG. 59 is a flowchart showing steps taken by an encryption SPU in receiving and processing encryption requests from other system components, such as processors including other SPUs and PUs.

PU or SPU processing commences at 5900 with a process encountering data that needs to be encrypted or decrypted (step 5905). The processing may be programmed in encryption API functions that, in turn, use the encryption SPU to perform encryption and decryption operations. The requesting process, at step 5910, creates an instruction block that details the encryption process/algorithm that is being requested, the address of the input buffer containing the data to be encrypted/decrypted, and the address of the output buffer to which the encryption SPU should write the resulting data. In addition, any additional parameters needed by the requested encryption algorithm or process are included in the instruction block. The instruction block is written to a location in the common (shared) memory 5911 to location 5912.

The requesting process, at step 5920, signals the encryption SPU regarding the request by writing the address of instruction block 5912 to the encryption SPU's mailbox 5925. The requesting process then waits, at step 5922, for results to be returned from the encryption SPU.

Encryption SPU processing commences at 5930. At step 5935, the encryption SPU receives the request from its mailbox 5925. The instruction block (5912), the address of which is included with the request, is read from common memory 5911 using a DMA command (step 5940).

A determination is made as to whether the encryption code and algorithm referenced in the instruction block are already loaded in the encryption SPU's local memory (decision 5945). If the code is not currently in the encryption SPU's local memory, decision 5945 branches to "no" branch 5948 whereupon, at step 5950, the encryption code/algorithms are loaded from location 5914 in the common (shared) memory to the encryption SPU's local memory using a DMA command. On the other hand, if the encryption code/algorithms are already in the encryption SPU's local memory, decision 5945 branches to "no" branch 5952 bypassing step 5950.

At step 5955, the input data is read, using a DMA command from location 5916 in common memory 5911 to the encryption SPU's local memory. At step 5960, encryption keys needed to execute the requested encryption code/algorithms are retrieved from nonvolatile special registers 5965. The encryption process (i.e., encryption, decryption, digital signature, etc.) is performed using the appropriate encryption keys (step 5970). At step 5975, the resulting data is written back to the output buffer area of the common memory and, at step 5980, the encryption SPU signals the requesting process that the encryption processing is complete, along with any error or return code values.

A determination is made as to whether there are more encryption requests waiting in the encryption SPU's mailbox (decision 5985). If there are additional requests, decision 5985 branches to "yes" branch 5986 which loops back to retrieve the next instruction block address and process the instruction accordingly. On the other hand, if there are no requests waiting in the encryption SPU's mailbox, decision

5985 branches to "no" branch 5988 whereupon the encryption SPU enters a low power state and waits for a request to arrive in its mailbox. When a request arrives, the encryption SPU leaves the low power state and loops back to retrieve and process the request from the mailbox.

Returning to PU/SPU processing, the process was waiting for a completion signal from the encryption SPU. This signal arrives and processing leaves step 5922 and, at step 5996, the requesting process retrieves, from common memory 5911, the resulting data that was written by the encryption SPU to the output buffer. The requesting process can now perform operations on the resulting data (i.e., send the data to another computer, read data that was encrypted, etc.). Requesting process then ends at 5998.

Figure 60:
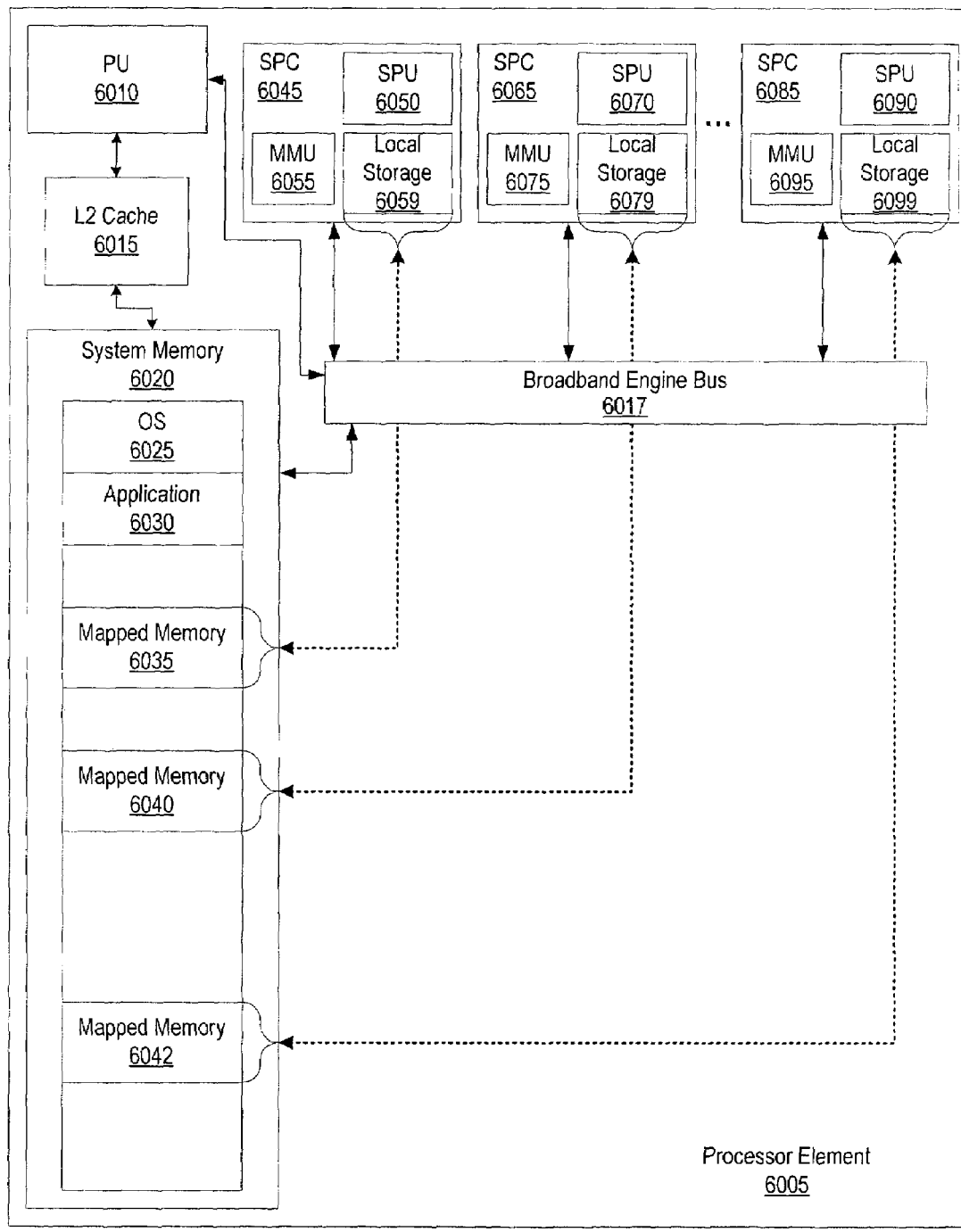
FIG. 60 is a block diagram illustrating a processing element having a main processor and a plurality of secondary processors sharing a system memory.

FIG. 60 is a block diagram illustrating a processing element having a main processor and a plurality of secondary processors sharing a system memory. Processor Element (PE) 6005 includes processing unit (PU) 6010, which, in one embodiment, acts as the main processor and runs an operating system. Processing unit 6010 may be, for example, a Power PC core executing a Linux operating system. PE 6005 also includes a plurality of synergistic processing complex's (SPCs) such as SPCs 6045, 6065, and 6085. The SPCs include synergistic processing units (SPUs) that act as secondary processing units to PU 6010, a memory storage unit, and local storage. For example, SPC 6045 includes SPU 6060, MMU 6055, and local storage 6059; SPC 6065 includes SPU 6070, MMU 6075, and local storage 6079; and SPC 6085 includes SPU 6090, MMU 6095, and local storage 6099.

Each SPC may be configured to perform a different task, and accordingly, in one embodiment, each SPC may be accessed using different instruction sets. If PE 6005 is being used in a wireless communications system, for example, each SPC may be responsible for separate processing tasks, such as modulation, chip rate processing, encoding, network interfacing, etc. In another embodiment, the SPCs may have identical instruction sets and may be used in parallel with each other to perform operations benefiting from parallel processing.

PE 6005 may also include level 2 cache, such as L2 cache 6015, for the use of PU 6010. In addition, PE 6005 includes system memory 6020, which is shared between PU 6010 and the SPUs. System memory 6020 may store, for example, an image of the running operating system (which may include the kernel), device drivers, I/O configuration, etc., executing applications, as well as other data. System memory 6020 includes the local storage units of one or more of the SPCs, which are mapped to a region of system memory 6020. For example, local storage 6059 may be mapped to mapped region 6035, local storage 6079 may be mapped to mapped region 6040, and local storage 6099 may be mapped to mapped region 6042. PU 6010 and the SPCs communicate with each other and system memory 6020 through bus 6017 that is configured to pass data between these devices.

The MMUs are responsible for transferring data between an SPU's local store and the system memory. In one embodiment, an MMU includes a direct memory access (DMA) controller configured to perform this function. PU 6010 may program the MMUs to control which memory regions are available to each of the MMUs. By changing the mapping available to each of the MMUs, the PU may control which SPU has access to which region of system memory 6020. In this manner, the PU may, for example, designate regions of the system memory as private for the exclusive use of a particular SPU. In one embodiment, the SPUs' local stores may be accessed by PU 6010 as well as by the other SPUs using the memory map. In one embodiment, PU 6010 manages the memory map for the common system memory 6020 for all the SPUs. The memory map table may include PU 6010's L2 Cache 6015, system memory 6020, as well as the SPUs' shared local stores.

In one embodiment, the SPUs process data under the control of PU 6010. The SPUs may be, for example, digital signal processing cores, microprocessor cores, micro controller cores, etc., or a combination of the above cores. Each one of the local stores is a storage area associated with a particular SPU. In one embodiment, each SPU can configure its local store as a private storage area, a shared storage area, or an SPU may configure its local store as a partly private and partly shared storage.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 6010 and by the other SPUs. An SPU may reserve part of its local store in order for the SPU to have fast, guaranteed memory access when performing tasks that require such fast access. The SPU may also reserve some of its local store as private when processing sensitive data, as is the case, for example, when the SPU is performing encryption/decryption.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in a multiprocessor system, the multiprocessor system comprising a control processor and a plurality of controlled processors, the method comprising:
   selecting at least one controlled processor of the plurality of controlled processors to operate in a shared operational state;
   selecting a second controlled processor from the plurality of controlled processors to operate in an isolated operational state;
   configuring the at least one first controlled processor of the multiprocessor system to be in the shared operational state, wherein the shared operational state causes the at least one first controlled processor to operate using a common memory accessible by the plurality of controlled processors in the multiprocessor system;
   configuring the second controlled processor of the multiprocessor system, via loading and executing initialization code in the second controlled processor, to be in the isolated operational state, wherein the isolated operational state causes a local memory associated with the second controlled processor to be not accessible by the at least one first controlled processor;
   executing first code within the second controlled processor in a secure manner by virtue of the isolated operational state; and
   executing second code within the at least one first controlled processor in an unsecured manner by virtue of the shared operational state.

2. The method of claim 1, further comprising:
   sending an encryption request from a first controlled processor in the at least one first controlled processor to the second controlled processor;
   receiving, at the second controlled processor, the encryption request;
   reading data from the common memory into the local memory associated with the second controlled processor, wherein the reading is performed by the second controlled processor;
   executing at the second controlled processor, an encryption process corresponding to the encryption request, the encryption process being adapted to transform the data; and
   writing the transformed data from the second controlled processor to the common memory.

3. The method as described in claim 2 further comprising:
   reading, at the second controlled processor, one or more special nonvolatile registers, the special registers including one or more encryption keys; and
   using one or more of the encryption keys in the encryption process.

4. The method as described in claim 2, wherein the sending further comprises writing the request to a mailbox that corresponds to the second controlled processor and the receiving further comprises checking the second controlled processor's mailbox from the second controlled processor.

5. The method as described in claim 2 further comprising:
   identifying an input data area in the common memory from which the data is read and an output buffer area to which the transformed data is written.

6. The method as described in claim 2, wherein configuring the second controlled processor further comprises:
   reading, from the common memory, initialization software code to be executed on the second controlled processor; and
   authenticating the initialization software code.

7. The method as described in claim 6 wherein the authenticating is performed by a routine stored in a nonvolatile memory and wherein the executing of the encryption process is only performed if the initialization software code is successfully authenticated.

8. The method as described in claim 7 further comprising:
   reading, at the second controlled processor, one or more special nonvolatile registers, the special nonvolatile registers including one or more encryption keys, after the initialization software code is successfully authenticated; and
   restricting access to the special nonvolatile registers from outside of the second controlled processor.

9. The method as described in claim 2 wherein the reading and writing steps are performed using Direct Memory Access (DMA) operations.

10. The method as described in claim 2 further comprising:
    identifying the encryption process and an encryption algorithm from a plurality of encryption processes and encryption algorithms based upon the encryption request; and
    loading encryption software code corresponding to the identified encryption process and the encryption algorithm, the loading being performed by reading the encryption software code from the common memory to the second controlled processor's local memory.

11. The method of claim 1, wherein selecting a second controlled processor from the plurality of controlled processors to operate in an isolated operational state comprises:
    identifying a free controlled processor in the plurality of controlled processors that has not be dedicated to perform a specific device function; and
    assigning the free controlled processor to be the second controlled processor and perform encryption device functions.

12. The method of claim 1, wherein configuring the second controlled processor to be in the isolated operational state comprises:
    determining if the initialization code is authentic;
    setting the second controlled processor to run in the isolated operational state in response to the initialization code being determined to be authentic; and
    providing access to special purpose registers storing encryption keys to only the second controlled processor in response to the setting of the second controlled processor to run in the isolated operational state.

13. The method of claim 12, wherein if the initialization code is determined to not be authentic, the second controlled processor is set to run in the shared operational state and another controlled processor in the plurality of controlled processors is selected to operate in the isolated operational state.

14. The method of claim 1, wherein the common memory comprises a first portion associated with the control processor and a second portion associated with the plurality of controlled processors, and wherein data to be processed by the second controlled processor in the isolated operational state is retrieved from the first portion of the common memory and results data generated by processing the data is written back to the first portion of the common memory.

15. The method of claim 1, wherein the at least one first controlled processor and the second controlled processor are synergistic processing units.

16. An information handling system, comprising:
a control processor;
a plurality of controlled processors, wherein each of the plurality of controlled processors comprises a local memory; and
a common memory shared by the control processor and the plurality of controlled processors in the information handling system, wherein the plurality of controlled processors comprises:
at least one first controlled processor selected and configured to be in a shared operational state, wherein the shared operation state causes the at least one first controlled processor to operate using the common memory; and
a second controlled processor selected and configured, via loading and executing initialization code in the second controlled processor, to be in an isolated operational state, wherein the isolated operational state causes a local memory associated with the second controlled processor to be not accessible by the at least one first controlled processor, wherein the second controlled processor executes first code in a secure manner by virtue of the isolated operational state, and wherein the at least one first controlled processor executes in an unsecured manner by virtue of the shared operational state.

17. The information handling system of claim 16, wherein an encryption process runs in the second controlled processor, the encryption process being effective to:
load data, associated with an encryption request, from the common memory to the second controlled processor's local memory;
transform the data based on the encryption request; and
write the transformed data from the second controlled processor's local memory to the common memory.

18. The information handling system as described in claim 17 further comprising software code effective to:
read, at the second controlled processor, one or more special nonvolatile registers, the special registers including one or more encryption keys; and
use one or more of the encryption keys in the encryption process.

19. The information handling system as described in claim 17 wherein the encryption request is sent from a first controlled processor in the at least one first controlled processor, and wherein the sending of the encryption request comprises:
writing the encryption request to a mailbox that corresponds to the second controlled processor; and
reading, from the second controlled processor, the encryption request from the second controlled processor's mailbox.

20. The information handling system as described in claim 17 further comprising software code effective to:
identify an input data area in the common memory from which the data is read and an output buffer area to which the transformed data is written.

21. The information handling system as described in claim 17 further comprising software code effective to configure the second controlled processor by:
initializing the second controlled processor prior to receiving the request, the initializing further including:
reading, from the common memory, initialization software code to be executed on the second controlled processor; and
authenticating the initialization software code.

22. The information handling system as described in claim 21 wherein the software code effective to authenticate the initialization software code is performed by a routine stored in a nonvolatile memory, wherein the encryption process is only performed if the initialization software code is successfully authenticated.

23. The information handling system as described in claim 22 further comprising software code effective to:
read, at the second controlled processor, one or more special nonvolatile registers, the special nonvolatile registers including one or more encryption keys, after the initialization software code is successfully authenticated; and
restrict access to the special nonvolatile registers from outside of the second controlled processor.

24. The information handling system as described in claim 17 further comprising:
a Direct Memory Access (DMA) controller associated with each of the plurality of controlled processors, wherein the second controlled processor reads from and writes to the common memory using DMA operations performed by the second controlled processor's DMA controller.

25. The information handling system as described in claim 17 further comprising software code effective to:
identify the encryption process and an encryption algorithm from a plurality of encryption processes and encryption algorithms based upon the encryption request; and
load encryption software code corresponding to the identified encryption process and the encryption algorithm, the load being performed by reading the encryption software code from the common memory to the second controlled processor's local memory.

26. The information handling system of claim 16, wherein the at least one first controlled processor and the second controlled processor are synergistic processing units.

27. A computer program product comprising a computer useable medium having a computer readable program, wherein the computer readable program, when executed on a computing device comprising a control processor and a plurality of controlled processors, causes the computing device to:
select at least one first controlled processor of the plurality of controlled processors to operate in a shared operational state;
select a second controlled processor from the plurality of controlled processors to operate in an isolated operational state;
configure the at least one first controlled processor of the computing device to be in the shared operational state, wherein the shared operational state causes the at least one first controlled processor to operate using a common memory accessible by the plurality of controlled processors in the computing device;
configure the second controlled processor of the computing device, via loading and executing initialization code in the second controlled processor, to be in the isolated operational state, wherein the isolated operational state causes a local memory associated with the second controlled processor to be not accessible by the at least one first controlled processor;

execute first code within the second controlled processor in a secure manner by virtue of the isolated operational state; and execute second code within the at least one first controlled processor in an unsecured manner by virtue of the shared operational state.

28. The computer program product of claim 27, further comprising:

means for sending an encryption request from a first controlled processor in the at least one first controlled processor to the second controlled processor;

means for receiving, at the second controlled processor, the encryption request;

means for reading data from the common memory into the local memory associated with the second controlled processor, wherein the means for reading is performed by the second controlled processor;

means for executing, at the second controlled processor, an encryption process corresponding to the request, the encryption process being adapted to transform the data; and means for writing the transformed data from the second controlled processor to the common memory.

29. The computer program product as described in claim 28 further comprising:

means for reading, at the second controlled processor, one or more special nonvolatile registers, the special registers including one or more encryption keys; and means for using one or more of the encryption keys in the encryption process.

30. The computer program product as described in claim 28 wherein the means for sending further comprises means for writing the request to a mailbox that corresponds to the second controlled processor and the means for receiving further comprises means for checking the second controlled processor's mailbox from the second controlled processor.

31. The computer program product as described in claim 28 further comprising:

means for identifying an input data area in the common memory from which the data is read and an output buffer area to which the transformed data is written.

32. The computer program product as described in claim 28, wherein the means for configuring the second controlled processor comprises:

means for initializing the second controlled processor prior to receiving the request, the means for initializing further including:

means for reading, from the common memory, initialization software code to be executed on the second controlled processor; and means for authenticating the initialization software code.

33. The computer program product as described in claim 32 wherein the means for authenticating operates using a routine stored in a nonvolatile memory and wherein the means for executing of the encryption process operations only if the initialization software code is successfully authenticated.

34. The computer program product as described in claim 33 further comprising:

means for reading, at the second controlled processor, one or more special nonvolatile registers, the special nonvolatile registers including one or more encryption keys, the means for reading operating after the initialization software code is successfully authenticated; and means for restricting access to the special nonvolatile registers from outside of the second controlled processor.

35. The computer program product as described in claim 28 further comprising:

means for identifying the encryption process and an encryption algorithm from a plurality of encryption processes and encryption algorithms based upon the encryption request; and means for loading encryption software code corresponding to the identified encryption process and the encryption algorithm, the means for loading operating by reading the encryption software code from the common memory to the second controlled processor's local memory.

36. The computer program product of claim 27, wherein the at least one first controlled processor and the second controlled processor are synergistic processing units.

* * * * *